(12) United States Patent
Fieldman

(10) Patent No.: US 12,283,199 B2
(45) Date of Patent: Apr. 22, 2025

(54) SYSTEMS AND METHODS FOR EXTENDED REALITY EDUCATIONAL ASSESSMENT

(71) Applicant: CURIOXR, INC., Gainesville, FL (US)

(72) Inventor: Ethan Fieldman, Gainesville, FL (US)

(73) Assignee: CURIOXR, INC., Gainesville, FL (US)

( * ) Notice: Subject to any disclaimer, the term of this patent is extended or adjusted under 35 U.S.C. 154(b) by 0 days.

(21) Appl. No.: 18/658,618

(22) Filed: May 8, 2024

(65) Prior Publication Data
US 2024/0296751 A1 Sep. 5, 2024

Related U.S. Application Data

(63) Continuation of application No. 18/116,646, filed on Mar. 2, 2023, now Pat. No. 11,990,059.

(51) Int. Cl.
G09B 7/00 (2006.01)
G06T 11/00 (2006.01)
G09B 7/04 (2006.01)
G09B 7/08 (2006.01)

(52) U.S. Cl.
CPC ............... *G09B 7/04* (2013.01); *G06T 11/00* (2013.01); *G06T 2200/24* (2013.01); *G09B 7/08* (2013.01)

(58) Field of Classification Search
CPC .. G09B 7/04; G09B 7/08; G06T 11/00; G06T 2200/24
See application file for complete search history.

(56) References Cited

U.S. PATENT DOCUMENTS

| | | | |
|---|---|---|---|
| 9,530,326 B1 * | 12/2016 | Ramloll | G09B 5/02 |
| 10,168,768 B1 | 1/2019 | Kinstner | |
| 10,832,589 B1 * | 11/2020 | Anzalone | G09B 19/00 |
| 2013/0244218 A1 * | 9/2013 | Cook | G09B 5/14 434/350 |
| 2014/0168348 A1 * | 6/2014 | Kubota | G06Q 30/06 348/14.02 |
| 2016/0005320 A1 * | 1/2016 | deCharms | G09B 19/00 434/236 |
| 2019/0019321 A1 * | 1/2019 | Thielen | G09B 19/0038 |
| 2019/0066529 A1 * | 2/2019 | Grubbs | G06F 3/012 |
| 2020/0005544 A1 * | 1/2020 | Kim | G06T 13/40 |
| 2020/0335001 A1 * | 10/2020 | Freiwirth | A63F 13/211 |
| 2022/0013029 A1 * | 1/2022 | Liberty | G09B 7/04 |
| 2022/0277506 A1 * | 9/2022 | Lagrone | G06T 13/40 |

FOREIGN PATENT DOCUMENTS

WO WO-2023039185 A1 * 3/2023 ........... A61B 5/1114

\* cited by examiner

*Primary Examiner* — Peter R Egloff
(74) *Attorney, Agent, or Firm* — Polsinelli PC

(57) ABSTRACT

A system and associated methods facilitate administration of assessments within an extended reality learning environment. Assessment recordings captured during administration of an assessment module to a first user are used for providing feedback information to the first user from a second user that can view the first user's interactions with the assessment module.

30 Claims, 51 Drawing Sheets

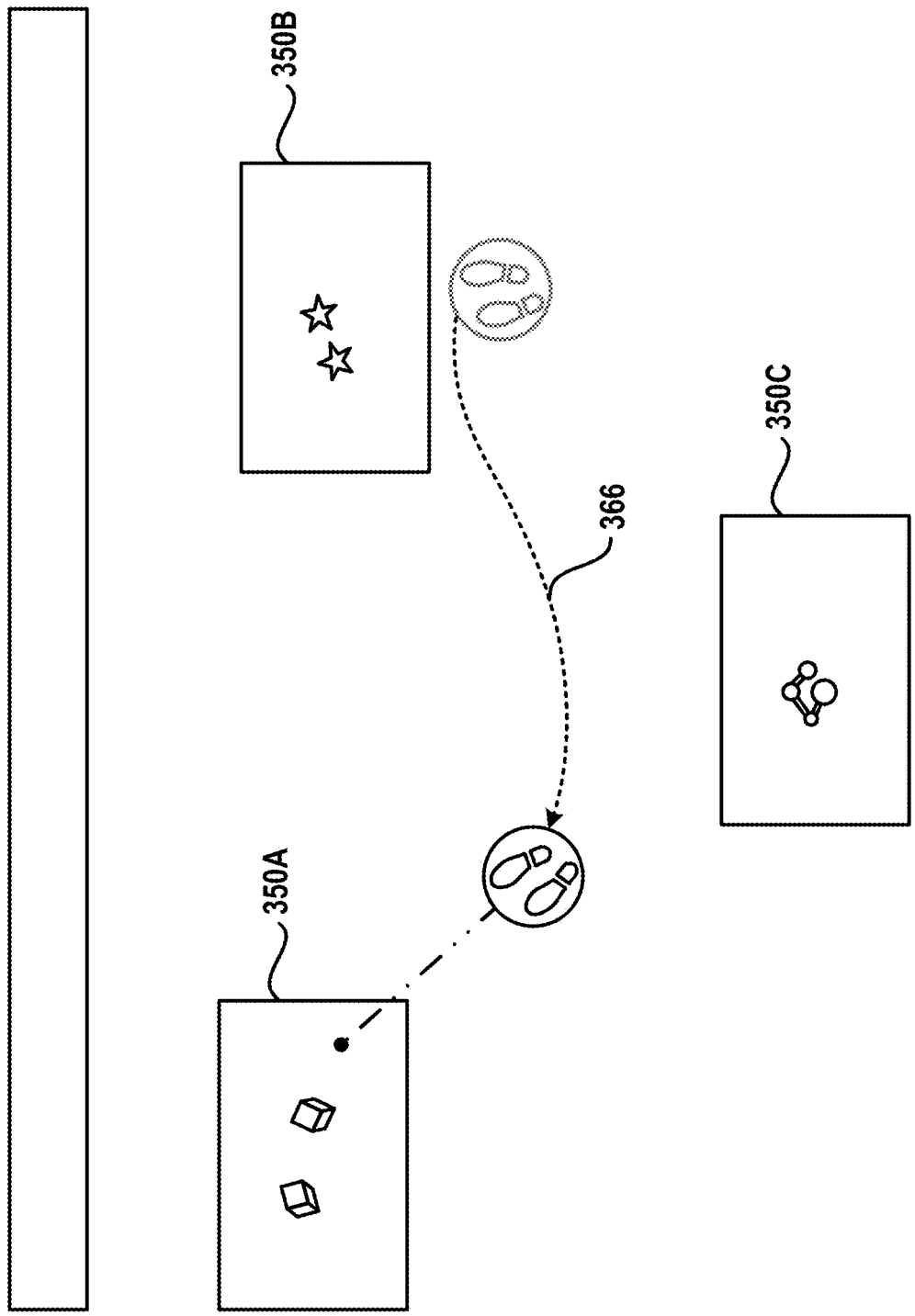

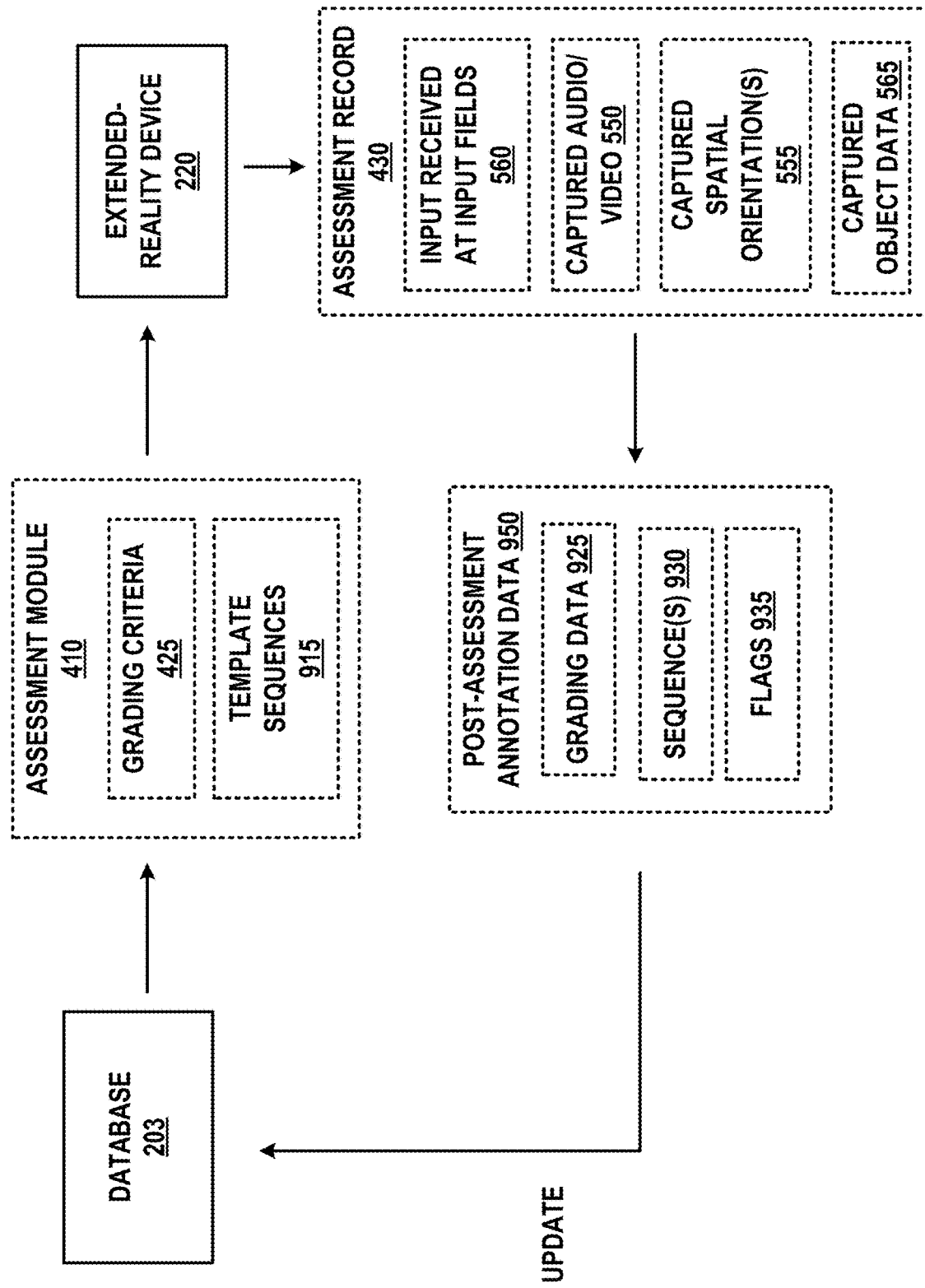

ACCEPTABLE SEQUENCE — 915

| | |
|---|---|
| 1. $4-1 = 3$ | SUBTRACTION |
| 2. $2*3 = 6$ | MULTIPLICATION |
| 3. $6+6 = 12$ | ADDITION |

FIG. 10B

ACTUAL SEQUENCE — 930

| | |
|---|---|
| 1. $6+2 = 8$ | ADDITION* |
| 2. $4-1 = 3$ | SUBTRACTION** |
| 3. $8*3 = 24$ | MULTIPLICATION*** |

*EXPECTED SUBTRACTION
**EXPECTED MULTIPLICATION
***EXPECTED ADDITION

| QUESTION | RESULT | TIMESTAMP | SHOWED WORK? | FLAGS |
|---|---|---|---|---|
| Q 2 | INCORRECT | XX/XX/XXXX XX:XX | Y | STUDENT-ENTERED FLAG 1 @ 0:15 POSSIBLE ORDER OF OPERATIONS ERROR |

FIG. 10D

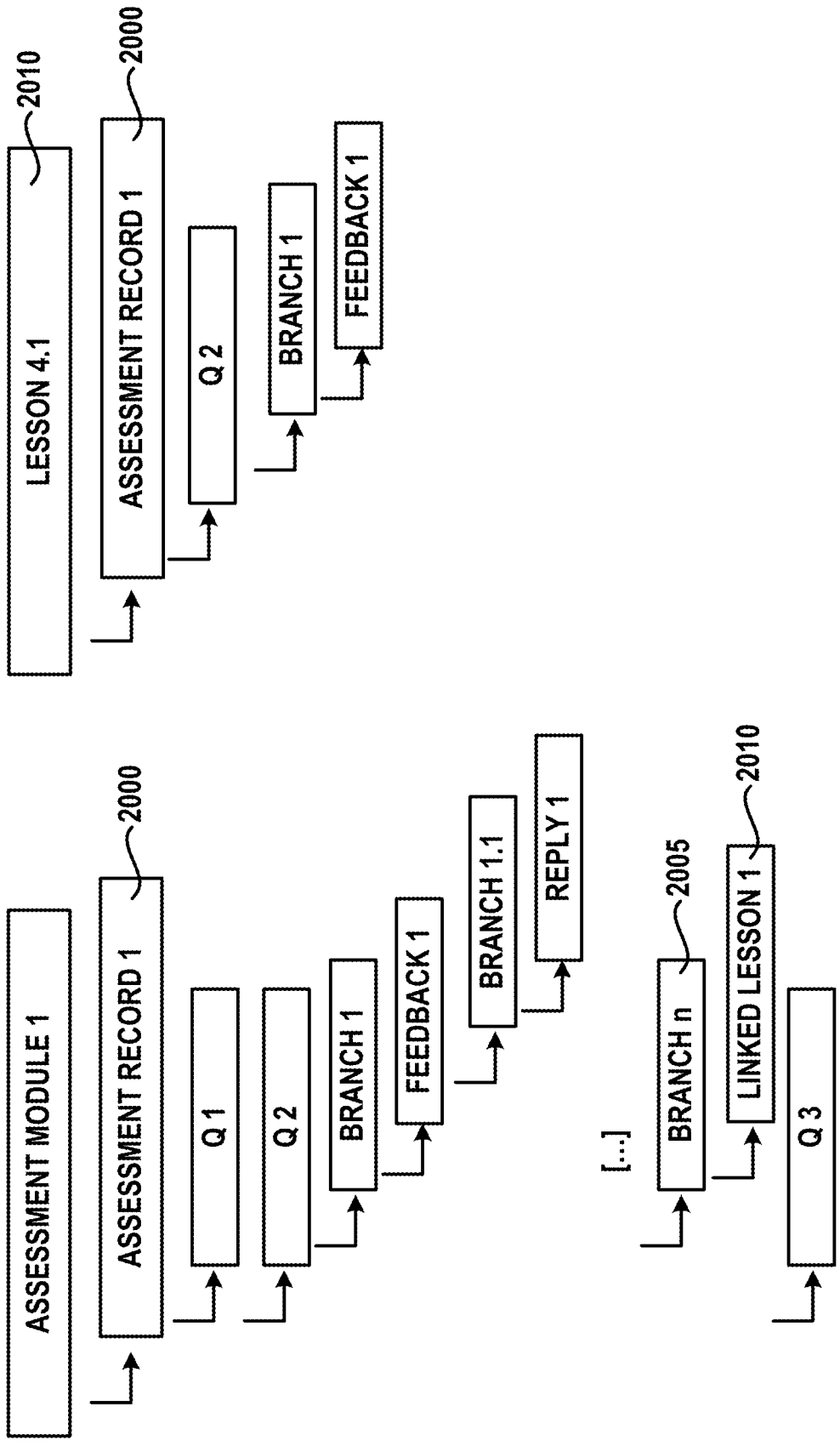

SYSTEMS AND METHODS FOR EXTENDED REALITY EDUCATIONAL ASSESSMENT

CROSS-REFERENCE TO RELATED APPLICATIONS

This is a continuation application of U.S. patent application Ser. No. 18/116,646, filed Mar. 2, 2023, which is incorporated herein by reference in its entirety.

FIELD

The present disclosure generally relates to Extended Reality education systems, and in particular, to a system and associated method for educational assessment within an Extended Reality platform.

BACKGROUND

Extended reality (XR) environments, i.e., environments created by immersive technologies that merge physical and virtual worlds, such as augmented reality (AR), virtual reality (VR), and mixed reality (MR) and the like, have grown more realistic and immersive as VR headsets, augmented reality devices and applications, processor speeds, data storage and data transfer technologies have continued to improve. However, unlike conventional physical reality, electronic XR environments present more opportunities for persons to collaborate and share information, including in work and education fields, in ways that are not possible in the physical constraints of the real-world.

There are many challenges associated with traditional educational assessment methods, such as ensuring that the assessment environment is conducive to student-specific needs, ensuring academic integrity (especially in remote learning environments), and ensuring that students understand concepts they may have missed after the fact. In addition, other entities involved in the educational processes such as tutors and instructors feel the need to put themselves in the perspective of the student when providing assistance. Further, individual student experiences can provide information about the learning process that can be highly valuable to administrators and educational authorities in improving their methods.

To address these challenges, various aspects of the present disclosure were conceived and developed.

SUMMARY OF THE INVENTION

A system for facilitating assessment within an XR learning environment includes a processor in communication with a memory, the memory including instructions executable by the processor to: display, at a first display device of a first XR device of a first user, an extended reality learning environment including an assessment module having first viewable information displayed thereon and viewable by a first avatar representation of the first user, the assessment module including one or more input fields for receipt of response information from an input device in communication with the first XR device of the first user; and store, at a database in communication with the processor, an assessment record indicative of one or more interactions between the first user and the assessment module, the assessment record including one or more user responses received at the one or more input fields of the assessment module. The assessment module is associated with one or more 2-D objects or 3-D objects viewable within the extended reality learning environment at the extended reality display device of the first user.

The memory of the system can further include instructions executable by the processor to: display, at a display device of a second user, one or more elements of the assessment record; receive a set of feedback information from the second user, the set of feedback information being associated with an element of the one or more elements of the assessment record; and store the set of feedback information from the second user in association with the assessment record at a database. The system can display, at the first XR device of the first user, the extended reality learning environment including the assessment record and the set of feedback information.

In one aspect, the one or more 2-D objects or 3-D objects include an information board for display of the first viewable information and the one or more input fields of the assessment module. The one or more user responses received at the one or more input fields can include a string or a numeric value received at a virtual input device object viewable within the extended reality learning environment or received at an input device in communication with the first XR device. The assessment record can include various recorded information instances, including: a document including second viewable information within the extended reality learning environment and recorded by the first user in association with the assessment module; a position and a spatial orientation of the first avatar representation of the first user interacting with the assessment module within the extended reality learning environment; object data pertaining to one or more objects in association with the assessment module and the extended reality learning environment; and information indicative of an interaction between the first avatar representation of the first user and one or more 2-D objects or one or more 3-D objects associated with the assessment module. In a further aspect, the one or more 2-D objects or the one or more 3-D objects can include a calculator, wherein one or more interactions between the first avatar representation of the first user and the calculator includes a sequence of calculator inputs and/or a sequence of calculator outputs, and the one or more user responses received at the one or more input fields of the assessment module can include a modified configuration of the one or more 2-D objects or the one or more 3-D objects associated with the assessment module.

The memory of the system can further include instructions executable by the processor to: capture, at an audio input device in communication with the first XR device of the first user, first audio data captured during administration of the assessment module for inclusion within the assessment record; capture video data displayed at the first XR device of the first user during administration of the assessment module for inclusion within the assessment record; and capture, at an orientation measurement device in communication with the first XR device of the first user, first orientation data captured during administration of the assessment module and/or first inertial measurement data during administration of the assessment module. In some embodiments, the first orientation data includes head-tracking data and/or hand-tracking data.

The memory of the system can further include instructions executable by the processor to: display, at the first XR device, a 2-D object or a 3-D object having a first configuration; receive, at the first XR device, a manipulating input that modifies a state of the 2-D object or the 3-D object to a second configuration; and store the second configuration of the 2-D object or the 3-D object at the database as a user response of the one or more user responses received at the one or more input fields of the assessment module. The system can further compare the second configuration of the 2-D object or the 3-D object with a set of grading criteria associated with the assessment module.

The memory of the system can further include instructions executable by the processor to: extract one or more aspects of the assessment record; compare the one or more aspects of the assessment record as extracted with a set of grading criteria; and annotate the assessment record based on comparison of the one or more aspects of the assessment record. In one aspect, extracting one or more concepts of the assessment record can further include: applying a natural language processing methodology to the assessment record to extract natural language concepts of the assessment record.

In a further aspect, the first avatar of the first user is a past avatar associated with a previous time. The memory can further include instructions executable by the processor to display, at the first XR device of the first user, the assessment record within the extended reality learning environment including the past avatar of the first user from a perspective of a current avatar of the first user, the current avatar being associated with a current time.

In another aspect, the present disclosure outlines a system for facilitating synchronous or asynchronous feedback. The system includes a processor in communication with a memory, the memory including instructions executable by the processor to: access an assessment record indicative of one or more interactions between a first user and an assessment module within an extended reality learning environment, the assessment record including one or more user responses received at one or more input fields of the assessment module from an input device in communication with a first XR device of the first user; display, at a display device of a second user, one or more elements of the assessment record; receive a set of feedback information from the second user, the set of feedback information being associated with an element of the one or more elements of the assessment record; and store the set of feedback information from the second user in association with the assessment record at a database.

The memory of the system can further include instructions executable by the processor to: display, at a display device of the first XR device of the first user, the extended reality learning environment including the assessment module having first viewable information displayed thereon and viewable from a perspective of a first avatar representation of the first user; and store, at the database, the assessment record indicative of one or more interactions between the first user and the assessment module, the assessment record including one or more user responses received at the one or more input fields of the assessment module.

The memory of the system can further include instructions executable by the processor to facilitate a communication session between the first user and the second user within the extended reality learning environment, where the set of feedback information is received from the second user during the communication session.

The memory of the system can further include instructions executable by the processor to display, at the first XR device of the first user, the extended reality learning environment including the assessment record and the feedback information. In one aspect, the assessment record includes a viewable representation of a past avatar of the first user, where the assessment record and the set of feedback information are displayed to the second user from a perspective of a current avatar of the second user. The assessment recording and/or the set of feedback information can include one or more 2-D objects or 3-D objects viewable by the first user and/or the second user within the extended reality learning environment. The one or more 2-D objects or 3-D objects can include an information board for display of first viewable information of the assessment module and/or for display of one or more elements of the set of feedback information. The assessment record can also include a position and a spatial orientation of a first avatar representation of the first user interacting with the assessment module within the extended reality learning environment. The set of feedback information can include a position and a spatial orientation of a second avatar representation of the second user interacting with the assessment record within the extended reality learning environment.

The memory of the system can further include instructions executable by the processor to: capture, at an audio input device of the second user, audio data from the second user for inclusion within the set of feedback information; capture video data displayed at the display device of the second user during for inclusion within the set of feedback information; and capture, at an orientation measurement device of the second user, orientation data and/or inertial measurement data for inclusion within the set of feedback information. The orientation data can include head-tracking data and/or hand-tracking data.

The memory of the system can further include instructions executable by the processor to: display, at the display device of the first user and/or the second user, a 2-D object or a 3-D object having a first configuration; receive a manipulating input from the first user and/or the second user that modifies a state of the 2-D object or the 3-D object to a second configuration; and store the second configuration of the 2-D object or the 3-D object at the database.

In a further aspect, the present disclosure outlines a method for administration of an assessment module within an extended reality learning environment, comprising: displaying, at a first display device of a first XR device of a first user, an extended reality learning environment including an assessment module having first viewable information displayed thereon and viewable by a first avatar representation of the first user, the assessment module including one or more input fields for receipt of response information from an input device in communication with the first XR device of the first user; storing, at a database in communication with the first XR device, an assessment record indicative of one or more interactions between the first user and the assessment module, the assessment record including one or more user responses received at the one or more input fields of the assessment module; displaying, at a display device of a second user, one or more elements of the assessment record; storing a set of feedback information from the second user at a database, the set of feedback information being associated with an element of the one or more elements of the assessment record; and displaying, at the first XR device of the first user, the extended reality learning environment including the assessment module, the element of the assessment record, and the feedback information.

The method can further include: generating, at the database, a link object associating the set of feedback information with the element of the assessment record; displaying, at the first XR device of the first user, the extended reality learning environment including the assessment module, the element of the assessment record, and the link object; and displaying, at the first XR device of the first user, the first set of feedback information following an interaction between the first avatar representation of the first user and the link object.

The method can further include: facilitating a communication session within the extended reality learning environment between the first user and the second user; displaying, at the first XR device of the first user, the extended reality learning environment including a second avatar of the second user; displaying, at the second XR device of the first user, the extended reality learning environment including the first avatar representation of the first user; and displaying, at the first XR device of the first user and at the second XR device of the second user, the extended reality learning environment including the one or more elements of the assessment record and the assessment module. In one aspect, the assessment module is associated with one or more 2-D objects or 3-D objects viewable within the extended reality learning environment at the extended reality display device of the first user. Further, the one or more 2-D objects or 3-D objects can include an information board for display of the first viewable information and the one or more input fields of the assessment module.

The method can further include: capturing, at an audio input device in communication with the first XR device of the first user, first audio data captured during administration of the assessment module for inclusion within the assessment record; capturing video data displayed at the first XR device of the first user during administration of the assessment module for inclusion within the assessment record; and capturing, at an orientation measurement device in communication with the first XR device of the first user, first orientation data captured during administration of the assessment module and/or first inertial measurement data during administration of the assessment module.

The method can further include: displaying, at the first XR device, a 2-D object or a 3-D object having a first configuration; receiving, at the first XR device, a manipulating input that modifies a state of the 2-D object or the 3-D object to a second configuration; and storing the second configuration of the 2-D object or the 3-D object at the database. The second configuration of the 2-D object or the 3-D object can be stored at the database as a user response of the one or more user responses received at the one or more input fields of the assessment module. Further, the second configuration of the 2-D object or the 3-D object can be compared with a set of grading criteria associated with the assessment module.

The method can further include: extracting one or more aspects of the assessment record; comparing the one or more aspects of the assessment record as extracted with a set of grading criteria; and annotating the assessment record based on comparison of the one or more aspects of the assessment record. Extracting one or more concepts of the assessment record can include applying a natural language processing methodology to the assessment record to extract natural language concepts of the assessment record.

In one aspect, the first avatar representation of the first user is a past avatar associated with a previous time, in which the method further includes displaying, at the first XR device of the first user, the assessment record within the extended reality learning environment including the past avatar of the first user from a perspective of a current avatar of the first user, the current avatar being associated with a current time.

BRIEF DESCRIPTION OF THE DRAWINGS

FIG. 3E is an illustration showing an example room for facilitating assessment within an XR learning environment where a user can traverse around the room between stations according to one embodiment of the invention;

FIG. 9 is a simplified block diagram showing post-assessment processing of the assessment record including generation of post-assessment annotation data according to one embodiment of the invention;

FIG. 10B is an illustration showing an example template sequence of steps included in grading criteria for the sub-assessment module according to one embodiment of the invention;

FIG. 10C is an illustration showing an example extracted sequence of steps received from the user for the sub-assessment module and comparison of the extracted sequence with the template sequence of FIG. 10B according to one embodiment of the invention;

FIG. 10D is an illustration showing example post-assessment annotation data following sequence comparison for the sub-assessment module according to one embodiment of the invention;

FIG. 20A is an illustration showing an example data diagram associated with an assessment module including an assessment record and associated branching points for feedback and linked learning materials according to one embodiment of the invention;

FIG. 20B is an illustration showing an example data diagram associated with learning materials that have been linked to an assessment record according to one embodiment of the invention;

DETAILED DESCRIPTION

Figure 1:
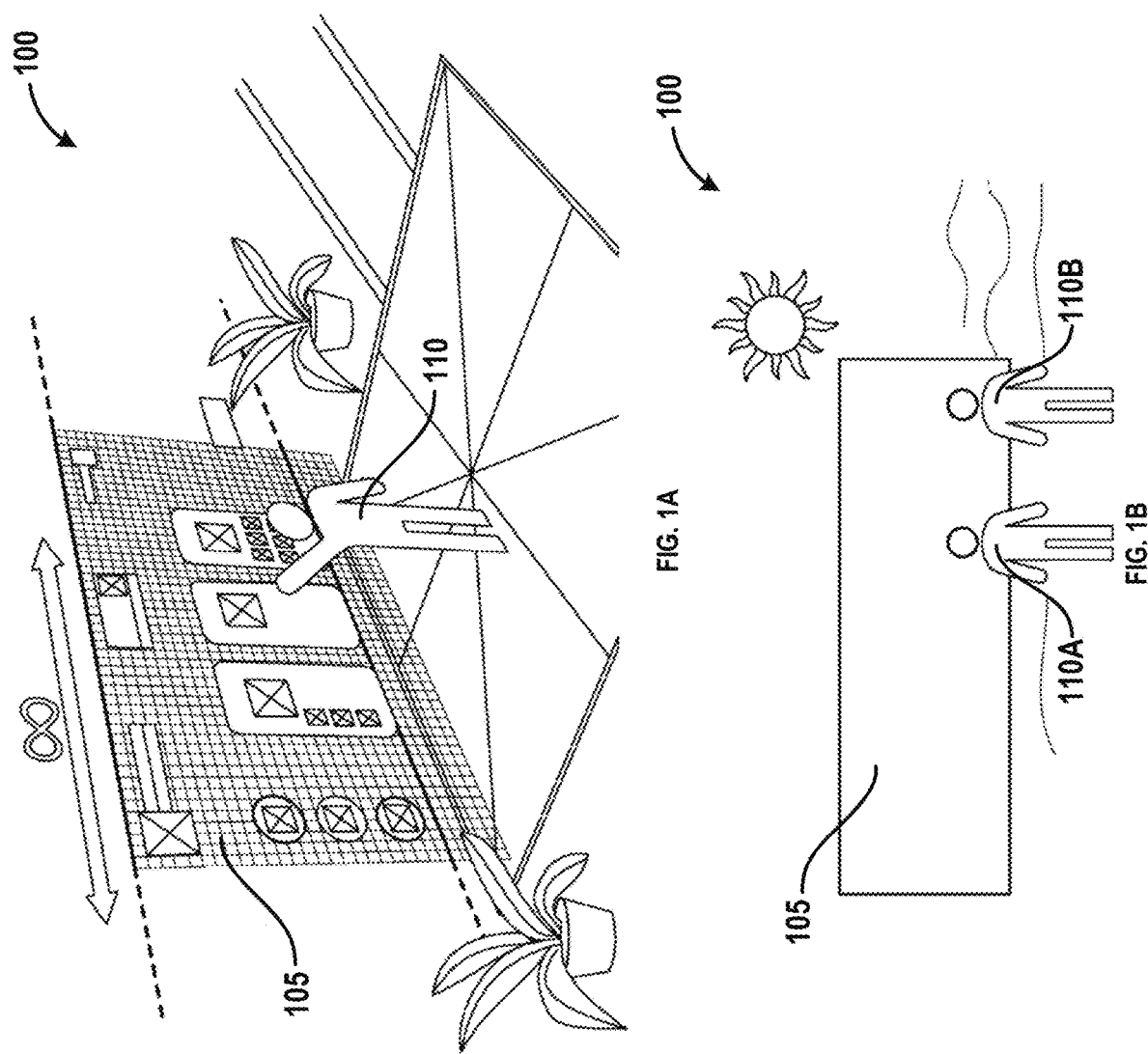
FIG. 1A is an illustration showing an extended reality (XR) learning environment including an avatar of a user and a display according to one embodiment of the invention.
FIG. 1B is an illustration showing another XR learning environment including a first avatar of a first user, a second avatar of a second user, and a display object according to one embodiment of the invention.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

In various embodiments, methods and systems of the invention are preferably implemented through development tools for the Oculus/Meta Quest platform (Oculus Platform SDK) by Oculus VR (Irvine, Calif.) (parent company Meta). It will be appreciated that the systems and methods, including related displays, user interfaces, controls and functionalities, disclosed herein may be similarly implemented on other VR or extended reality (XR) platforms with other VR SDKs and software development tools known to VR developers.

Corresponding reference characters indicate corresponding elements among the view of the drawings. The headings used in the figures do not limit the scope of the claims.

ELEMENTS LIST

| Element Number | Description |
|---|---|
| 100 | XR learning environment |
| 105 | Virtual testing environment |
| 110 (110A, 110B) | Avatar representation |
| 200 | XR assessment system |
| 201 | XR server |
| 203 | Database |
| 220 | XR device |
| 220A | First XR device |
| 220B | Second XR device |
| 220C | Third XR device |
| 220n | Nth XR device |
| 221 | XR Input device |
| 222 | XR Audio Input Device |
| 224 | XR Orientation Measurement Device |
| 226 | XR Image Capture Device |
| 228 | XR Display Device |
| 310 | Parameters palette |
| 320 | Parameters feedback message |
| 340 | Desk |
| 350A-350C | Learning Stations |
| 366 | Movement Path |
| 400 | Curriculum unit |
| 401 | Lesson One |
| 402 | Lesson Two |
| 410 | Assessment Module |
| 415 | Sub-Assessment Module |
| 420 | Assessment Object |
| 425 | Grading Criteria |
| 428 | Assessment Parameters |
| 430 | Sub-Assessment Record |
| 435 | Full Assessment Record |
| 437 | Individualized Full Assessment Composite Record |
| 440 | Grade |
| 450 | Branching Point |
| 460 | Feedback |
| 470 | Learning Materials |
| 525 | Assessment Module Viewable Information |
| 530 | Assessment Module Input Fields |
| 550 | Assessment Record Captured Audio |
| 555 | Assessment Record Captured Spatial Orientation |
| 560 | Assessment Record Inputs Received to Assessment Module Input Fields |
| 565 | Captured Object Data |
| 570 | Captured Operating Data from XR Devices |
| 600 | Information Board |
| 605 | Information Board Segments |
| 810 | Flag Button |
| 915 | Template Sequences |
| 925 | Grading Data |
| 930 | Captured Sequences |
| 935 | Flags |
| 950 | Post-Assessment Annotation Data |
| 1010 | Answer Key |
| 1020 | Handwritten Information |
| 1022 | Converted Text |
| 1100 | Assessment Record Timeline |
| 1105 | System-Generated Flag |
| 1110 | System Flag contextual information |
| 1200 | Main Assessment Recording Branch |
| 1210 | First Feedback Recording Branch |
| 1220 | Second Feedback Recording Branch |
| 1230 | Third Feedback Recording Branch |
| 1240 | Fourth Feedback Recording Branch |
| 1300 | Feedback Information |
| 1310 | Link Object/Branching Point |
| 1320 | Captured Feedback Audio and Video |
| 1325 | Captured Spatial Orientations |
| 1330 | Captured Feedback Input Received at Input Fields |
| 1340 | Captured Feedback Object Data |
| 1350 | Captured Feedback Operating Data from XR Devices |
| 1470 | Current Avatar |
| 1475 | Past Avatar |
| 1480 | Tutor Avatar |
| 1600 | Virtual Tablet |
| 1605 | Feedback control input |
| 1620 | Branching Point Designating Feedback Available |
| 1705 | First User Scratch Paper |
| 1710 | Second User Feedback Document/Scratch Paper |
| 1715 | Recording Playback Controls |
| 1717 | Flagged Moments |
| 1780 | Tutor Notes |
| 1805 | Student Past Avatar |
| 1810 | Tutor Past Avatar |
| 1815 | Current User Avatar (FIG. 18A) |
| 1890 | First user (current avatar) (FIG. 18C) |
| 1892 | First user (past avatar) (FIG. 18C) |
| 1894 | Second user (past avatar) (FIG. 18C) |
| 1896 | Third user current or past avatar (FIG. 18C) |
| 1910 | Embedded learning material selection interface |
| 1920 | "Follow" selection interface |
| 2000 | Assessment Record (FIG. 20) |
| 2005 | Branch n (FIG. 20) |
| 2010 | Linked Lesson Recording 2010 |
| 2110 | Network Interface |
| 2120 | Processor |
| 2140 | Memory |
| 2142 | Operating System |
| 2145 | Data Structures |
| 2150 | Bus |
| 2160 | Power Supply |
| 2170 | Display |
| 2180 | Input Device |
| 2190 | XR Assessment Processes/Services |
| 2200 | Neural Network Architecture |
| 2201 | Neural Network Descriptions |
| 2202 | Input Layer |
| 2204 | Hidden Layer(s) |
| 2206 | Output Layer(s) |
| 2208 | Node(s) |
| 2210 | Neural Network |
| 2230 | Engine Model |
| 2300 | Exam Mode Process |
| 2301 | Step - Activate Exam Mode |
| 2310 | Step - "Do Not Disturb Mode" |
| 2320 | Step - Report Battery Life |
| 2330 | Step - Activate Camera(s) |
| 2340 | Step - Activate Microphone(s) |
| 2350 | Step - Deactivate Unapproved Features |
| 2360 | Step - Facilitate Assessment Module |
| 2400 | Process to Create Assessment Record |
| 2410 | Step - Display Assessment Module Materials |
| 2420 | Step - Capture User's Assessment Interactions |
| 2430 | Step - Receive input to input field(s) |
| 2440 | Step - Store Assessment Record/Recording |
| 2450 | Step - Present Assessment Recording |
| 2500 | Process - Compare User's Input to Grading Criteria |
| 2510 | Step - Apply Pre-processing method to assessed user's input of an assessment record |
| 2520 | Step - Compare input with grading criteria |
| 2530 | Step - Update assessment records based on grading criteria results |

ELEMENTS LIST

| Element Number | Description |
|---|---|
| 2540 | Step - Store updated assessment record in association with assessment module |
| 2600 | Process - Compare Extracted User's Sequence Inputs to Grading Criteria |
| 2610 | Step - Apply Pre-processing method to assessed user's input of sequence-based response to an assessment record |
| 2620 | Step - Extract Sequence steps input by assessed user |
| 2630 | Step - Compare extracted sequence steps with template sequence steps of assessment module |
| 2640 | Step - Update assessment record based on sequences input and grading criteria applicable to comparison with template sequence steps |
| 2650 | Step - Store updated assessment record in association with assessment module |
| 2700 | Process - Hint Generation based on User Inputs |
| 2710 | Step - Monitor and capture inputs within assessment record in real-time during administration of assessment module |
| 2720 | Step - Extract Sequence steps input by assessed user |
| 2730 | Step - Compare extracted sequence steps with template sequence steps of assessment module |
| 2740 | Step - Generate hint information based on comparison results |
| 2750 | Step - Display hint at XR device |
| 2800 | Process - Feedback to Assessment Record |
| 2810 | Step - Display Assessment Recording to Second User |
| 2820 | Step - Receive Feedback Information from Second User |
| 2830 | Step - Capture Feedback Interactions of Second User |
| 2840 | Step - Associate Feedback Interactions of the Second User with the Assessment Module and the Assessment Record of the First User |
| 2850 | Step - Store Feedback Information and Feedback Interactions of Second User at a Database |
| 2860 | Step - Display Feedback and Feedback Interactions of Second User as a Feedback Recording at an XR Reality Device of the First User |

XR Learning Environment

Various embodiments of a system and associated methods for assessment of student progress and providing feedback in an Extended Reality (XR) learning environment are disclosed herein.

Figure 2:
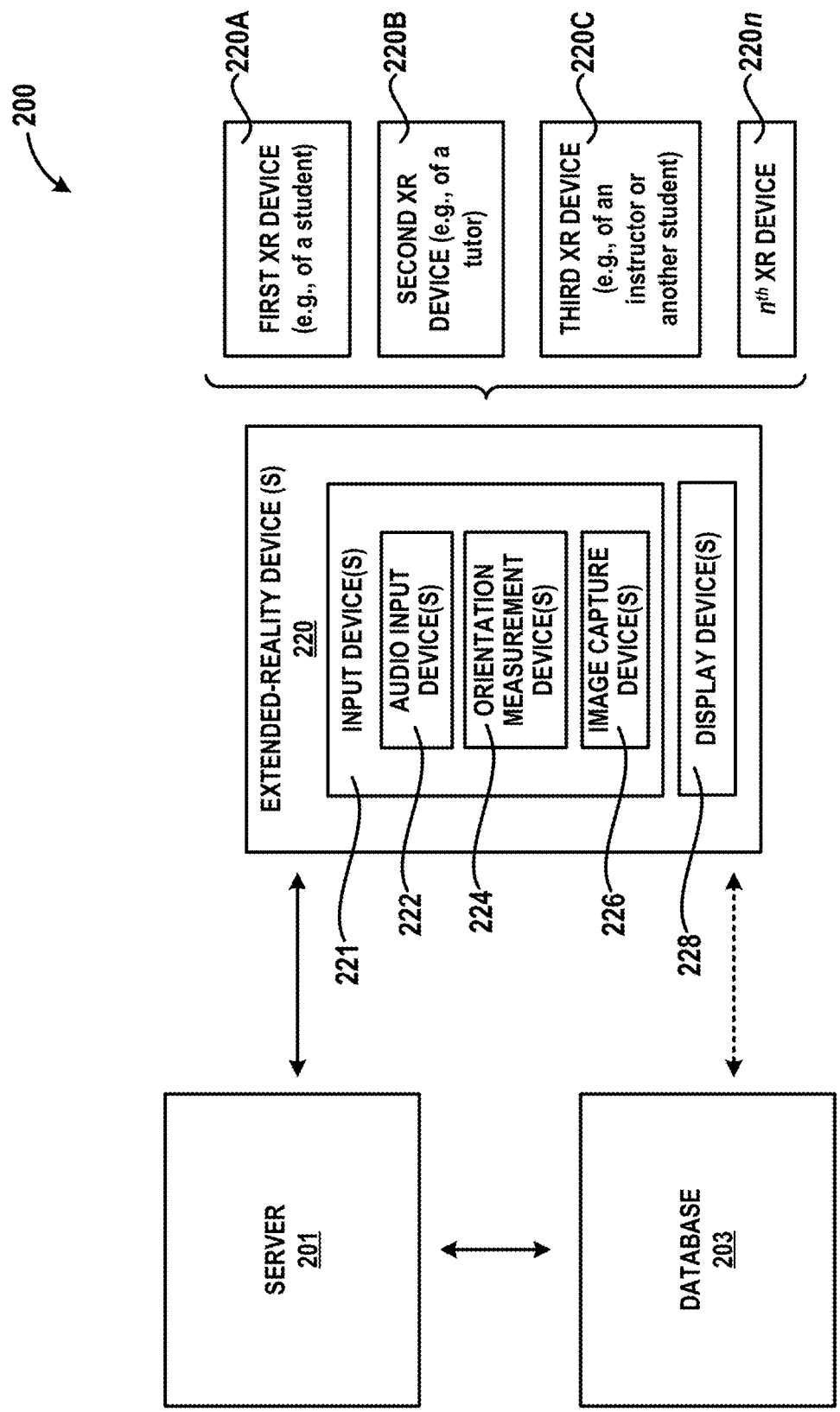
FIG. 2 is a simplified block diagram showing a general system for facilitating assessment within an XR learning environment according to one embodiment of the invention.

With reference to FIGS. 1A-2, an XR learning environment 100 includes a virtual testing environment 105 viewable by respective avatar representations 110 of one or more users. FIG. 2 shows an XR assessment system (hereinafter, "system 200") for implementation of the XR learning environment, including an XR server 201 accessible by a plurality of XR devices 220 (e.g., a first XR device 220A of a first user such as a student, a second XR device 220B of a second user such as a tutor, a third XR device 220C of a third user such as an instructor . . . an n$^{th}$ XR device 220n belonging to another user, etc.) and another suitable computing devices with which a user can participate in the XR learning environment. The system includes a database 203 communicatively coupled to the XR server 201 wherein the system 200 can display an assessment module for administration to the user, and can generate an assessment record for the user during administration of the assessment module.

XR devices 220 includes components as input devices 221, such as audio input devices 222, orientation measurement devices 224, image capture devices 226 and XR display devices 228, such as headset display devices.

The XR learning environment 100 can also facilitate a synchronous or asynchronous review session between two or more users and can provide portions of the assessment record to the two or more users for viewing and interaction during the synchronous or asynchronous review session.

In one aspect, the XR learning environment 100 can include one or more "avatar" representations 110A and 110B (FIG. 1B) of each respective user of a plurality of users. For instance, an instructor, student, tutor or observer can represent themselves within the XR learning environment 100 using a personalized avatar. In some embodiments, a user can view the XR learning environment 100 from a first-person perspective of their associated avatar. In some implementations as will be discussed in greater detail herein, the user can view the XR learning environment 100 including their own avatar (past or present) from a third-person perspective.

Facilitating Assessment within an XR Learning Environment

Figure 3A:
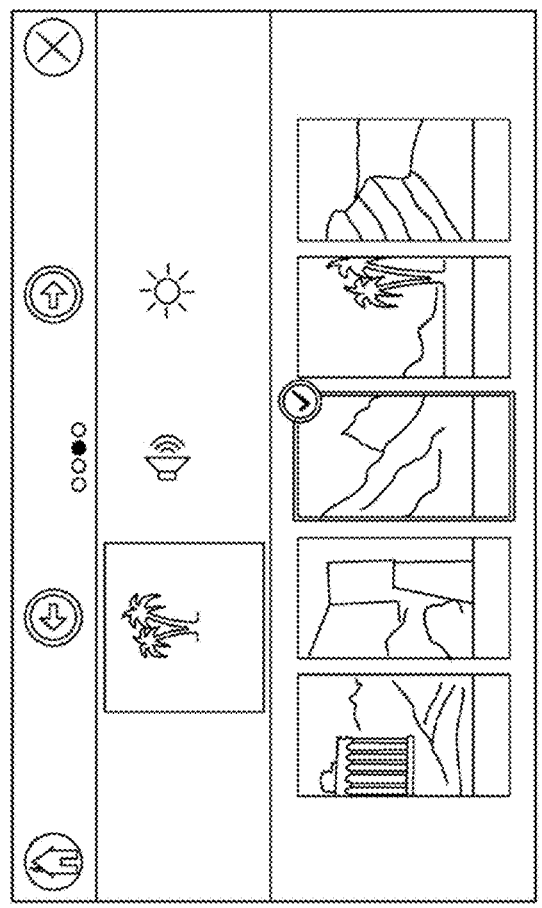
FIG. 3A is an illustration showing an example user interface for display at an extended reality device showing options to set parameters of a room of the XR learning environment according to one embodiment of the invention.
Figure 3B:
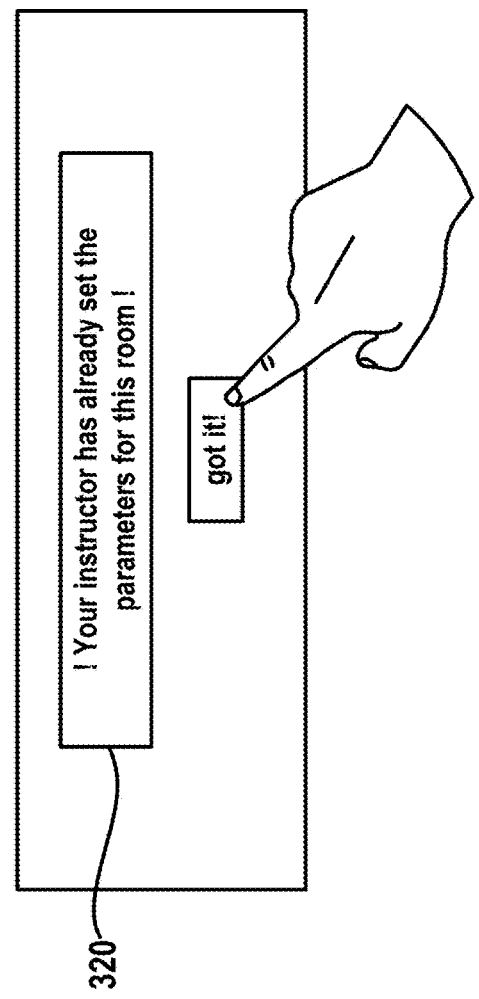
FIG. 3B is an illustration showing an example user interface informing a user that an instructor has already set parameters of a room of the XR learning environment according to one embodiment of the invention.

Referring to FIGS. 1A-2, and with additional reference to FIGS. 3A-3E, in an XR learning environment 100 of the present disclosure, the XR learning environment 100 can be a 3-D virtual representation of a 3-dimensional room in which a user can view at an XR display device 228 from the perspective of an avatar representation of the one or more "avatar" representations 110 associated with the user. The avatar can be one of many objects positioned and/or movable within the virtual testing environment. Parameters of the XR learning environment 100 can be set by a user such as a student, tutor, instructor, or administrator, as shown in FIGS. 3A and 3B. FIG. 3A shows an example parameters palette 310 that may be displayed to a user within the XR learning environment 100, and FIG. 3B shows an example parameters feedback message 320 that may be displayed to a user informing the user that an instructor has already set parameters for the XR learning environment 100.

Figure 3C:
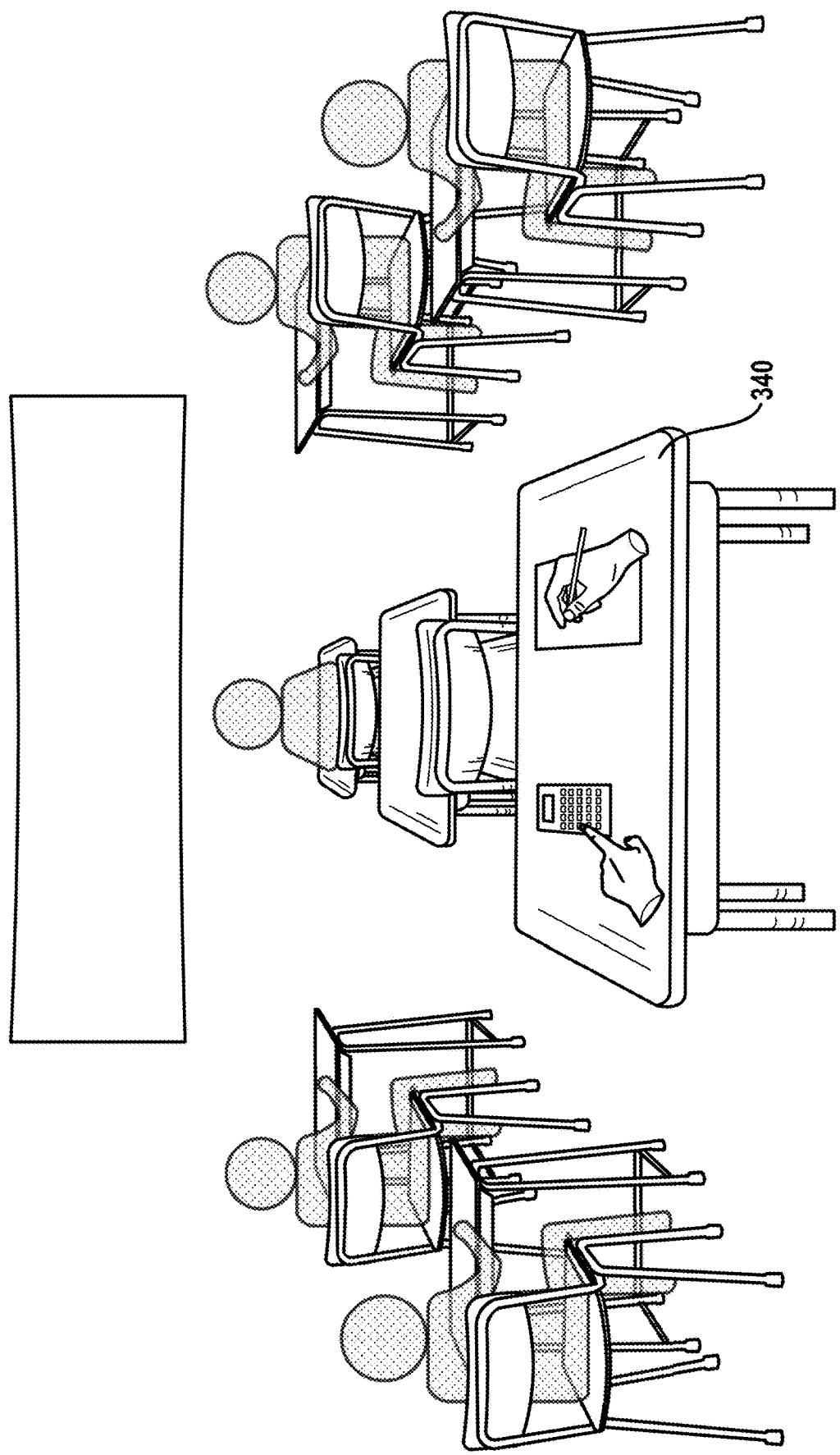
FIG. 3C is an illustration showing an example room for facilitating assessment within an XR learning environment where other avatars of other users are visible according to one embodiment of the invention.
Figure 3D:
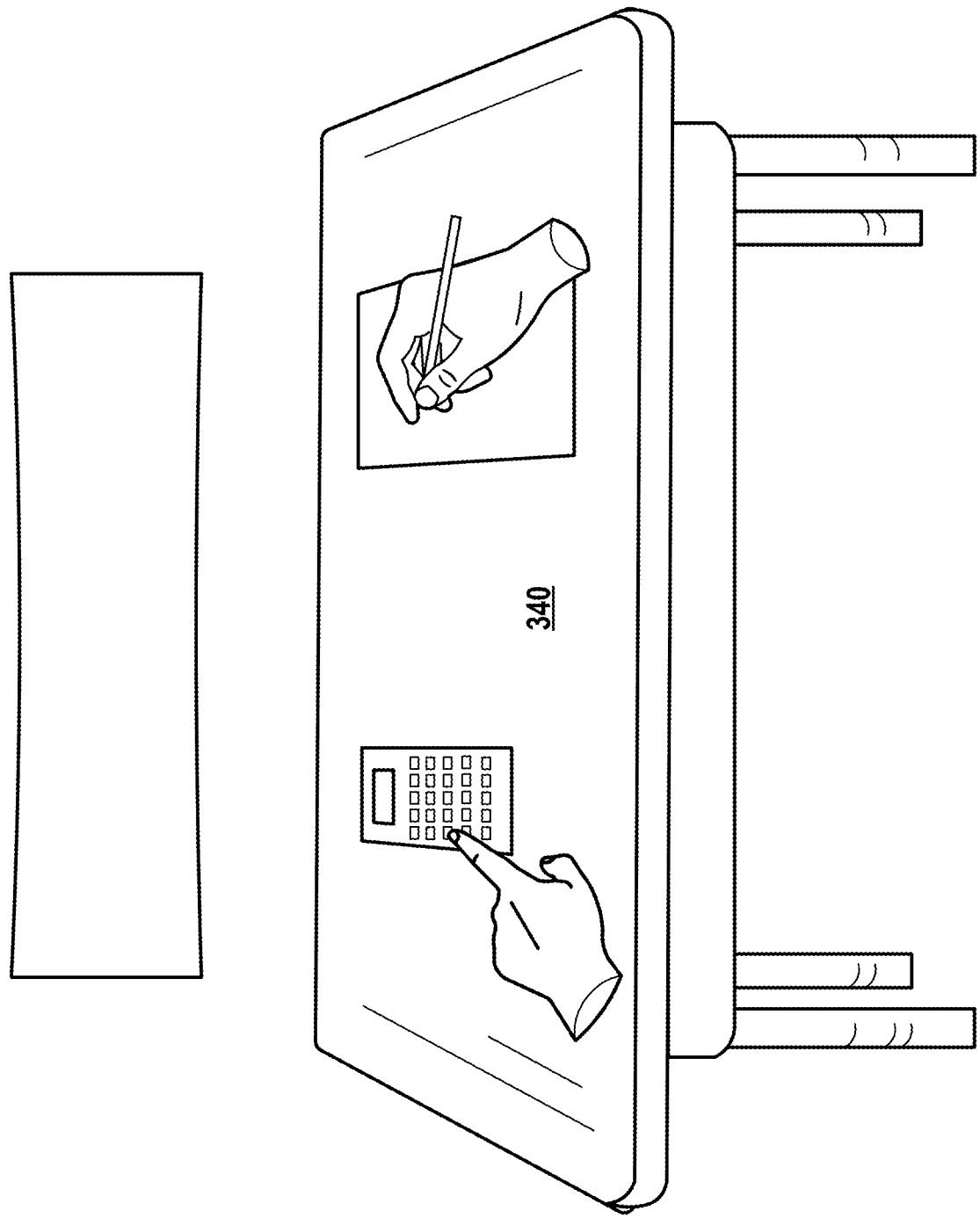
FIG. 3D is an illustration showing an example room for facilitating assessment within an XR learning environment where no other avatars of other users are visible according to one embodiment of the invention.

For example, the XR learning environment 100 can be a virtual representation of a familiar environment such as a classroom, a tutoring room, or another suitable learning environment with a virtual desk 340 shown in FIGS. 3C and 3D. In other embodiments, the XR learning environment can be a virtual representation of a location such as a football field, a stage for musical performances, a natural environment, a structure of significance, or another suitable virtual location. In another aspect, the XR learning environment can include a virtual re-creation of a recorded event such as a football game or live musical performance; in this manner, an instructor and their students can demonstrate, review, and discuss aspects of the recorded event within the XR learning environment 100. The XR learning environment 100 can also be a seemingly infinite room with color schemes and background themes that can be selected and configured by a user. In some embodiments, as shown in FIG. 3E, the XR learning environment 100 can enable the user to traverse the XR learning environment 100 as shown by separate learning stations 350A-350C between which the user, such as the user's avatar, may traverse as depicted by movement path 366.

In one aspect, the system can be operable for facilitating learning sessions within the XR learning environment 100 such as a lecture, a synchronous or asynchronous review session, or for administering an assessment module within a virtual testing environment of the XR learning environment. The virtual testing environment can include various parameters and/or restrictions that prevent students from accessing certain Extended Reality features to ensure a valid administration of the assessment module.

Depending on the needs of the student, the system can present the assessment module to the student within a virtual testing environment modeled within the XR learning environment 100 and accessible by the student. For example, the virtual testing environment 105 can be an individual "testing room" with minimal distractions, a landscape such as a beach or forest, a familiar environment such as the same virtual room used for instruction or a model of a school library, or another suitable testing environment. The virtual testing environment 105 can be configured according to parameters specified by the student, the instructor, and/or the academic institution, depending on the needs of the student and/or depending on the course itself. In some embodiments, a student can select one or more parameters of the virtual testing environment from a set of "approved" testing environment parameters defined by the instructor and/or the academic institution; in a further aspect, a student can change or reconfigure the virtual testing environment during the assessment if such an action is allowed by the instructor and/or the academic institution as shown in the examples of FIGS. 3A and 3B and as described above.

The student can be alone within the virtual testing environment 105 or can alternatively be able to see avatars 110 of other users such as the instructor or other students within the virtual testing environment such as in the example of FIG. 3C. As such, the system can provide students with privacy and minimal distractions within the virtual testing environment without compromising academic integrity, as the system enables instructors to review assessment records and can, in some embodiments, apply one or more anti-cheating protocols.

In other embodiments, such as in scenarios where a student may benefit from productivity strategies such as "body-doubling", the virtual testing environment can include avatars of other users that are also completing the assessment to help the student stay on task. In embodiments where a student may benefit from seeing avatars of other students when completing an assessment, the system may display avatars of other students in real-time but the student may be restricted from interacting with the avatars of other students; in some embodiments, the avatars of other users may be somewhat transparent to resemble "phantoms" of other students to indicate to a user that they cannot interact with the avatars of other students during completion of the assessment. In other examples, such as the example of FIG. 3D, the student can be alone within the virtual testing environment 105 and may only be able to see a virtual desk 340 and one or more assessment objects. Access to certain Extended Reality features may be restricted when the student is in the virtual testing environment.

In other embodiments, the system can allow a student to stand, walk or otherwise move around within the virtual testing environment to complete the assessment as shown in the example of FIG. 3E. This can allow some students to pace while they think, and walk around as they please during the assessment without distracting other students. In some embodiments, the student can use an information board to complete the assessment; the assessment records can include student interactions with the information board. In other examples, the assessment module may be set up as one or more "stations" within a virtual room that the student can traverse during administration of the assessment module. One use case may be for assessments such as anatomy practical exams, where the one or more assessment objects can include a plurality of 3-D models of various bodily structures placed at various points around the virtual testing environment and the student must view each 3-D model to identify a name and/or function of the associated bodily structure.

Figure 4:
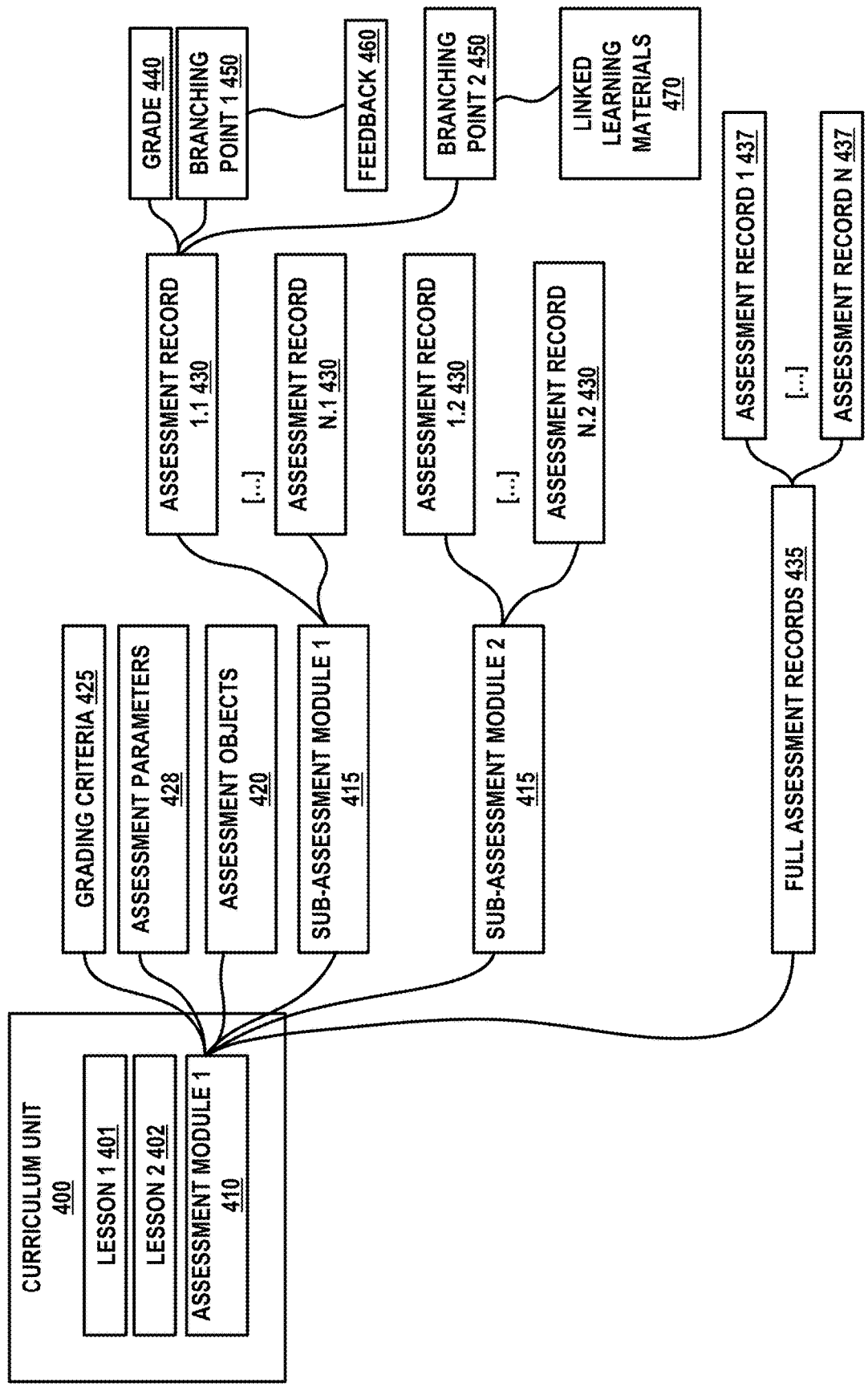
FIG. 4 is an example data diagram showing an assessment module and associated assessment objects, sub-assessment modules, resultant assessment records, and branching points according to one embodiment of the invention.

With reference to FIG. 4, the XR learning environment 100 facilitated by the system 200 can include viewable curriculum information represented within the database 203 including but not limited to an assessment module 410 associated with a curriculum unit 400 that includes lessons, such as lesson one 401 and lesson two 402 of the unit 400. Assessment objects 420 of the assessment module 410 include document objects and lesson objects such as lecture slides, textbook sections, notes outlines, and the like. The viewable curriculum information can include one or more assessment modules in which a student must demonstrate knowledge and/or execution of a learning concept for grading by the instructor.

FIG. 4 shows an example data diagram with various modules and objects that may be represented within a given curriculum unit 400. A student's understanding of lessons 401 and 402 for unit 400 can be assessed through an assessment module 410. Grading criteria 425, assessment parameters 428 and assessment objects 420 are, in some embodiments, associated with a sub-assessment module 415, such as a sub-set of questions, to evaluate a student in the XR environment with respect to the unit lessons 401 and 402. An assessment record 430 is made of the student's response(s) to the assessment objects 420 and results in a grade 440 that may be determined by a teach or tutor viewing the recording 430 or by artificial intelligence programming that uses the grading criteria 425 and assessment parameters 428 for evaluations of the student's performance in the recording 430. In some embodiments, a teacher or tutor may create a branching point 450 (e.g., branching point 1) where the teach or tutor can add a "layer" or new composite recording on such branch that includes feedback 460 to the student about responses and improvement recommendations with respect to a lesson. As shown in FIG. 4, a plurality of sub-assessment modules 415 can be presented for a plurality of lessons pertaining to the curriculum unit 400. Any number of assessment recordings 430 might be made for any sub-assessment module 415 and can result in different branching points 450 (such as branching point 2) for not only feedback 460 in the new branched recording, but also inclusion of linked learning materials 470, such as hyperlinks to online additional information, XR objects, documents, text, media and the like, as added by the teacher, tutor, other students, or any other individual having access to an assessment record 430 and permission to create a branching point and new composite recording with additions. In some embodiments, full assessment recordings 435 can be made without sub-assessment modules, i.e., no sub-groupings or sub-sets of questions/activities being assessed, and individualized full assessment composite recordings 437 can be made. It will be appreciated that each student will preferably have their own (sub-)assessment record 430 or full assessment composite recording 437 and feedback 460 and/or linked learning materials 470 will be individualized to each student based on their own assessment performance, and resulting in individual composite recordings with teaching feedback, materials, links and information specific to each student.

Figure 5:
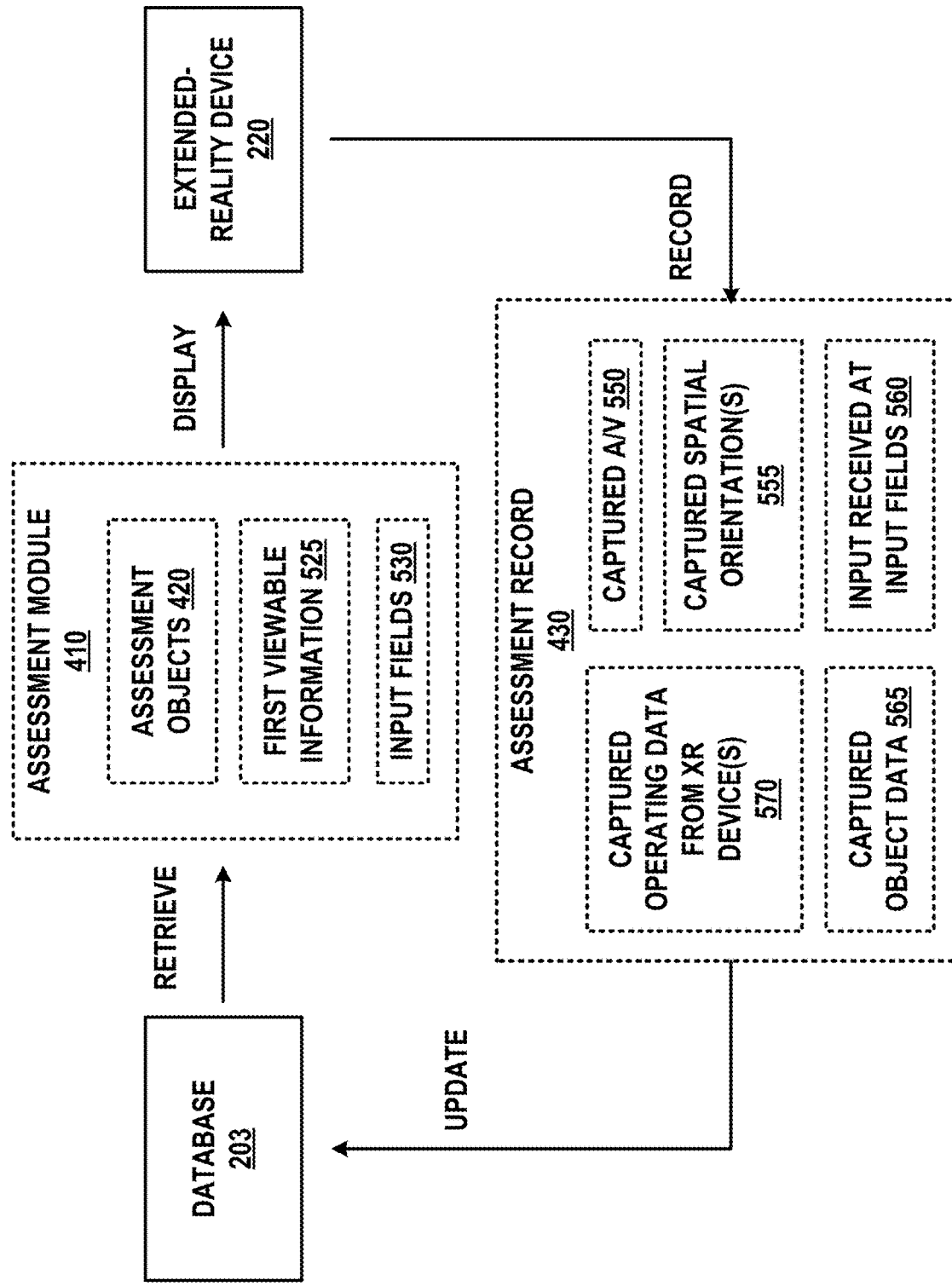
FIG. 5 is a simplified block diagram showing administration of an assessment module at an extended reality device and capture of an assessment record in association with the assessment module according to one embodiment of the invention.

In one aspect, with additional reference to FIG. 5, the system 200 can facilitate administration of an assessment module 410 to one or more students. In particular, the system 200 can retrieve data (which can include data for the assessment module 410 and/or any additional information necessary for administration of the assessment module 410)

from a database 203 and present the assessment module 410 to the student within the XR learning environment 100, where the assessment module 410 can be divided into sub-assessment modules 415; each sub-assessment module 415 can represent one or more questions or directives, or one or more portions of a question or directive to be answered or otherwise completed by the student. The assessment module 410 can include viewable information 525 and input fields 530 for receipt of user responses (e.g., data indicative of student answers and/or actions responsive to the assessment module 410) to conduct assessment of a user relative to a learning topic.

Importantly, the system 200 can also generate the assessment record 430, such as audio recordings, inputs, images and/or video recordings of the assessment activity in the XR environment 100, indicative of one or more interactions of a first user with the assessment module 410, associate the assessment record 430 with the assessment module 410 at the database 203, and store the assessment record 430 at the database 203. The assessment record 430 can be made available for viewing within the XR learning environment 100 by the first user later on, and can optionally be made available for viewing within the XR learning environment 100 to a second user as well such as another student, instructors and tutors.

In embodiments, the assessment record 430 includes one or more aspects of assessment activity of a user provided in response to the assessment module, such as captured audio/video data 550, captured spatial orientations 555, captured inputs 560 received to input fields 530, captured object data 565 received from interaction with assessment objects 420 and captured operating data 570 from an XR device 220.

The system 200 can display, at a first display device of a first XR device (e.g., XR device 220) of a first user, an XR learning environment 100 including the assessment module 410 having first viewable information 525 displayed thereon and viewable by a first avatar representation of the first user, the assessment module 410 including one or more input fields 530 for receipt of response information from an input device in communication with the first XR device (e.g., XR device 220) of the first user. The system 200 can record student responses to each sub-assessment module 415 in more than one modality.

Figure 6A:
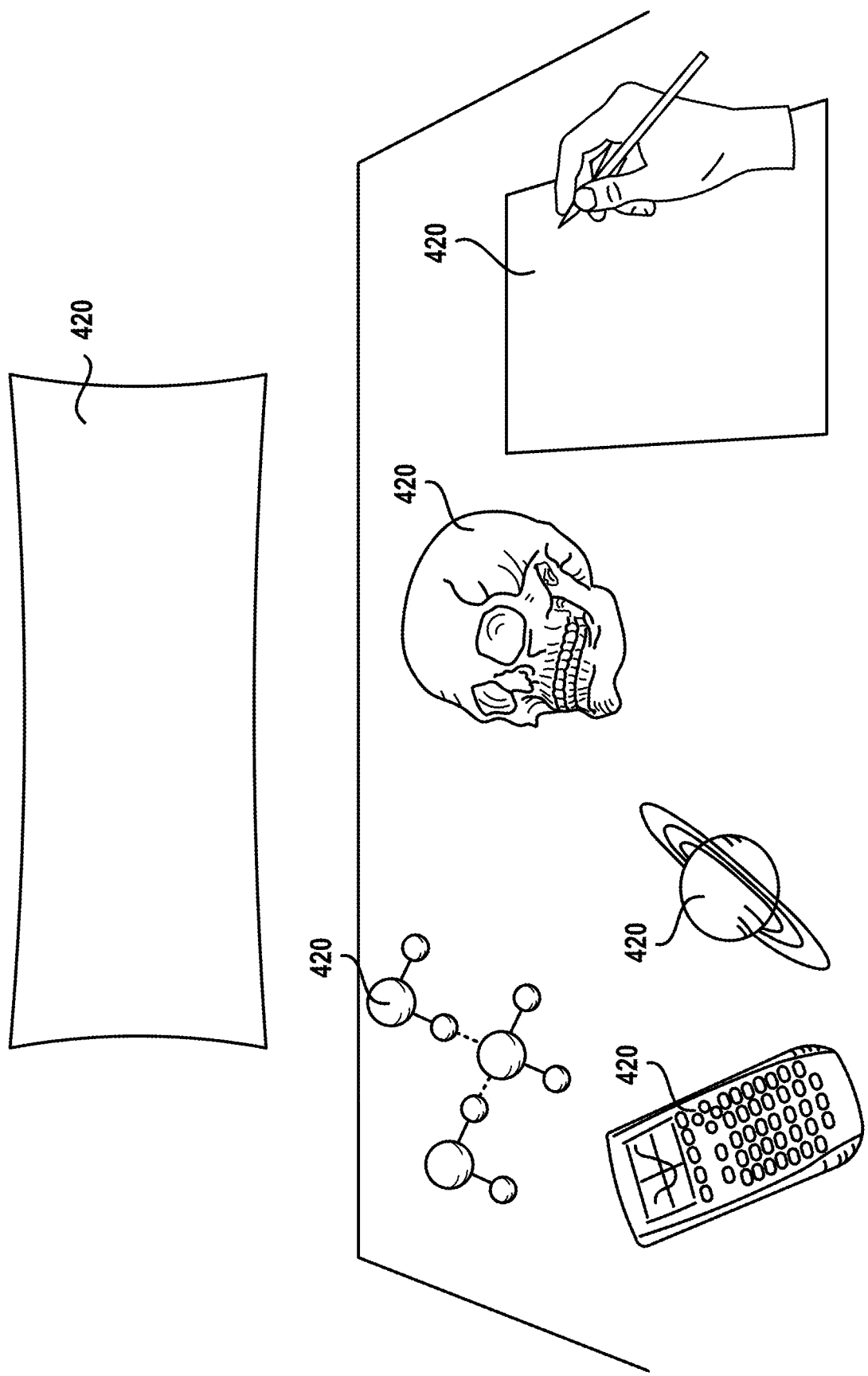
FIG. 6A is an illustration showing an example workspace of a user including a plurality of assessment objects for administration of the assessment module according to one embodiment of the invention.

In some embodiments, the virtual testing environment can include one or more assessment objects 420 of the assessment module 410, where the one or more assessment objects include one or more 2-D objects or 3-D objects viewable within the XR learning environment at the first XR device of the first user as shown in FIG. 6A. The one or more assessment objects 420 can include one or more display objects shown in FIG. 6B for display of the first viewable information within the virtual testing environment, such as a modeled "paper" displayed at a 3-D model of a desk, an information board 600 that include a plurality of segments 605, a mini-board in front of the student, a virtual tablet of the XR learning environment, or through some another modality. In one aspect, the one or more display objects can include an information board for display of the first viewable information and the one or more input fields of the assessment module. In another aspect, the one or more display objects can include a virtual tablet for display of the first viewable information and/or the one or more input fields of the assessment module. In a further aspect, the one or more display objects can include a 3-D model of a desk for display of the first viewable information and/or the one or more input fields of the assessment module. The student may be expected to remain "seated" at the desk, and the desk may correspond with a desk of the student in "real life". One or more assessment objects 420 needed for the assessment can be positioned on the desk, such as a calculator, scratch paper, and other 2-D objects or 3-D objects that the student can use to complete the assessment. In some embodiments, the desk can be a 3-D virtual representation of a desk that is selected by the student or the instructor. For instance, the desk can be a 3-D virtual representation of the student's personal desk at home; in other embodiments, the desk can be suited to the specific type of task or selected by the instructor or student. In one example, the desk can be a 3-D virtual representation of a drafting table. In some embodiments, the student may be able to modify one or more parameters of the desk; for example, the student may be able to modify a width, depth or height of the desk, an angle of a surface of the desk, or a color or texture of the desk. In a further aspect, the one or more display objects can include a 2-D or 3-D models of a paper for display of the first viewable information and/or the one or more input fields of the assessment module; in some embodiments the paper can be positioned along the desk.

In some embodiments, the system may activate an "exam mode" that enables or disables certain Extended Reality features during administration of the assessment module; for instance, the system may prevent students from accessing a "pass-thru" mode of the Extended Reality device. In other embodiments, the system may allow students to access the "pass-thru" mode for safety purposes and can record video obtained during use of the "pass-thru" mode for inclusion within the assessment record to ensure academic integrity. Other aspects of "exam mode" may involve activating cameras and microphones for recording an external environment to ensure academic integrity. In some embodiments, "exam mode" may require the Extended Reality device to broadcast a battery life of the Extended Reality device to the server during facilitation of the assessment module, and can in some embodiments require a minimum battery life prior to facilitation of the assessment module. In some embodiments, the assessment module may be part of a larger educational application of the XR learning environment; in such a case, the system may deactivate unapproved features of the larger educational application to restrict access to these features during facilitation of the assessment module; the system may re-activate or otherwise restore these features upon completion of the assessment module.

As discussed above and as shown in FIGS. 4 and 5, the assessment module can be divided into sub-assessment modules; each sub-assessment module can represent a question or directive, or a portion of a question or directive to be answered by the student. Each sub-assessment module can include first viewable information for display to the student that communicates the question or directive to be answered by the student. As shown, the system can display the first viewable information within the XR learning environment, the first viewable information including one or more media files such as text, an image, an audio snippet, and/or a video. The first viewable information can be displayed at the one or more display objects (FIG. 6B) of the assessment module discussed above such as the paper displayed the desk, the virtual tablet, the information board, the mini-board, or through some another modality. In some embodiments, the first viewable information can be interactive, and can include one or more input fields that the student can interact with to provide their answer. For example, if the first viewable information includes a text-based multiple-choice question, the first viewable information can include text that includes a directive given to the student and the input field can include a multiple-choice input field where a student must input a selection to the multiple-choice input field indicative of their answer. Examples of first viewable information and various input fields are shown in FIGS. 7A-7H.

Figure 6B:
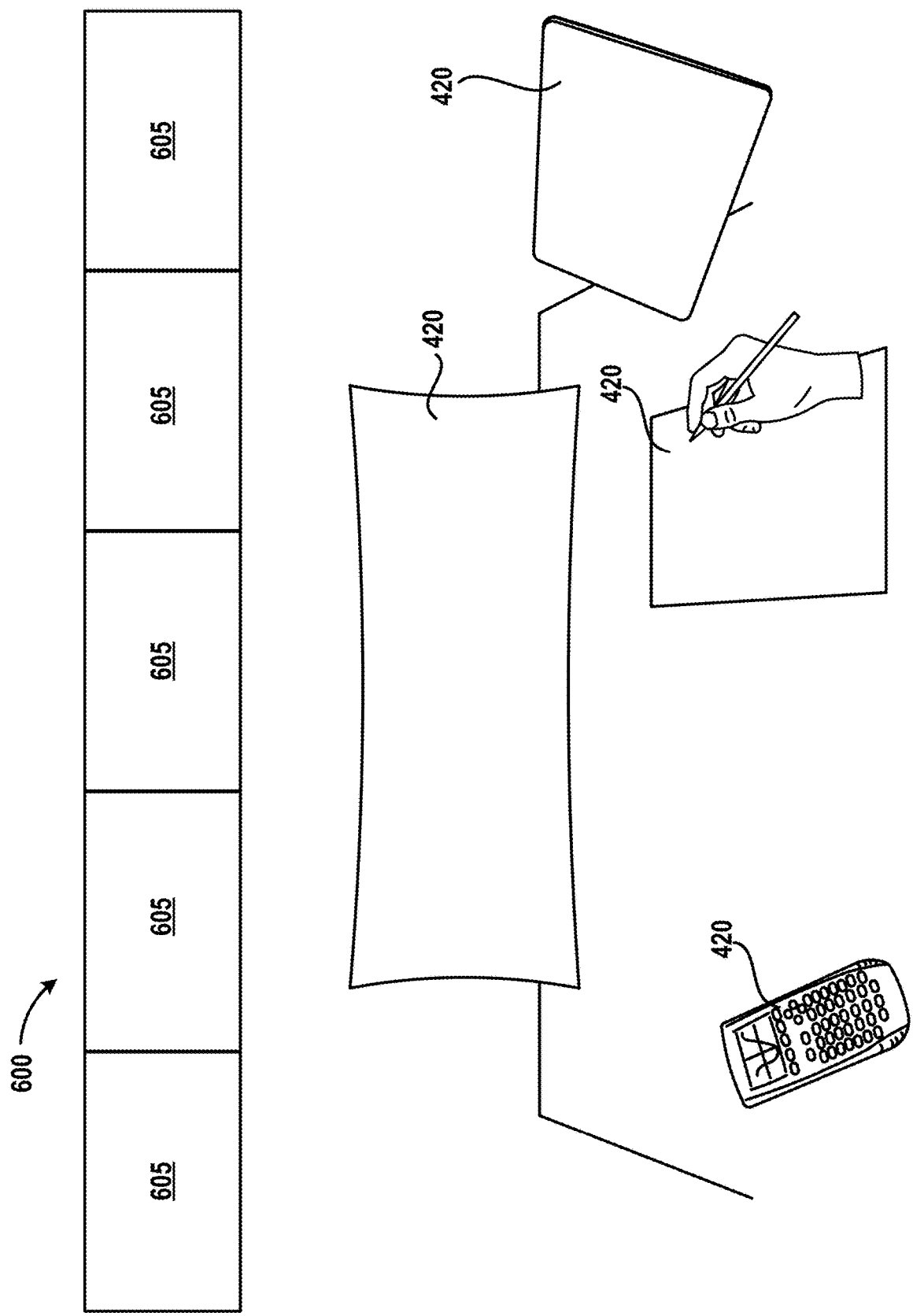
FIG. 6B is an illustration showing an example workspace of a user including a plurality of display objects for displaying various aspects of the assessment module according to one embodiment of the invention.
Figure 7B:
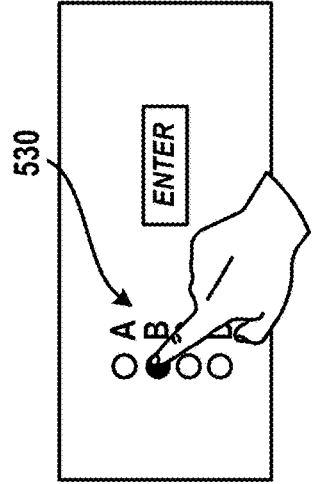
FIG. 7B is an illustration showing an example multiple-choice input field for capture of a user response in association with the assessment module according to one embodiment of the invention.
Figure 7D:
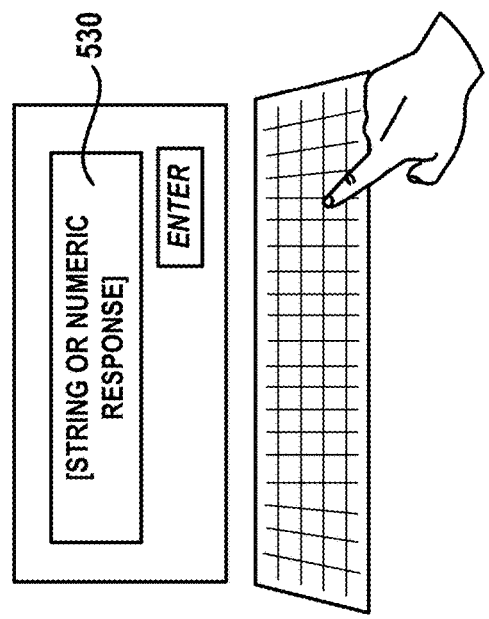
FIG. 7D is an illustration showing an example string or numeric response input field for capture of a user response in association with the assessment module according to one embodiment of the invention.
Figure 7A:
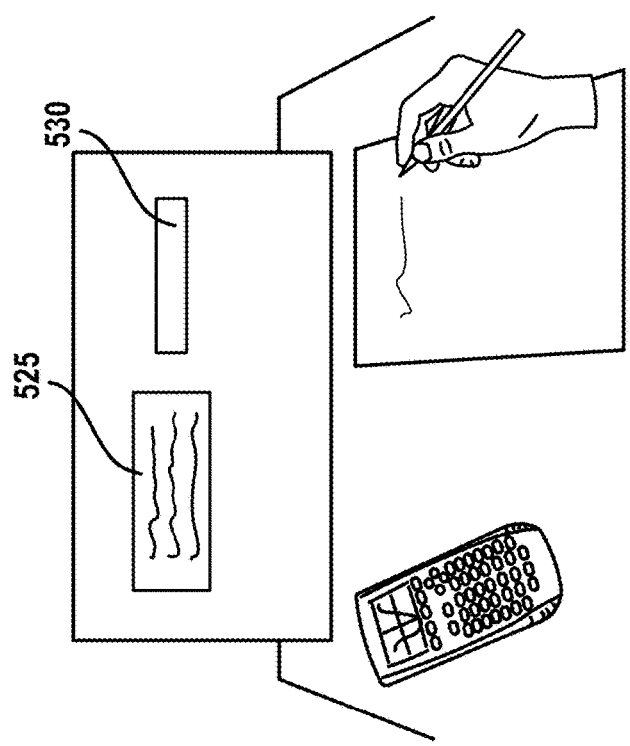
FIG. 7A is an illustration showing display of first viewable information and one or more input fields of the assessment module at the plurality of display objects according to one embodiment of the invention.
Figure 7C:
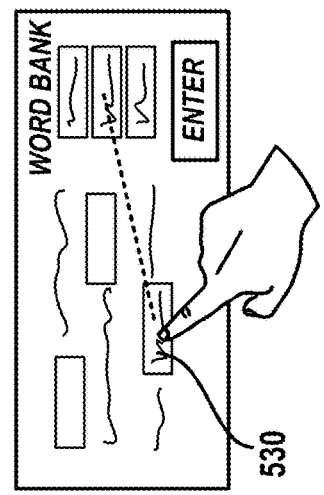
FIG. 7C is an illustration showing an example drag-and-drop input field for capture of a user response in association with the assessment module according to one embodiment of the invention.
Figure 7F:
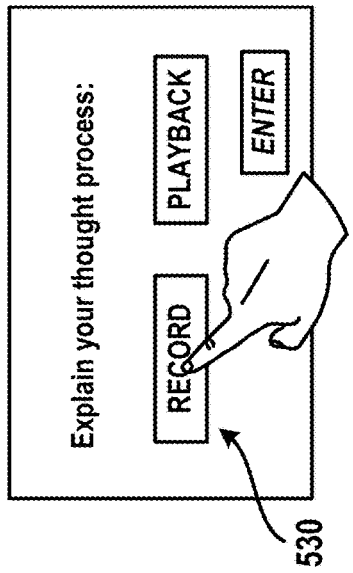
FIG. 7F is an illustration showing an example audio/video input field for capture of a user response in association with the assessment module according to one embodiment of the invention.
Figure 7H:
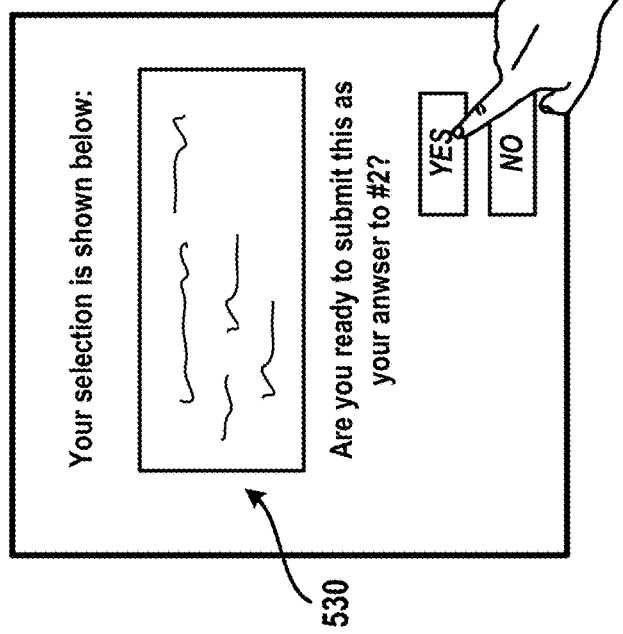
FIG. 7H is an illustration showing an example message displayed to a user requesting confirmation of an answer prior to submission according to one embodiment of the invention.
Figure 7E:
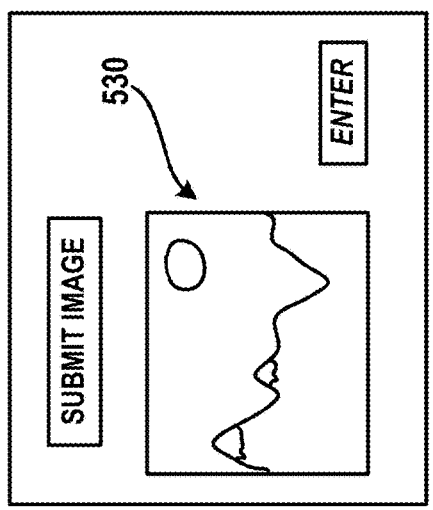
FIG. 7E is an illustration showing an example image submission input field for capture of a user response in association with the assessment module according to one embodiment of the invention.
Figure 7G:
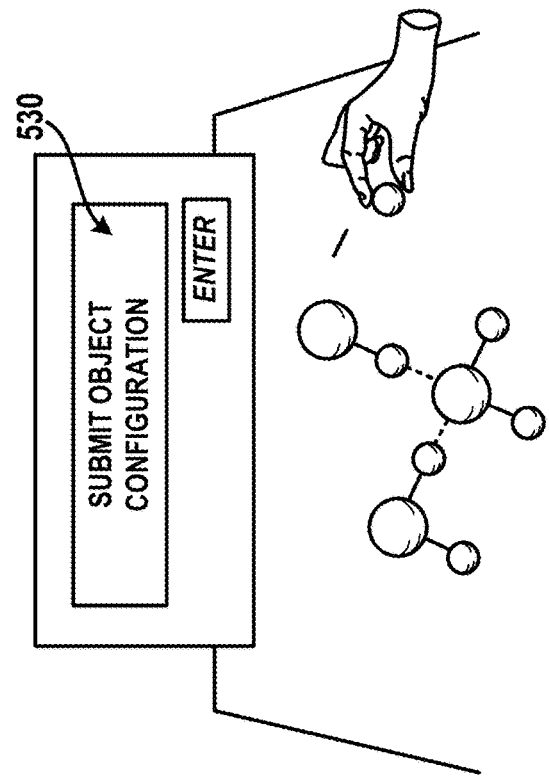
FIG. 7G is an illustration showing an example object configuration input field for capture of a user response in association with the assessment module according to one embodiment of the invention.

In some embodiments, with additional reference to FIGS. 6A and 6B, the assessment module can include the one or more assessment objects for display and/or manipulation by the user during administration of the assessment module. As discussed, the one or more assessment objects can include one or more display objects, such as the assessment module is associated with one or more 2-D objects or 3-D objects viewable within the XR learning environment at the extended reality display device of the first user. The one or more assessment objects can also include 2-D objects or 3-D objects that can pertain to the assessment module, such as graphical representations, modeled molecules, planetary systems, bodily structures, and other educational materials that may be required or that may supplement the assessment module. The one or more assessment items can be interactable within the XR learning environment and can in some embodiments be re-configured from a first configuration to a second configuration by the first user. In some embodiments, a second configuration of one or more assessment items can be saved by the system as part of the assessment record and/or as a student response to the assessment module. In some embodiments, the one or more assessment items can include a tool used to complete the assessment, such as a 2-D model or a 3-D model of a calculator. As such, the system can capture interactions between the first user and with the one or more assessment items as part of the assessment record and/or as a student response to the assessment module, such as a sequence of calculator inputs and/or a sequence of calculator outputs.

In another example, the assessment module can include first viewable information such as text that includes a directive given to the student, an image that may show supplemental information that can be useful to the student, and can also include one or more assessment objects including a 3-D object that the student must manipulate to provide their answer; the one or more input fields in this case can include a final submitted configuration of the 3-D object following manipulation by the student. An example use case can include a chemistry-related question in which the 3-D object is a modeled molecule that the student must manipulate into a specific configuration to demonstrate knowledge. Another example can include "drag-and-drop" input fields with associated first viewable information giving a directive such as completing a sentence with a selection from a word bank for vocabulary-related questions.

In other embodiments, assessment module may make a recording of a user drawing/sketching an object, a recording of the user solving a math problem by one or both of calculator use and by hand, a recording of simulated activity (e.g. piloting or driving), and a visual and/or audio recording of an activity of user (e.g. acting, giving a speech, singing, language). The assessment activity could be based on a request for the user to conduct the activity. The assessment could also be interactive with other users conducting an activity together in an XR environment or with a user interacting with an XR object or objects, including an XR objecting being a virtual person that is implementing activities in the assessment module.

Capturing Assessment Records and Responses

As discussed above with reference to FIGS. 5-6B, when a student interacts with the assessment module 410, the system 200 generates, at the first XR device 220 of the first user, the assessment record 430 indicative of one or more student interactions with the assessment module 410, the assessment record 430 including one or more student responses received at the one or more input fields of the assessment module 410. FIGS. 7A-7H show various examples of first viewable information and various input fields 530 for receipt of the one or more student responses. FIGS. 8A-8D show a walkthrough example of a user completing an assessment module, during which the system captures the assessment record based on inputs 560 to input fields 530 and captured object data 565 from interacting with assessment objects 420. FIG. 9 is a simplified block diagram showing recordation and post-processing of the assessment record.

The one or more inputs 560 received at the one or more input fields 530 of the assessment object 420 can include but are not limited to: a document or media file including second viewable information within the XR learning environment and recorded by the first user in association with the assessment module, a string or a numeric value including second viewable information received at a virtual input device object viewable within the XR learning environment or received at an input device in communication with the first XR device, a modified configuration of the one or more assessment objects associated with the assessment module. The system can record student inputs as second viewable information entered at the one or more input fields 530 in association with the assessment module, and can record a timestamp and data for each student input.

Further, the system can also capture first object data 565, including object positions, spatial orientations 555 and states including display states, of the one or more assessment objects 420 (including the one or more display objects) and the first avatar of the first user within the XR learning environment during administration of the assessment module 410. As such, the assessment record 430 can include the first object data 565 including data pertaining to the first avatar of the first user and the one or more assessment objects 420 including the display objects.

Assessment Example

Figure 8A:
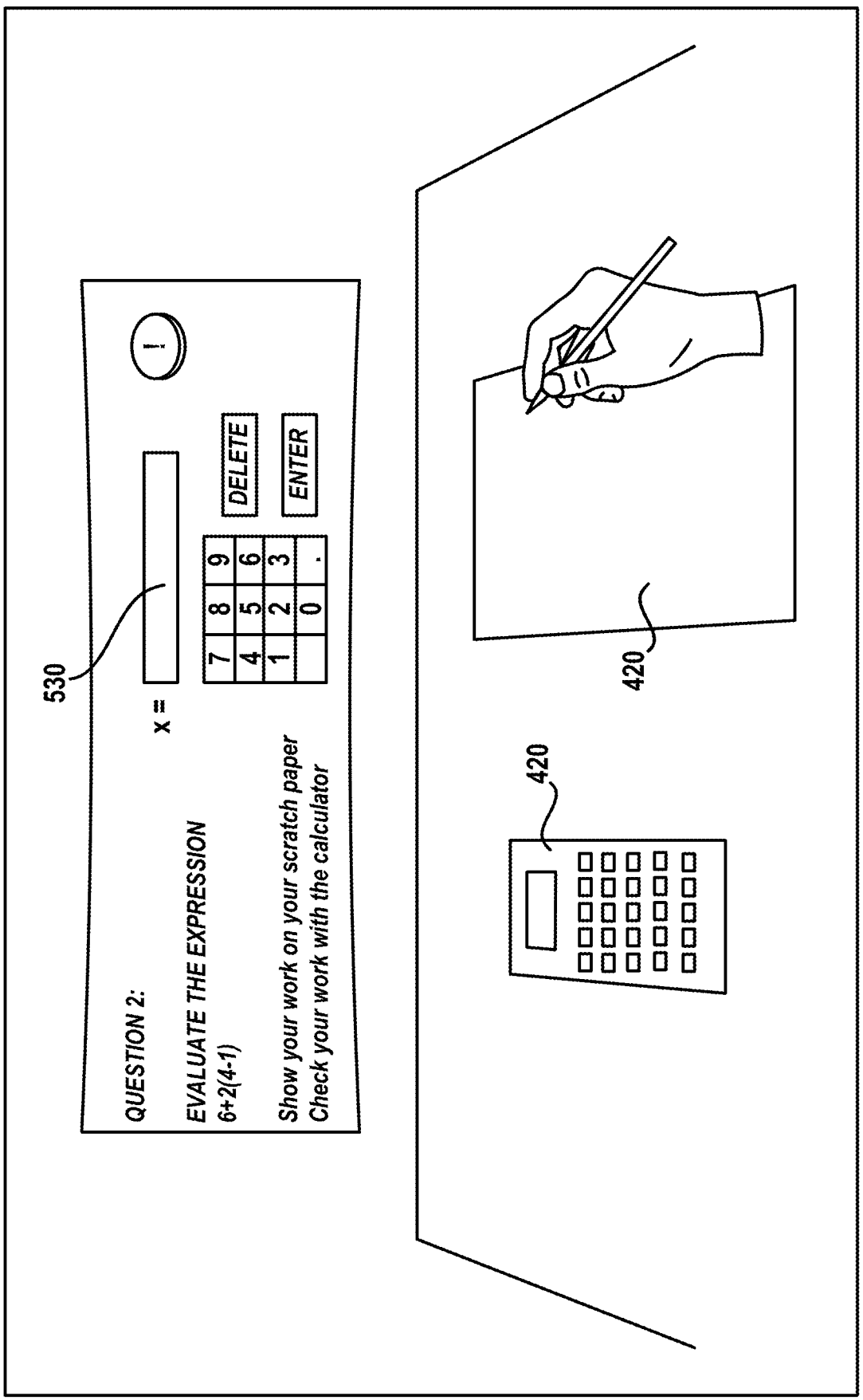
FIG. 8A is an illustration showing display of a sub-assessment module of the assessment module including first viewable information and associated input fields during administration of the assessment module according to one embodiment of the invention.
Figure 8B:
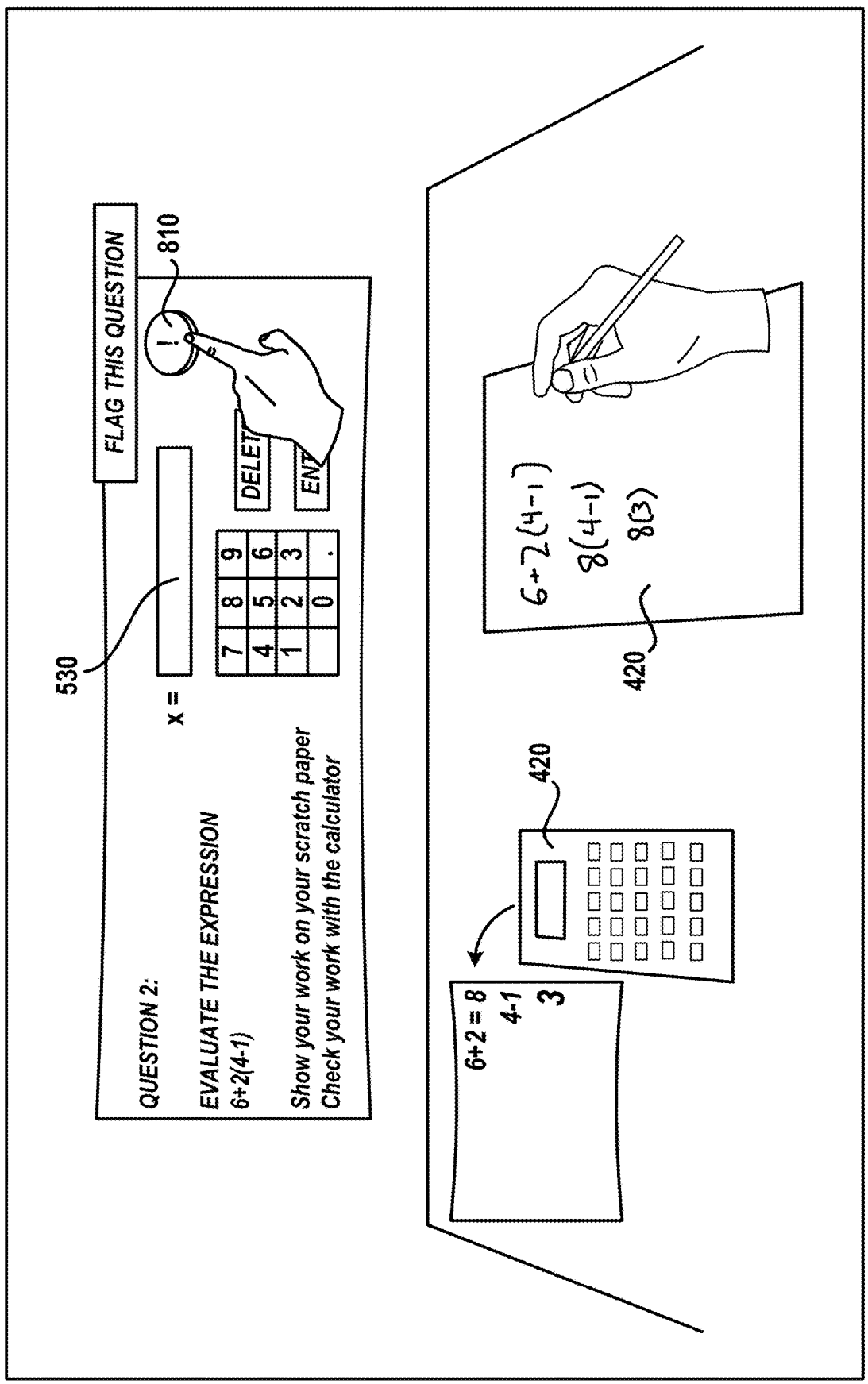
FIG. 8B is an illustration showing a user entering a flag, interacting with a calculator object of the assessment module, and entering user responses into various input fields of the sub-assessment module including writing on "scratch paper" of the assessment module according to one embodiment of the invention.
Figure 8C:
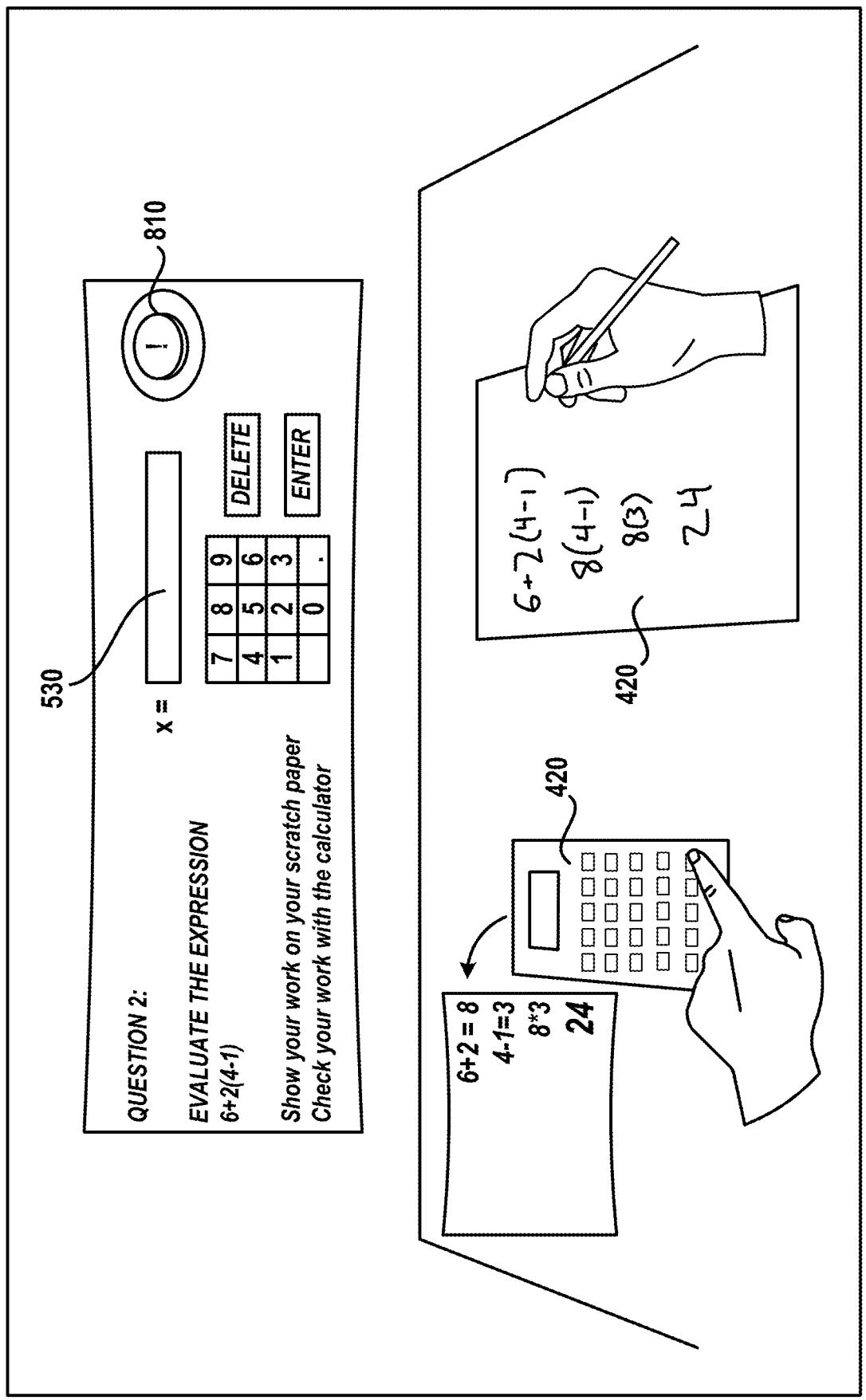
FIG. 8C is an illustration showing the sub-assessment module following entry of the flag and further showing the user interacting with the calculator object and writing on "scratch paper" of the assessment module according to one embodiment of the invention.
Figure 8D:
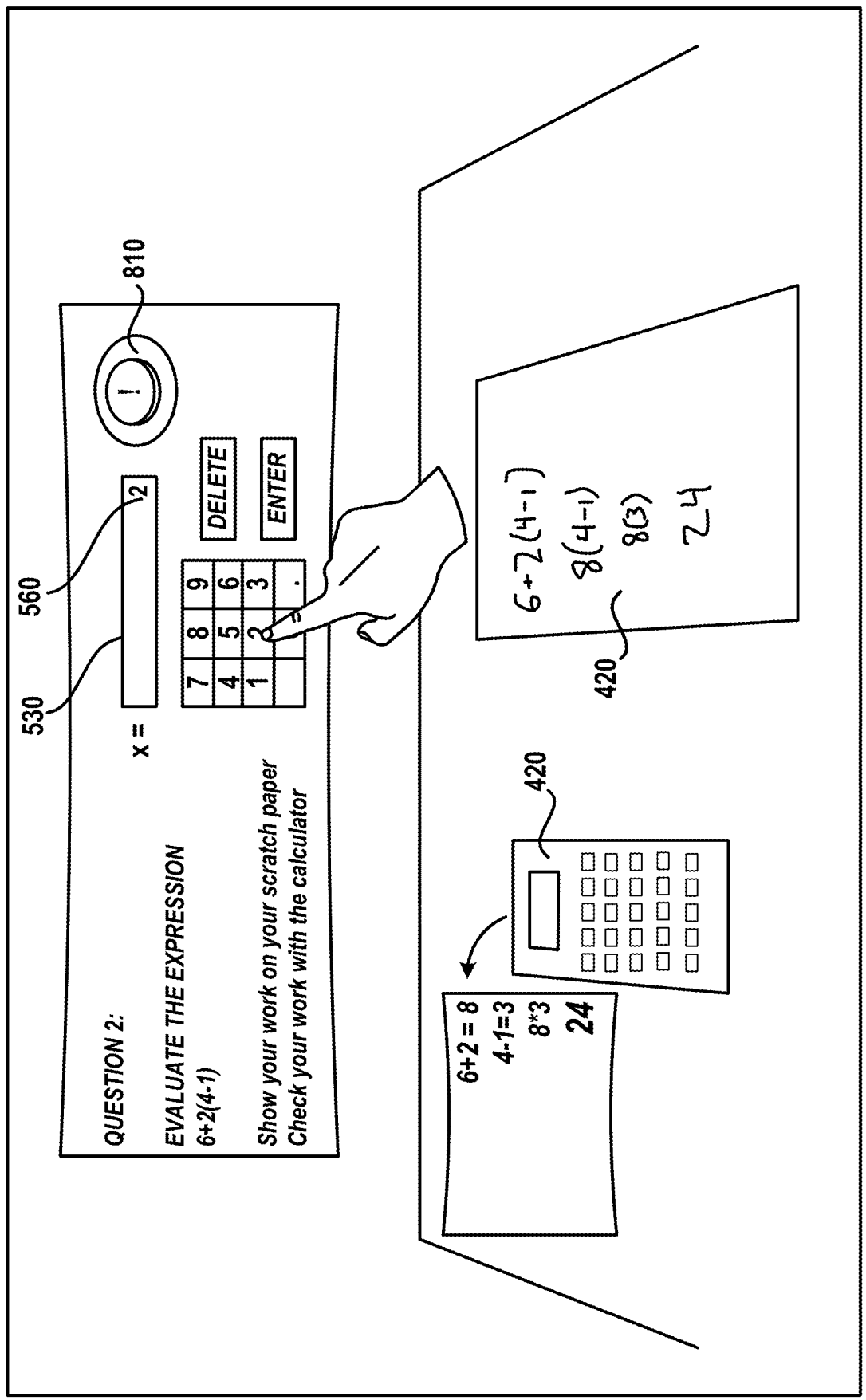
FIG. 8D is an illustration showing the user entering an answer at a "numpad" input field of the sub-assessment module according to one embodiment of the invention.

FIGS. 8A-8D show a walkthrough example of a user completing a portion of an assessment module (e.g., assessment module 410). FIG. 8A shows a first user seated at a desk with one or more assessment objects 420 for display of first viewable information (e.g., directives associated with "Question 2"), to aid the first user in completing the associated directive, and receipt of inputs from the first user for inclusion in a corresponding assessment record (e.g., assessment record 430. FIG. 8A shows an input field 530 for receipt of a final answer. FIG. 8B shows the first user interacting with a calculator object and a scratch paper object to solve the directive (importantly, note that in the example of FIG. 8B, the steps executed by the first user are incorrect) and flagging Question 2 for later review. FIG. 8C shows the first user further interacting with the calculator object and the scratch paper object to reach a "final" value for submission. FIG. 8D shows the first user entering an input 560 into the input field 530 to submit their answer for Question 2.

In some embodiments, the one or more assessment objects 420 can include a scratch paper object for receipt of student input from the first user. In some embodiments, the scratch paper object can be a seemingly infinite document having unlimited (or limited) space for the first user to write on within the extended reality learning environment. The system 200 can record each mark the student makes, including erasures, at the scratch paper object for inclusion within the assessment record 430 as shown in FIG. 8B. The scratch paper object can be one of the one or more display objects, such as a designated portion of the information board or a virtual table provided to the student; in other embodiments, the scratch paper object can be represented as a paper positioned along the desk.

In some embodiments, the one or more assessment objects 420 can include a tool used to complete the assessment, such as a 2-D model or a 3-D model of a calculator. In some embodiments, restrictions may be placed on the type of calculator that is displayed or on available functions of the calculator during administration of the assessment. As such, the system can capture interactions between the first user and the calculator as part of the assessment record and/or as a student response to the assessment module, such as a sequence of calculator inputs and/or a sequence of calculator outputs. In some embodiments, the system can convert the sequence of calculator inputs and/or the sequence of calculator outputs to a text format for ease of review by another user (e.g., an instructor) for inclusion within the assessment record.

In some embodiments, the system can capture, at an audio input device in communication with the first XR device of the first user, first audio data captured during administration of the assessment module. The system can also capture video data displayed at the first XR device of the first user during administration of the assessment module (e.g., a screen capture showing what is being displayed to the first user from the perspective of the first user). The system can also capture, at a spatial orientation measurement device in communication with the first XR device of the first user, first spatial orientation data captured during administration of the assessment module. In some embodiments, the first spatial orientation data includes head-tracking data and/or hand-tracking data. As such, the assessment record can include the first audio data, the first video data, and the first spatial orientation data of the first user.

In some embodiments, as shown in FIG. 8B, the system may provide opportunities for users to flag certain areas of the assessment module during administration of the assessment module. For instance, the system may provide a flag button 810 or another interactive object that, when interacted with, indicates a follow-up point within the assessment record that the first user may want to return to later. The follow-up point may be displayed to the first user and one or more additional users following administration of the assessment module for later review. In some embodiments, the follow-up point can specifically indicate that the first user had trouble with a particular area of the assessment module, or that the first user may simply want to ask a follow-up question for discussion later on. The follow-up point may include an information field where the first user can enter any notes for themselves or for another user. The follow-up point and associated information field can be associated with the assessment record and stored at the database for later or immediate viewing by the first user or another user.

By capturing such data within the assessment record, the system enables the first user and one or more additional users to "re-create" the experience of the first user during administration of the assessment module for review purposes and to provide further learning opportunities for the first user. Further, the system enables supervision of the first user by an academic authority such as the instructor.

Following capture of the assessment record, the system can associate the assessment record with the assessment module at the database and can store the assessment record at the database.

In one example implementation, the same assessment module may be administered to a plurality of users including the first user. As such, the system can record a plurality of assessment records (e.g., one for each respective user of the plurality of users), associate each assessment record of the plurality of assessment records with the assessment module at the database, and store each assessment record of the plurality of assessment records at the database. In this example, the database can include the assessment module and a plurality of "branches" or links associated with the assessment module, where each respective "branch" or link leads to a different assessment record of the plurality of assessment records. By storing each assessment record of the plurality of assessment records at the database, the system enables selective retrieval of each assessment record for use at a later date.

Grading and Post-Processing

Figure 10A:
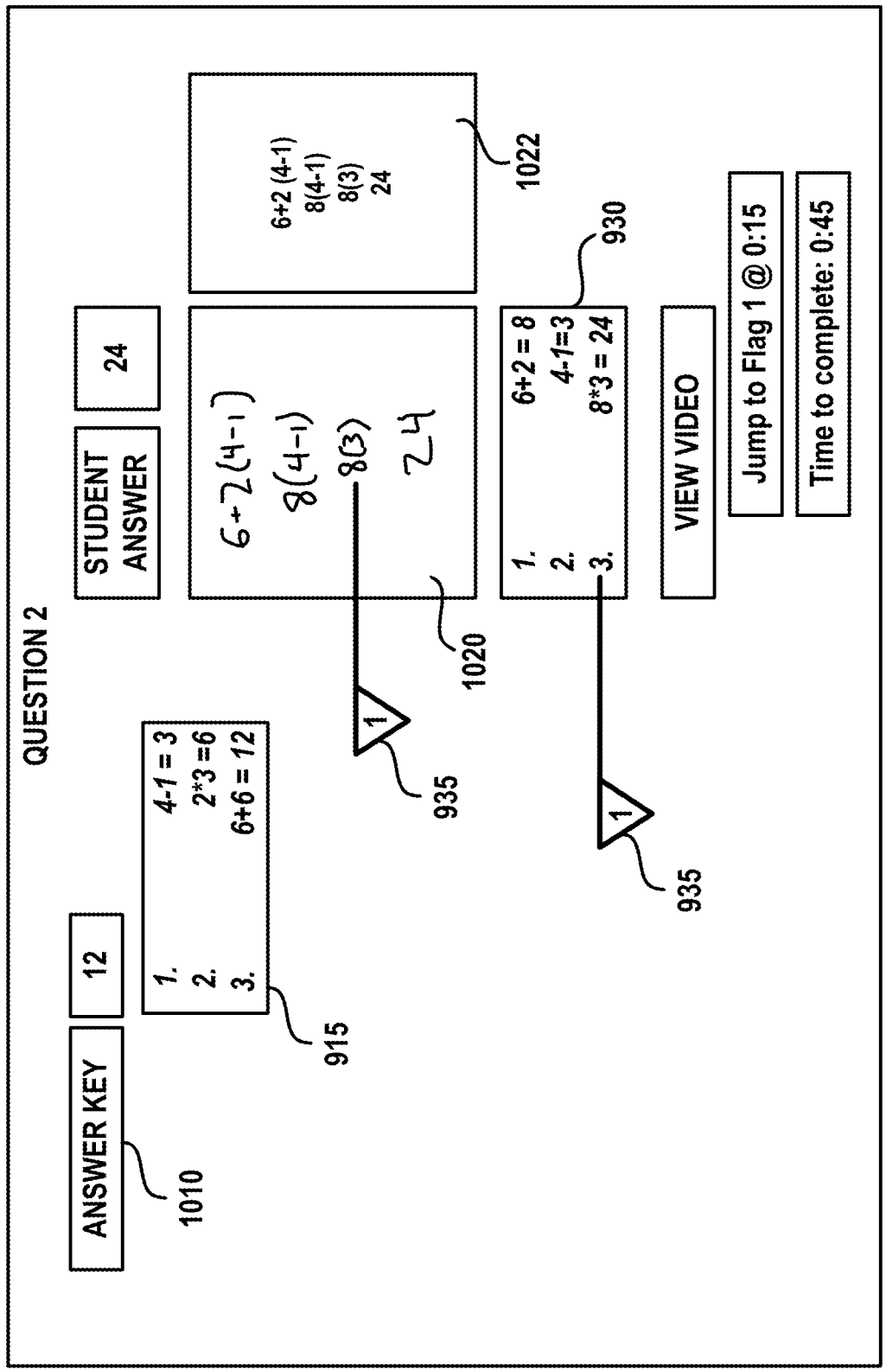
FIG. 10A is an illustration showing example post-assessment annotation data for the walkthrough example of FIGS. 8A-8D including conversion of handwritten notes to printed notes and comparison of user responses with an answer key according to one embodiment of the invention.
Figure 10E:
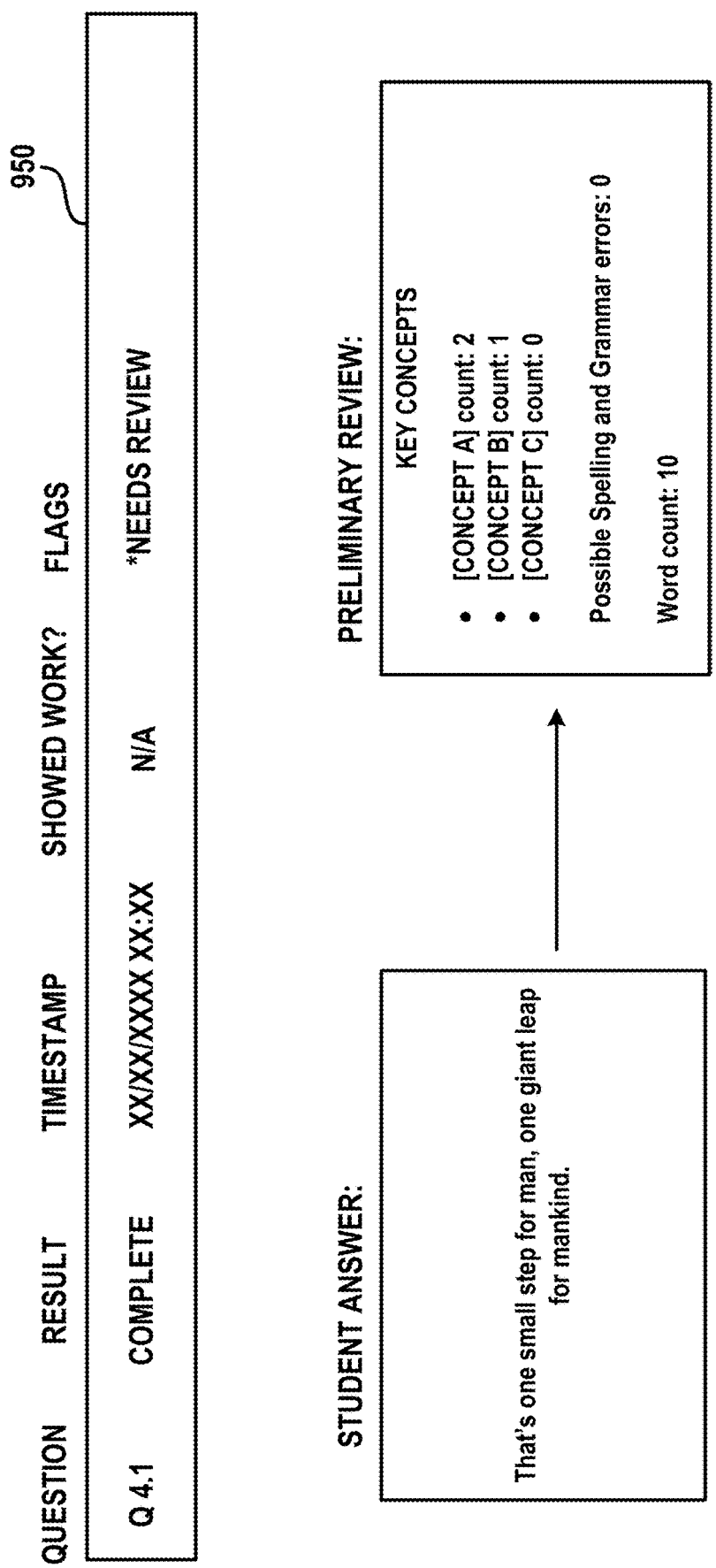
FIG. 10E is an illustration showing example post-assessment annotation data including a preliminary review and concept extraction for subjective text-based answers according to one embodiment of the invention.
Figure 10F:
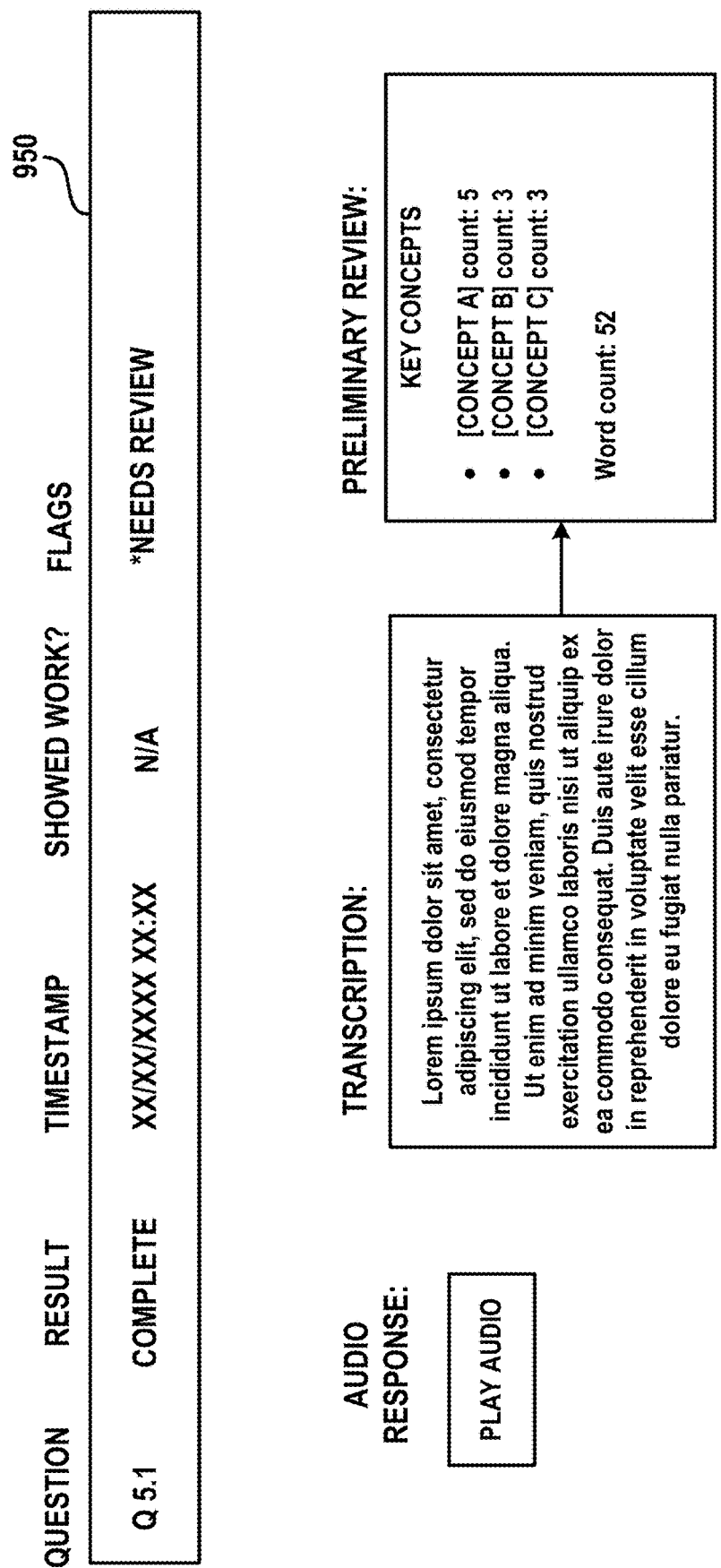
FIG. 10F is an illustration showing example post-assessment annotation data including a transcription of audio data according to one embodiment of the invention.
Figure 10G:
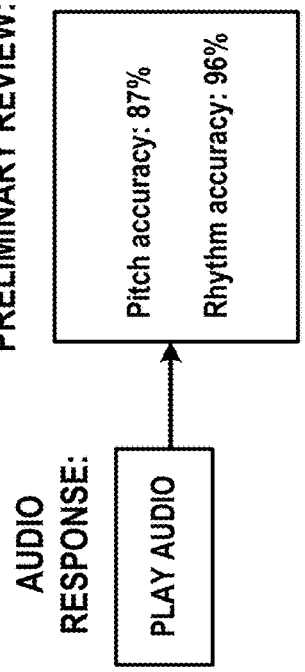
FIG. 10G is an illustration showing example post-assessment annotation data including review of audio data without transcription according to one embodiment of the invention according to one embodiment of the invention.
Figure 11:
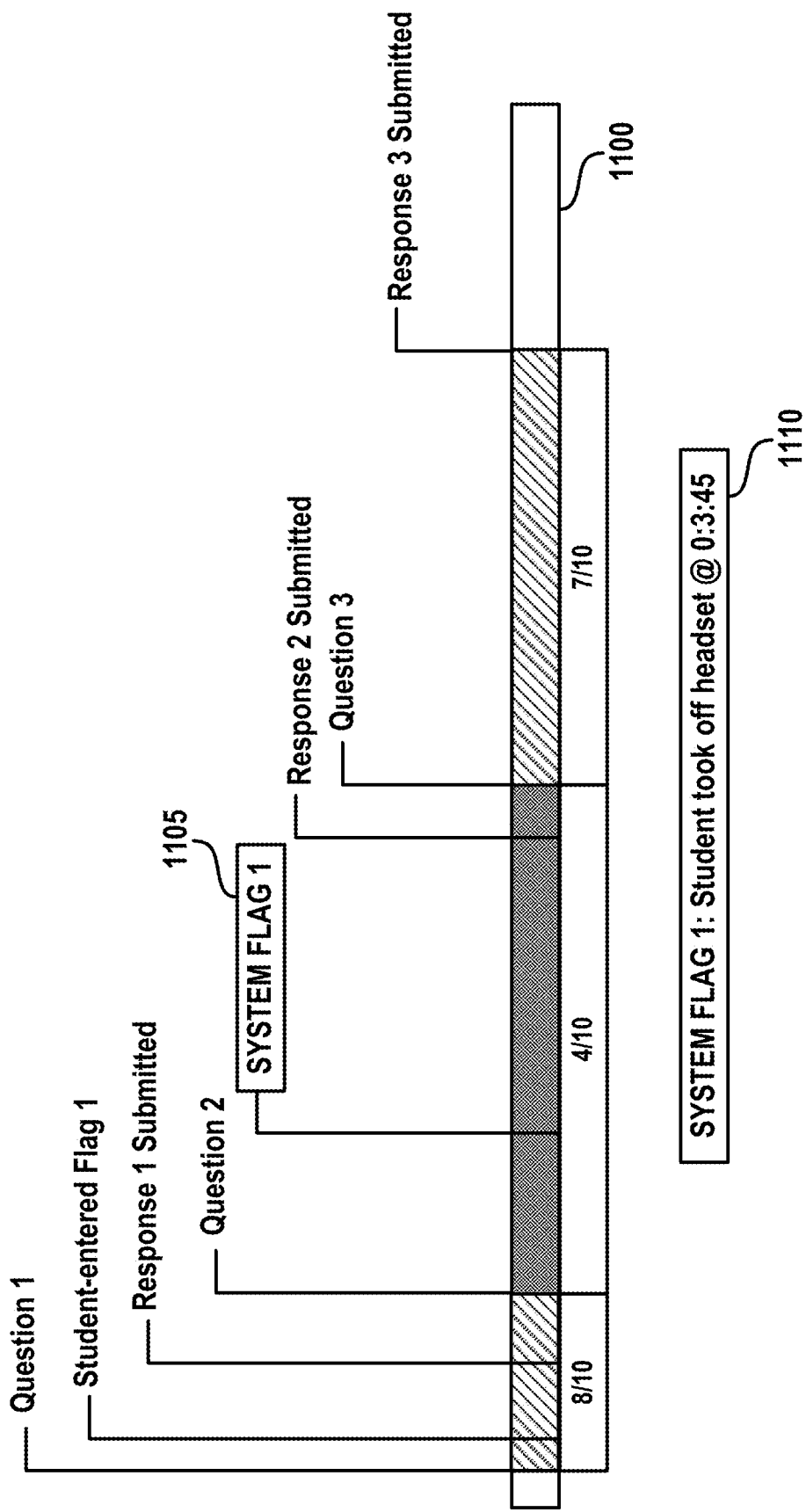
FIG. 11 is an illustration showing example post-assessment annotation data including segmentation of the assessment record according to one embodiment of the invention.

In some embodiments, with reference to FIGS. 9-11, the system can apply various grading processes to grade or otherwise assess student responses to the assessment module following recordation of the assessment record. The various grading processes can include cross-referencing student responses entered at the one or more input fields of the assessment module with a set of grading criteria 425 (e.g., a rubric and/or an answer key) represented within the database 203 and associated with the assessment module 410, extracting language concepts in written responses (e.g., handwritten at the one or more display objects or "typed" into the one or more input fields 530 of the assessment module 410 as a string) using handwriting recognition and natural language processing methods, examining anomalies and applying anti-cheating protocols, and segmenting or flagging assessment records by unit, sub-assessment module, observations, etc. Based on the application of the various grading processes, the system can generate grading data 925 (e.g., scores, letter grades, etc.) based on the input 560 and the set of grading criteria 425, associate the resultant grading data 925 with the first user and the assessment module, and can store the resultant grading data 925 at the database. FIGS. 10A-10G show example post-processing steps that the system can take to prepare the assessment record for grading and presentation to other users (e.g., an instructor, tutor, etc.).

As shown in FIG. 9, each sub-assessment module can be associated with a set of grading criteria 425 for assessment of student knowledge pertaining to the sub-assessment module. The set of grading criteria can include one or more parameters of the one or more input fields that must be received from the student to give full or partial credit for the sub-assessment module, and can also include credit allocation data indicative of a score to be assigned for the student based on information received from the student at the one or more input fields. The system can receive student input at the input field, compare the student input with the set of grading criteria, and can indicate a score for the student's response to the sub-assessment module based on the credit allocation data with respect to the student input.

FIGS. 10A-10G shows example comparison of user input from the assessment record 430 with an answer key 1010, and also shows the system applying handwriting recognition to handwritten information captured from the first user to convert the handwritten information 1020 to converted text 1022, such as information written on the scratch paper object, information board, virtual tablet, or another assessment object associated with the assessment module. Further, FIG. 10A also shows where the user entered a flag 935 during administration of the assessment module (e.g., as in FIG. 8B). FIGS. 10A-10D show the system identifying the incorrect step executed by the first user in FIG. 8B based on the comparison of the input 560 with the answer key 1010.

Some aspects of the assessment record can be exported as a PDF or another suitable document format for ease of review by another user. For instance, information on the scratch paper object following interaction with the first user can be converted into a PDF and saved at the database as part of the assessment record.

Continuing with the examples outlined above, in some embodiments, the sub-assessment module can be a multiple-choice question in which the input field can include a multiple-choice input field where a student must input a selection to the multiple-choice input field indicative of their answer; in such a case, the set of grading criteria can include credit allocation data associated with each available option of the multiple-choice input field. For example, the set of grading criteria can indicate that a student should receive full credit if the selection received at the input field is equal to "B", partial credit if the selection received at the input field is equal to "A", and zero credit if the selection received at the input field is equal to "C" or "D", and the student. If the selection received at the input field is equal to "B", then the system can indicate within the assessment record that the student received full credit for the particular sub-assessment module; conversely, if the selection received at the input field is equal to "A", "C" or "D", then the system can indicate within the assessment record that the student received partial or zero credit for the particular sub-assessment module and can flag sections of the assessment record that are associated with an incorrect answer for later review.

In another example, the sub-assessment module can be the chemistry-related question discussed above in which the input field can include a specific configuration of a 3-D object including one or more sub-objects that the system must receive from the student in order to receive full credit; the 3-D object can include a modeled molecule, with the one or more sub-objects including one or more modeled atoms and one or more modeled bonds. The set of grading material can include a range of positions and/or orientations of one or more sub-objects of the 3-D object that are acceptable in order to award full credit. If the submitted configuration of the 3-D object received at the input field is within the acceptable range of positions and/or orientations, then the system can indicate within the assessment record that the student received full credit for the particular sub-assessment module; conversely, if the submitted configuration of the 3-D object received at the input field is not within the acceptable range of positions and/or orientations, then the system can indicate within the assessment record that the student received partial or zero credit for the particular sub-assessment module and can flag sections of the assessment record that are associated with an incorrect answer for later review.

As discussed, one or more input fields can also receive input from the student in various other forms including but not limited to: a plot (e.g., as a 2-D or 3-D object drawn or otherwise manipulated by the student), a written answer (e.g., a word, phrase, sentence or paragraph handwritten on a 2-D or 3-D model of a paper or the virtual tablet, or typed in at a virtual keyboard represented within the virtual testing environment or a real-life keyboard or other input device in communication with the Extended Reality display device), a numeric answer handwritten on a 2-D or 3-D model of a paper, virtual tablet or typed in at the virtual keyboard or the real-life keyboard or another input device, a drawing on a 2-D or 3-D model of a paper, virtual tablet or a real-life drawing tablet in communication with the Extended Reality display device, an audio file including a verbal answer or musical recording, a video where the student makes a presentation or executes a gesture-based language element (e.g., as a video of the student in "real-life" or as a video of the avatar of the student as represented within the XR learning environment) or a video where the student executes a physical feat (for example, in the case of a physical education course), scratch paper, calculator inputs, typed or hand-written code snippets (for example, in the case of a programming course), "drag-and-drop" input fields (such as completing a sentence with a selection from a word bank for vocabulary-related questions) or any other suitable input form indicative of an answer to the particular sub-assessment module as provided by the student at the one or more input fields.

In some embodiments, prior to submitting a response at the one or more input fields, the system can display the response at the one or more input fields to the first user with emphasis on the content of the response and can request confirmation from the student prior to submission to ensure that the response is indeed the intended response by the first user to avoid accidental submission of an unintended response.

Continuing with the examples of FIGS. 10A-10G, the grading criteria and credit allocation data can correspond with the form of input field for the particular sub-assessment module. In some embodiments, the system can apply a preliminary grading operation to the input received at the one or more input fields; however, for some sub-assessment modules where the student's answer may be somewhat subjective or otherwise difficult for the system to assess accurately and fairly, the system can flag these sub-assessment modules for instructor review.

In some embodiments, for an assessment module where the student response received at the one or more input fields is somewhat subjective, such as in the form of a written answer that may require a reviewing user (e.g., an instructor, tutor, or another individual) to manually review, the system can apply one or more pre-processing operations to the student response received at the one or more input fields to aid the reviewing user with grading. In one aspect, the system can extract concepts from the student response received at the one or more input fields using natural language processing, and can optionally compare the extracted concepts with a set of grading criteria to identify whether key concepts identified within the set of grading criteria are present within the student response. In another aspect, the student response received at the one or more input fields could include an image such as an art project; the system can apply one or more pre-processing operations to the student response received at the one or more input fields to assess the image for key art concepts identified within the set of grading criteria such as balance, accuracy, originality, as well as accepted art elements such as line, shape, value, color, texture, space and form as defined within the set of grading criteria. In another example, the student response received at the one or more input fields could include an audio file such as a musical performance by the student; the system can apply one or more pre-processing operations to the student response received at the one or more input fields to assess the audio file for key musical concepts identified within the set of grading criteria such as pitch accuracy, harmonic accuracy, rhythmic accuracy, or other musical concepts. While the reviewing user may still need to review the student response, the system can provide helpful objective information about the student response to the reviewing user to aid in their review and ensure fairness.

In some embodiments, the system may assess problem-solving skills of a student by examining aspects of the assessment record when the student is interacting with the assessment module. For instance, the system can examine a sequence of steps executed by the student for correctness, creativity, accuracy, or other criteria. The system can determine the sequence of steps executed by the student based on student inputs and aspects of the assessment record including but not limited to sequential calculator inputs, scratch paper, narration in the form of audio captured by the Extended Reality device, configurations of a 2-D or 3-D objects, or a video of the student interacting with one or more question objects of the assessment module. The set of grading criteria 425 can include one or more template sequences 915 that can be descriptive of a sequence of steps or logical leaps that are expected in order for the student to reach a correct answer for submission. Referring to FIGS. 10B and 10C, the system can examine a sequence 930 of student inputs captured within the assessment record during administration of the assessment module, correlate one or more portions of the sequence 930 of student inputs to a template sequence 915 of the one or more template sequences, and can assess a correctness of the student inputs with respect to the one or more template sequences. Note that there may be more than one valid way to solve a problem, and students may be able to combine one or more methods to reach a correct answer for submission. Further, in examples where a student may demonstrate understanding of the concepts by showing a valid sequence of steps but may arrive at an incorrect answer due to calculation error, credit can still be given for the correct sequence and the system can flag the student response as having a calculation error. This aspect can allow fair grading by providing full or partial credit for students who show their work, encouraging students to use different strategies, identifying when students may have simply copied the answer from somewhere else, and identifying strategies that may or may not be helpful or intuitive to students to improve lessons in the future.

In some embodiments, the system can monitor student inputs and compare the student inputs with the set of grading criteria during administration of the assessment module in real-time. This aspect may enable the system to give hints (when appropriate, and when enabled by an academic authority) based on student input. In a similar aspect, the system can consider one or more "template" mistakes (e.g., modeled after common mistakes, such as an incorrect order of operations or common misconceptions) and can identify if the inputs from the first user are indicative of the one or more "template" mistakes. For example, the one or more assessment objects can include a calculator, and the calculator can be operable for identifying a mistake based on calculator inputs and providing a hint to the first user based on the calculator inputs and/or the mistake. In another aspect, the system can include one or more machine learning models that observe student inputs, feedback provided by other users, and the grading criteria to anticipate strategies employed and errors that the first user could make to characterize student inputs and the general thought process of the first user.

As shown in FIG. 10D, post-assessment annotation data 950 may be generated following the described sequence comparison for the sub-assessment module and include the question, result, timestamp of student input, whether student showed work, flag indicator information and description of error or potential follow-up information that may assist teaching the student relative to the assessed concepts. FIG. 10E shows an example of post-assessment annotation data 950 including a preliminary review and concept extraction for subjective text-based answers. FIG. 10F similarly shows an example post-assessment annotation data 950 including a transcription of audio data with counts as to specific key concepts. FIG. 10G shows an example post-assessment annotation data 950 including review of audio data without transcription and comparison to pitch and rhythm grading criteria with preliminary review results, such as for a student assessed in a music class lesson.

In some embodiments, as shown in FIG. 11, the system 200 can automatically flag certain areas of the assessment module during administration of the assessment module 410. For instance, the system can segment the assessment record 430 based on a plurality of sub-assessment modules 415 of the assessment module 410. In some embodiments, the system can display aspects of the assessment record 430 as an assessment record timeline 1100. In another example, the system 200 may place a system-generated flag 1105 for each time the first user submits an answer or moves on to another area of the assessment module for ease of review. In some embodiments, each time the system places a system-generated flag 1105, the system can associate one or more aspects of the assessment record with the system-generated flag 1105 such that a reviewing user can see all contextual information 1110 associated with the flag, such as if the student removed a headset or start/stopped use of an XR device, what objects the first user was looking at, hand movements, writing, calculator inputs, and relate the one or more aspects of the user assessment to whichever area of the assessment module the first user was interacting with.

Providing Feedback from Other Users

With reference to FIGS. 12-18B, the assessment module and associated assessment record including the one or more student responses can be made available to a second user (e.g., an instructor, another student, a tutor, etc.) for review and annotation within the XR learning environment 100. Aspects identified during the various grading and assessment processes applied by the system can also be reviewed afterwards by the second user. The system can display one or more aspects of the assessment records to the second user within the XR learning environment following administration of the assessment module. Further, the system can display the one or more assessment objects (including the one or more display objects) within the XR learning environment for interaction with the second user; the second user can use the one or more assessment objects to provide the first feedback information. The system can also display the first avatar of the first user to the second user, and can optionally "re-play" interactions between the first avatar of the first user within the XR learning environment as recorded during administration of the assessment module for viewing by the second user.

Figure 12:
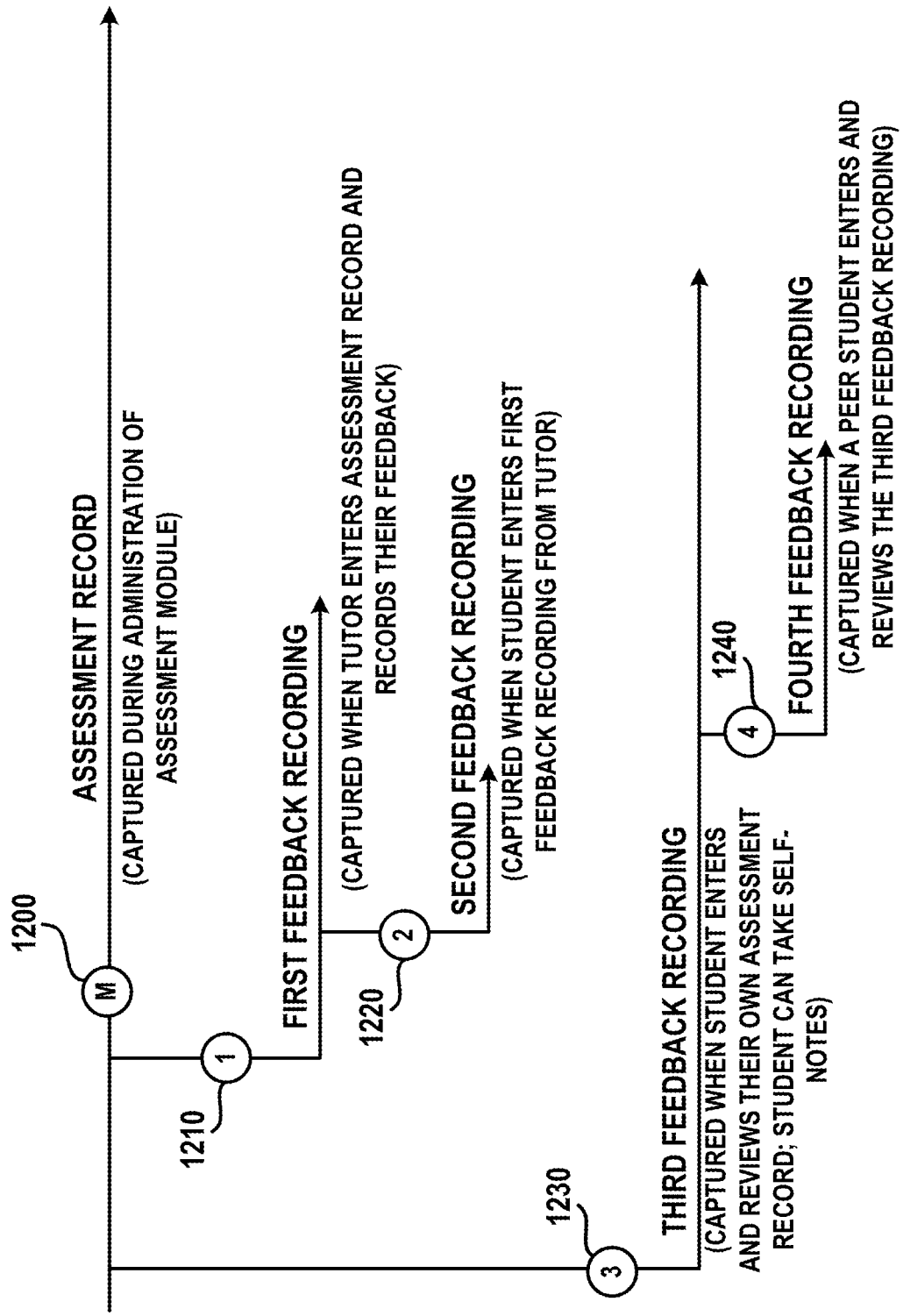
FIG. 12 is an illustration showing example feedback recordings as "branches" off of an assessment record according to one embodiment of the invention.

FIG. 12 is a tree diagram showing example feedback branches 1210, 1220, 1230 and 1240 provided by additional users that "branch" from a main assessment recording branch 1200 for a user. At main assessment recording branch 1200, the initial assessment recording is created of a user interacting with an assessment module of virtual testing environment in the XR environment. The user's avatar representation and interaction with assessment objects, questions, testing activities, and the like, is an audiovisual recording of that user's experience and activities in the XR environment during the assessment. An individual, such as a teacher or tutor, may subsequently "enter" the main assessment recording branch 1200 to provide feedback as first feedback recording branch 1210. The first feedback recording branch 1210 may include the onlooking tutor or teacher providing audio and/or visual feedback comments, notes, demonstrations, additional XR information or objects incorporated into the feedback branch, and other teaching activities that is recorded into first feedback recording branch 1210 as modifying the main assessment recording branch 1200 in a new composite recording that includes the first feedback material along with some or all aspects of the initial branch recording. In preferred embodiments the main assessment recording branch 1200 remains stored and retrievable in its original recording form and the first feedback recording branch 1210 is a new and independent recording that is stored and can be retrieved.

As shown in FIG. 12, sub-branches or new branches of one or more previously recorded initial and feedback branches can be created by users, either newly reviewing a branch or returning to a branch in which they might appear, can be created to add feedback information. For example, second feedback recording branch 1220 illustrates a branch of a student (e.g. the student of the initial assessment or perhaps a newly reviewing student interested in the subject matter) that is created when the student "enters" and reviews first feedback recording branch 1210 to provide additional information in a now independently stored second feedback recording branch 1220—which necessarily includes some or all of the first feedback of the first feedback recording branch 1210 and the main assessment recording branch 1200. In embodiments, users who provide feedback in a sub-branch may be provided distinguishing characteristics to indicate that the individual in the recording is a feedback provider and was not in the main assessment recording branch 1200—such as being shown in a designated color, having a level of transparency, being highlighted, having a symbol or other indicia on or next to such user's avatar, or other display characteristics. Similarly, third feedback recording branch 1230 is shown as branching directly from the main assessment recording branch 1200 and fourth feedback recording branch 1240 branches from the third feedback recording branch 1230. Together, FIG. 12 depicts five (5) total separately stored recordings, where the main assessment recording branch 1200 serves as the reference for new feedback branches (one to four) to be created as new recordings that incorporate feedback and similar added teaching information to help the initial learn from their initial assessment, as well as create feedback branch recordings that might be viewed by other students, instructors, or similar interested individuals who would benefit from retrieving and viewing one or more branches. Beyond just viewing, subsequent users can also create new branches by adding and recording more feedback and/or providing additional information and material into a new branch based on a prior branch (which can include the prior users' avatars and actions).

Figure 13:
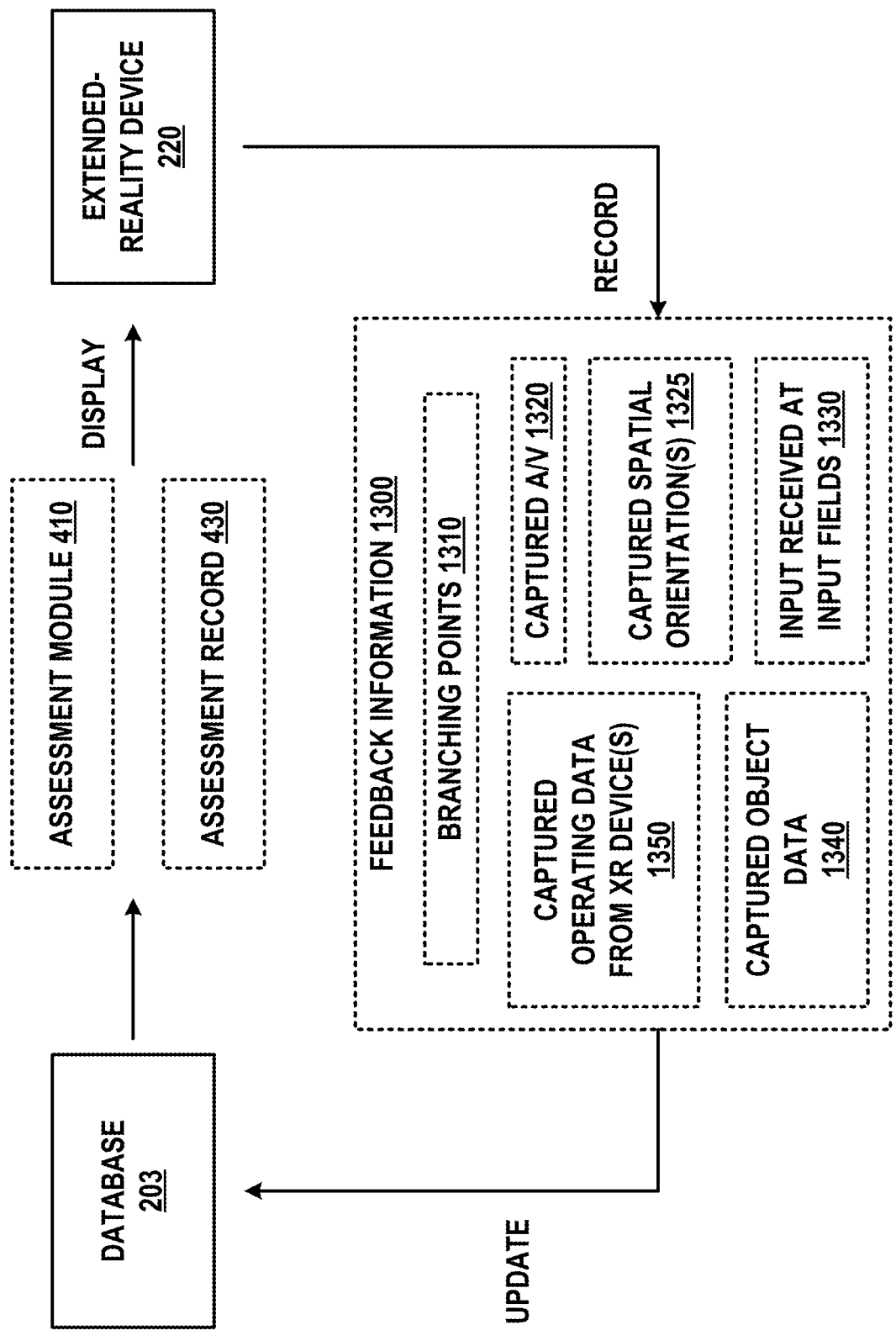
FIG. 13 is a simplified block diagram showing capture of feedback information in association with the assessment record and the assessment module according to one embodiment of the invention.

As shown in FIG. 13, the system 200 can receive the first feedback information 1300 from the second user, associate the first feedback information with one or more elements of the assessment record 430 and/or the assessment module 410, and store the first feedback information 1300 at the database 203. The first user, the second user, and/or additional users can access the first feedback information, the assessment record and the assessment module either synchronously (e.g., simultaneously, or as the first feedback information is being recorded such as during a communication session) or asynchronously (e.g., for viewing at a later time, for example if the second user and the first user are not available for a communication session the second user can leave their feedback for later review by the first user). In some embodiments, when a new set of information is associated with the assessment module within the database (e.g., such as the assessment record, the first feedback information, or any other information pertaining to the assessment module that can be retroactively added by a user), the system can embed a link object 1310 (e.g., a "branching point") at the assessment record and/or the assessment module where the system presents an option to the first user or the second user to "follow" the link object 1310 to view the first feedback information within the XR learning environment, which can "branch" from the assessment record (which can "branch from the assessment module), and can include any further branches thereon. In some embodiments, the first user or the second user can view the first feedback information within the XR learning environment from a perspective of a present avatar or a past avatar of the first user. In various embodiments, examples of feedback information include captured feedback audio and video 1320, captured feedback spatial orientations 1325, captured feedback input received at assessment module input fields 1330, captured feedback object date 1340 and captured feedback operating data from XR devices 1350.

Figure 14B:
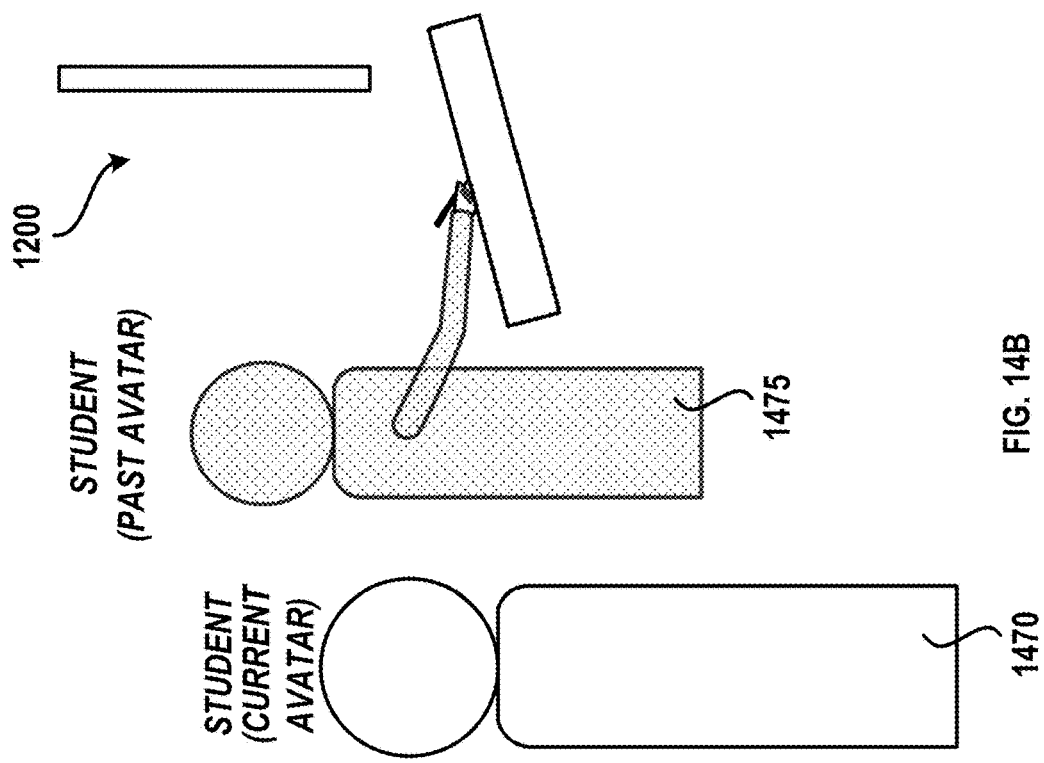
FIG. 14B is an illustration showing a current avatar of a user viewing a past avatar of the user as captured within the assessment record according to one embodiment of the invention.
Figure 14A:
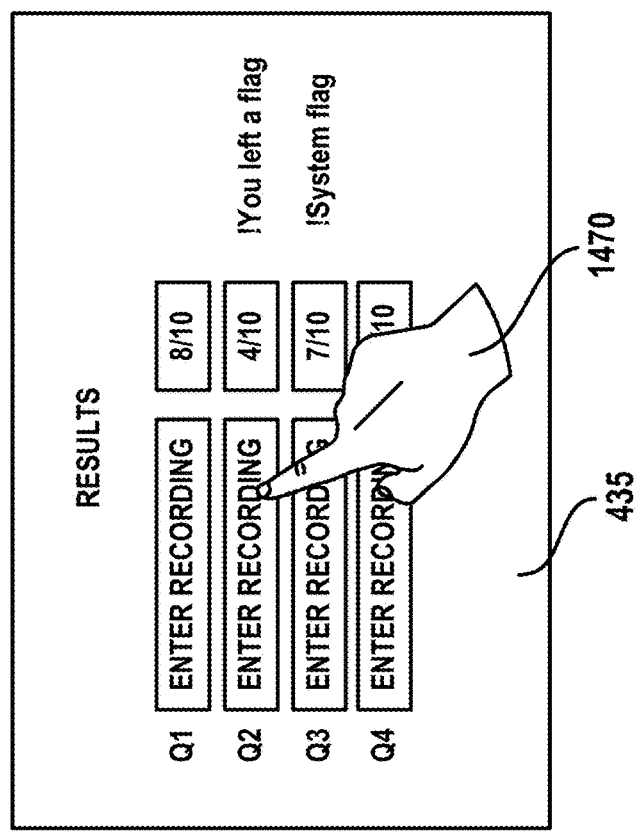
FIG. 14A is an illustration of an example user interface showing results following post-assessment annotation with options presented for a user to re-enter relevant segments of their assessment record according to one embodiment of the invention.
Figure 14C:
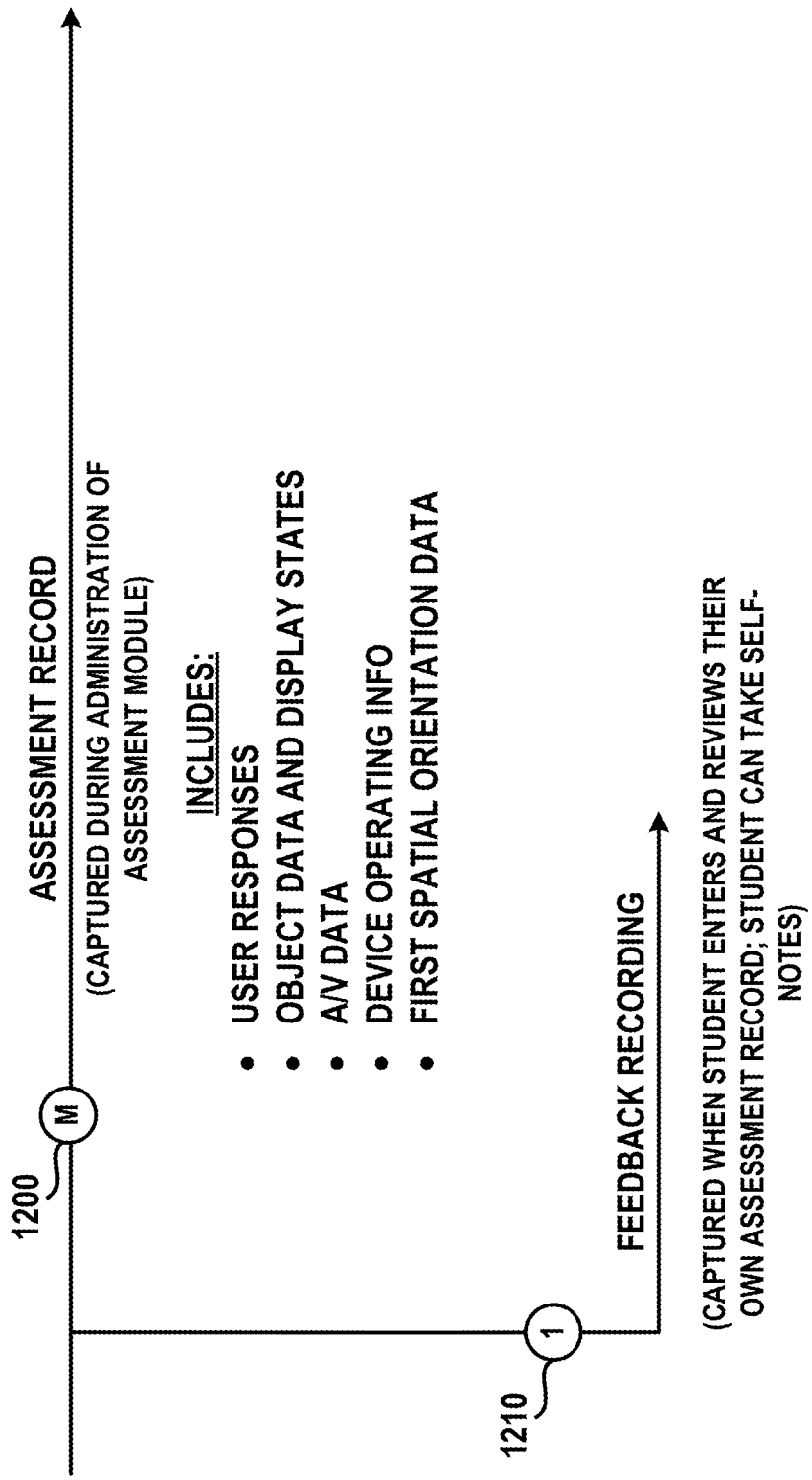
FIG. 14C is an illustration showing generation of a branch off of the assessment record when the user enters the assessment record to view the past avatar from a perspective of the current avatar according to one embodiment of the invention.

FIGS. 14A-14C show the first user interacting with a portion of their assessment record. In FIG. 14A, the first user is be presented with an option to "enter" their assessment record. In FIG. 14B, the first user enters the assessment record as a current avatar 1470, and can watch the past avatar 1475 of the first user from a third-person perspective as the past avatar "completes" the user assessment module. FIG. 14C shows an example tree diagram showing a feedback recording recorded when the first user enters their own assessment record.

Figure 15A:
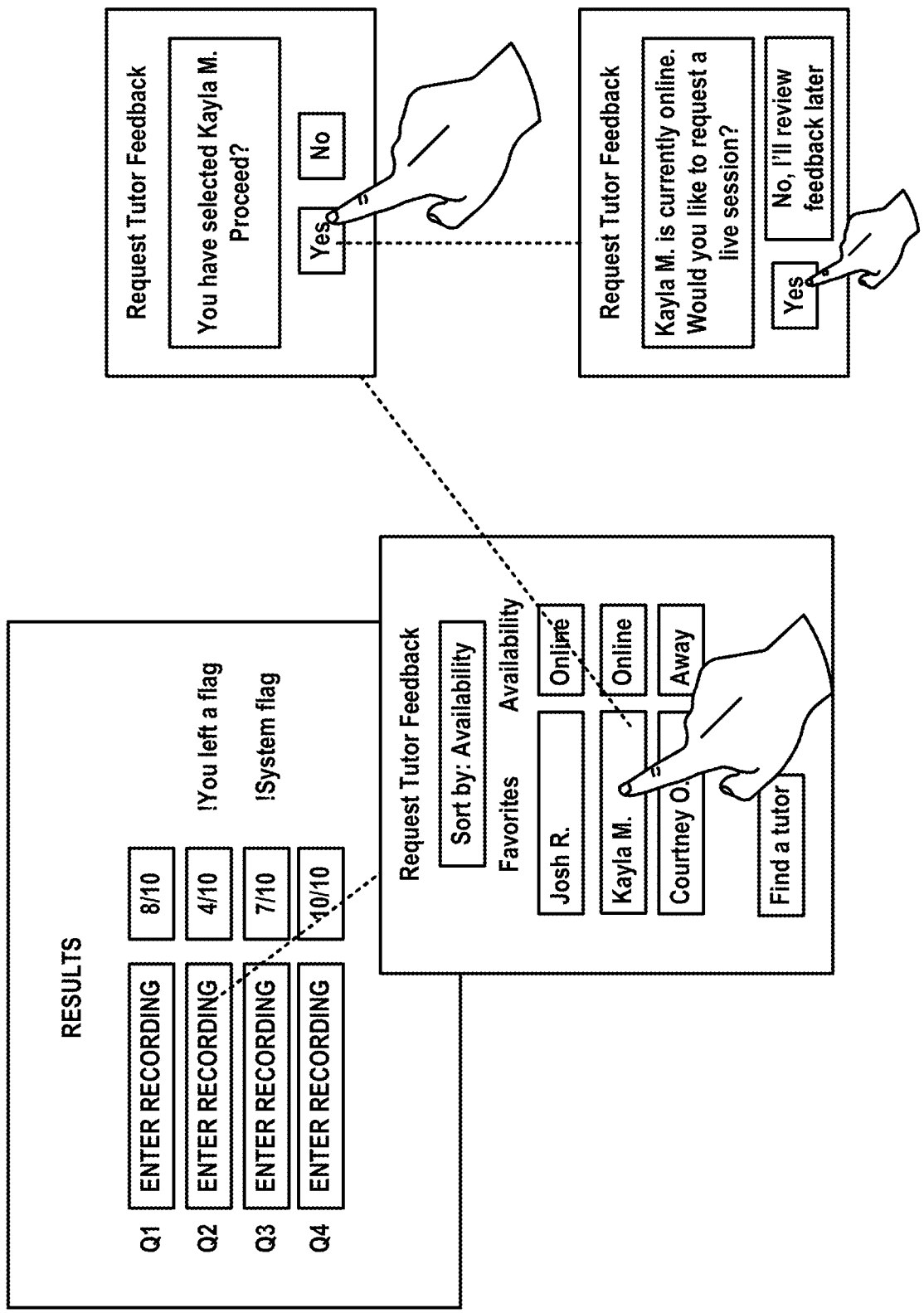
FIG. 15A is an illustration of an example user interface showing a user requesting tutor feedback for a sub-assessment module of an assessment module following recordation of an assessment record according to one embodiment of the invention.

In some embodiments, the system can facilitate a request to the second user from the first user (or another user such as the third user, who may be an instructor or another academic authority) requesting feedback. FIGS. 15A-15D show the first user requesting feedback about their assessment record from a second user. In the example of FIG. 15A, the first user is presented with an option to request tutor feedback from the second user. Options may be provided based on an online availability of the second user, and the second user may be manually or automatically selected. Depending on the availability of the second user, the system may allow the first user to request a synchronous (real-time) communication session or to simply send the assessment record and any other information to the second user for an asynchronous communication session (e.g., in which the second user may review and respond in their own time). It will be appreciated that in preferred embodiments, each different user access the XR system and XR environment through their own respective XR device, such as respective VR or XR headsets.

Figure 15B:
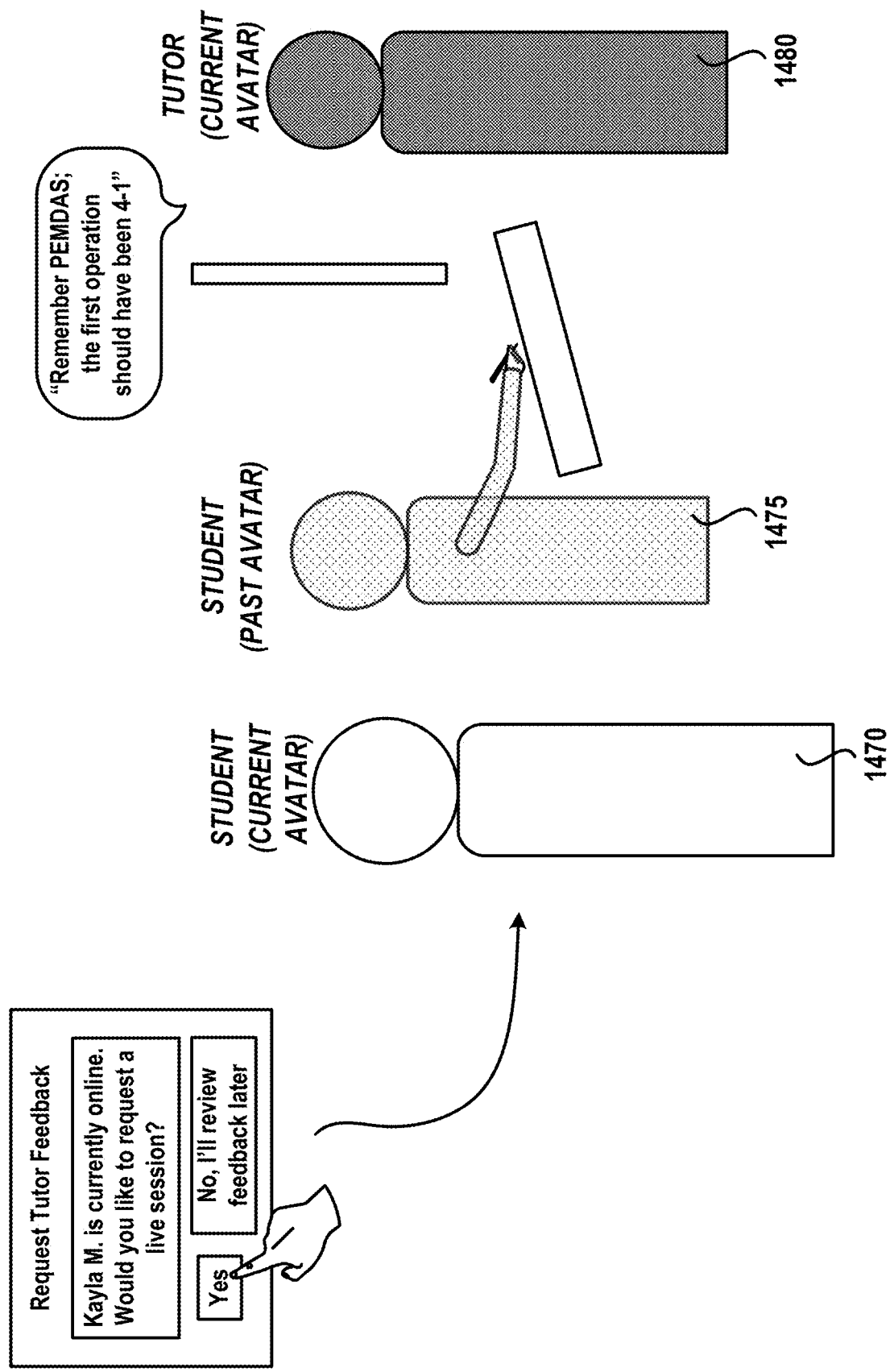
FIG. 15B is an illustration showing a current avatar of a user and a current avatar of a tutor synchronously viewing the past avatar of the user as captured within the assessment record according to one embodiment of the invention.
Figure 15C:
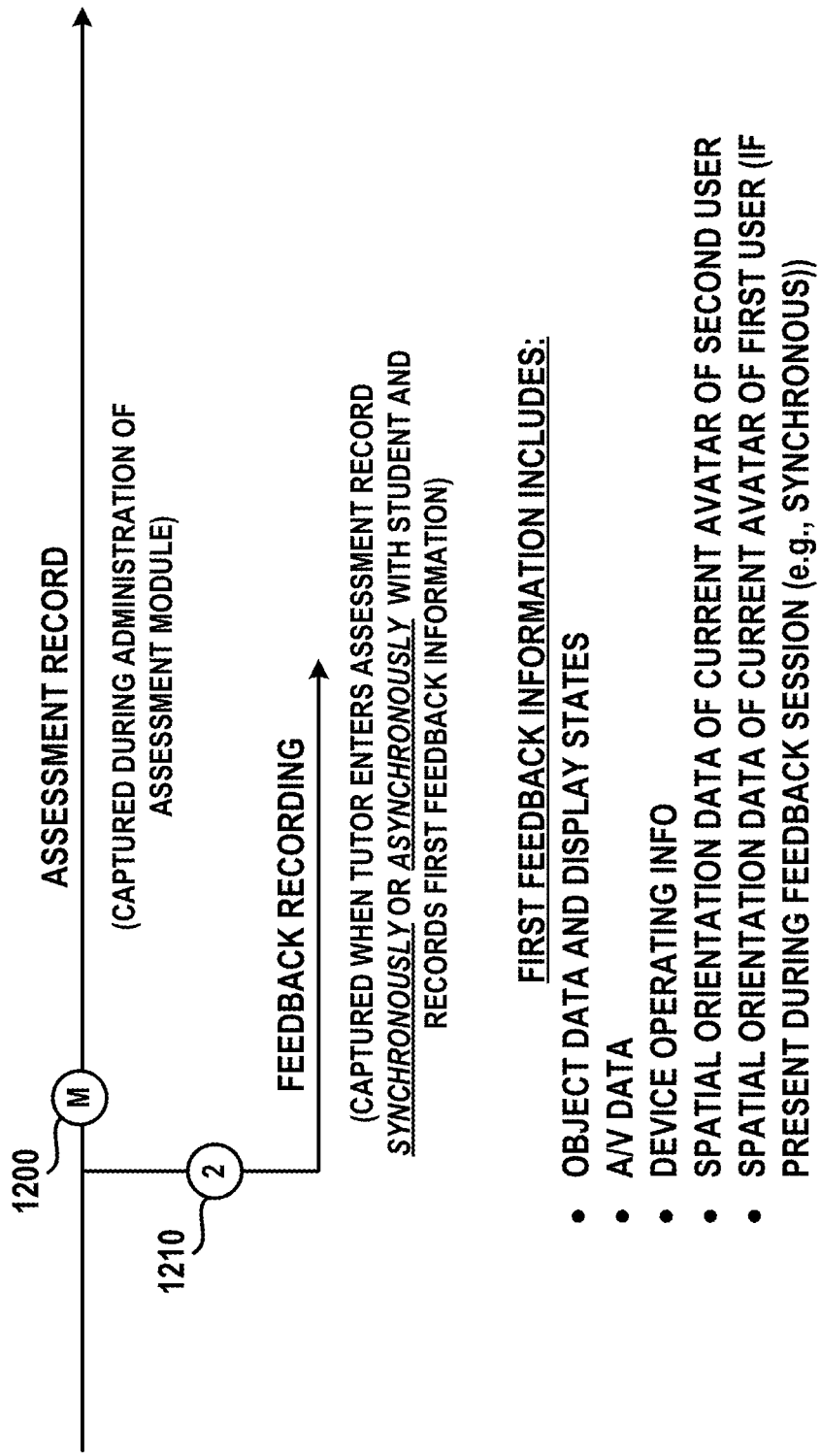
FIG. 15C is an illustration showing generation of a branch off of the assessment record when the user and the tutor enter the assessment record to view the past avatar and record feedback according to one embodiment of the invention.

The system can facilitate a communication session between the second user, such as tutor with a tutor avatar 1480, and the first user, and can display one or more aspects of the assessment records to the second user and the first user within the XR learning environment during the communication session for review and annotation by the second user and/or the first user. FIG. 15B shows a synchronous communication session between the first user with a current avatar 1470 and the second user with a current tutor avatar 1480. In some embodiments, the system can display a second avatar of the second user and a third "present" avatar of the first user within the XR learning environment during the communication session, in addition to the first avatar (e.g., a "past" avatar) of the first user as captured during administration of the assessment module (e.g., so that the first user can view their "past" avatar 1475 and/or the avatar of the second user from a third-person perspective of their "present" avatar 1470, while the second user can view both the "past" avatar 1475 and the "present" avatar 1470 of the first user from the perspective of their own avatar). In some embodiments, the communication session can involve a plurality of users such as a third user (e.g., an instructor or another academic authority) or a fourth user (e.g., another student or tutor); as such, the system can display an avatar for each respective user of the plurality of users involved in the communication session. FIG. 15C is a tree diagram showing an example feedback branch including first feedback information of the assessment record.

Figure 15D:
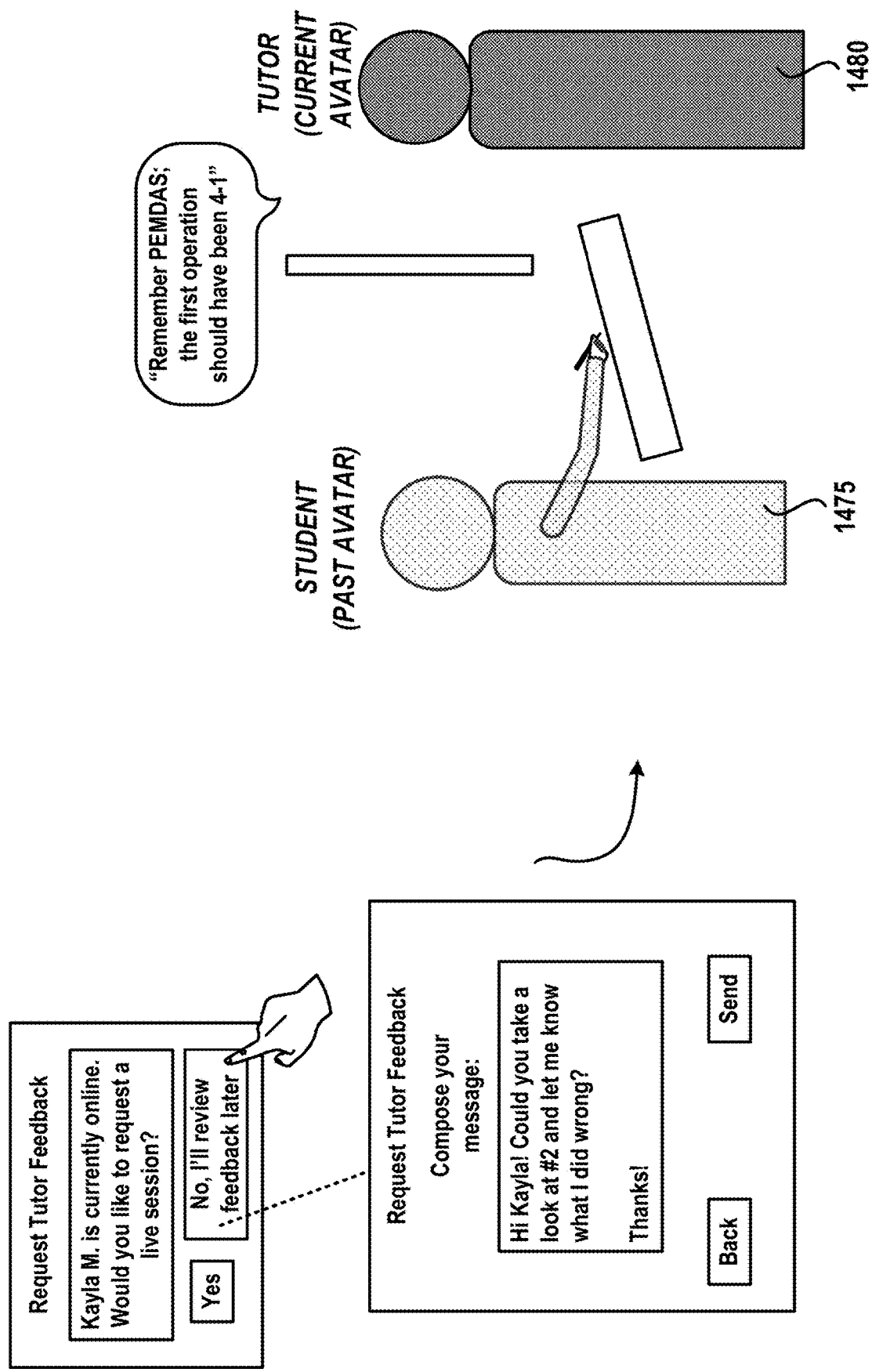
FIG. 15D is an illustration showing a current avatar of a tutor viewing the past avatar of the user as captured within the assessment record according to one embodiment of the invention.

In an example shown in FIG. 15D, where the review may be asynchronous (e.g., such as if the second user shown as a current tutor avatar 1480 has reviewed the assessment record without the first user present), the system can display the past avatar 1475 of the first student as captured during administration of the assessment module to the second user from a third-person perspective of the second user (current tutor avatar 1480) as the second user records the first feedback information.

Following recordation of the first feedback information by the second user, the first student can watch the feedback recording whereby the system will display the feedback recording made with the tutor avatar 1480 of the second user instructing the past avatar 1475 of the first user. The first student watching the feedback recording will preferably see the second avatar of the second user (tutor) and the first feedback information from a third person perspective of the student's "present" avatar in the XR environment of the feedback recording or, alternatively from a perspective of the first "past" avatar of the first user (e.g. through the eyes of his past avatar to experience the feedback recording as if being instructed in real-time by the tutor avatar 1480 (previously-recorded) even though the tutor and student are participating asynchronously in the feedback recording).

Figure 16A:
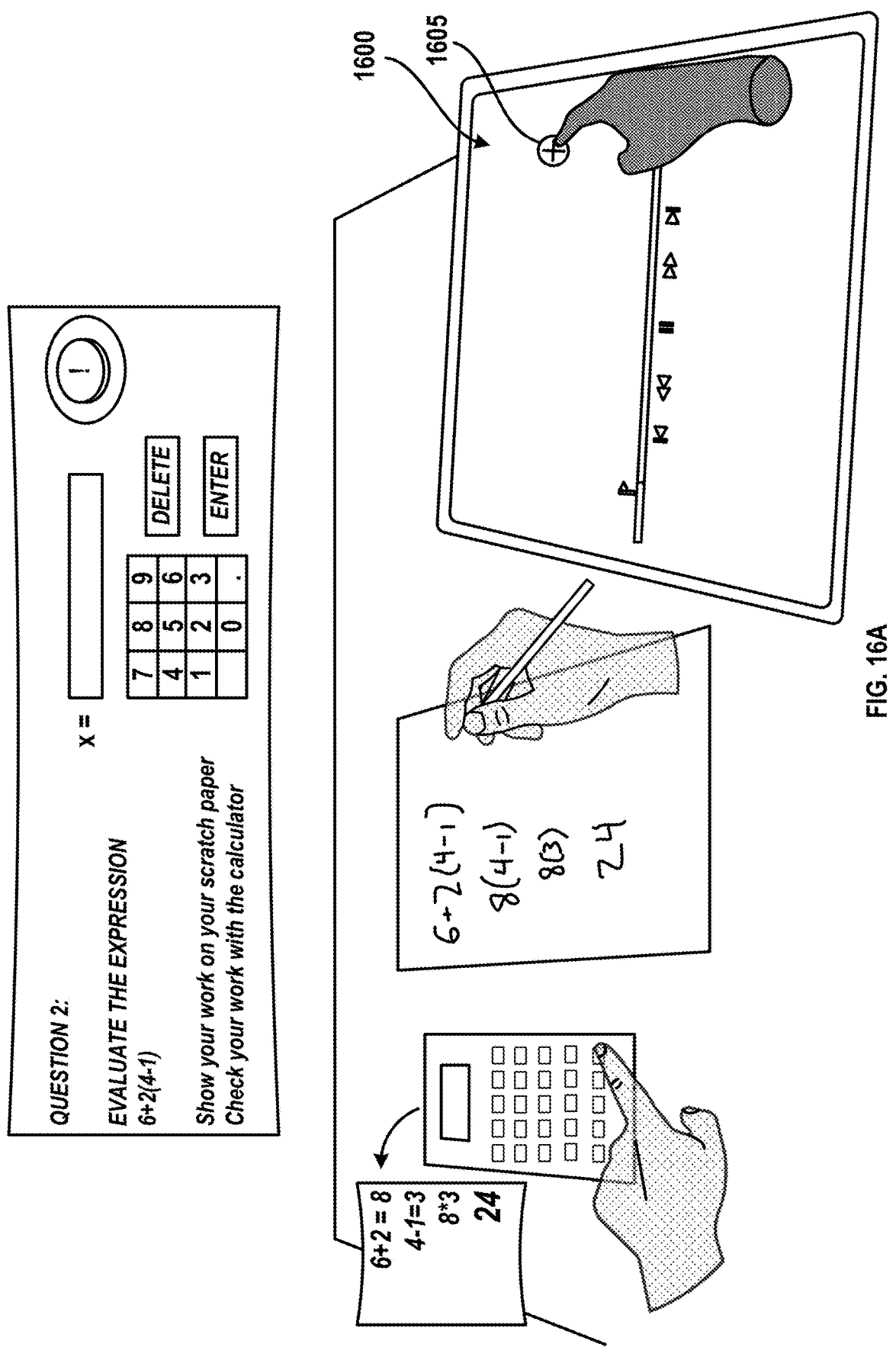
FIG. 16A is an illustration showing a tutor within the XR learning environment and interacting with the assessment record, including generating a branching point for inclusion of feedback information in association with the assessment record according to one embodiment of the invention.

FIG. 16A shows an example of the second user viewing the assessment record of the first user from a first-person perspective. It will be appreciated that the second user is "looking through the eyes" of the first user in a replay-type viewing of the first user's recorded assessment experience. The second user may also be able to view the assessment record from a perspective of the past avatar of the first user, or can choose to view the assessment record from a third-person perspective of their own avatar. FIG. 16A also shows "hands" of the first user as captured through hand-tracking data during administration of the assessment module in phantom, and further shows the second user interacting with a virtual tablet (or, "VR tablet") 1600 for manipulating the assessment record, including adding a new branching point to record first feedback information at the database in association with the assessment record by interacting with feedback control input 1605, such as an "add feedback" button, on the VR tablet 1600. As shown, the second user can be provided with the option to pause, skip forward or backward, and/or jump to flags or segments within the assessment record.

As such, the system can display aspects of the assessment record and the assessment module to the second user for viewing within the XR learning environment or at another device. The system can then receive the first feedback information from the second user, embed a link object in the assessment record that links to the first feedback information, and can store the first feedback information at the database for immediate or later viewing by the first user (and/or the third user). In some embodiments, the request can also be used to initiate the communication session between the first user, the second user, and any additional users of the plurality of users.

Figure 16B:
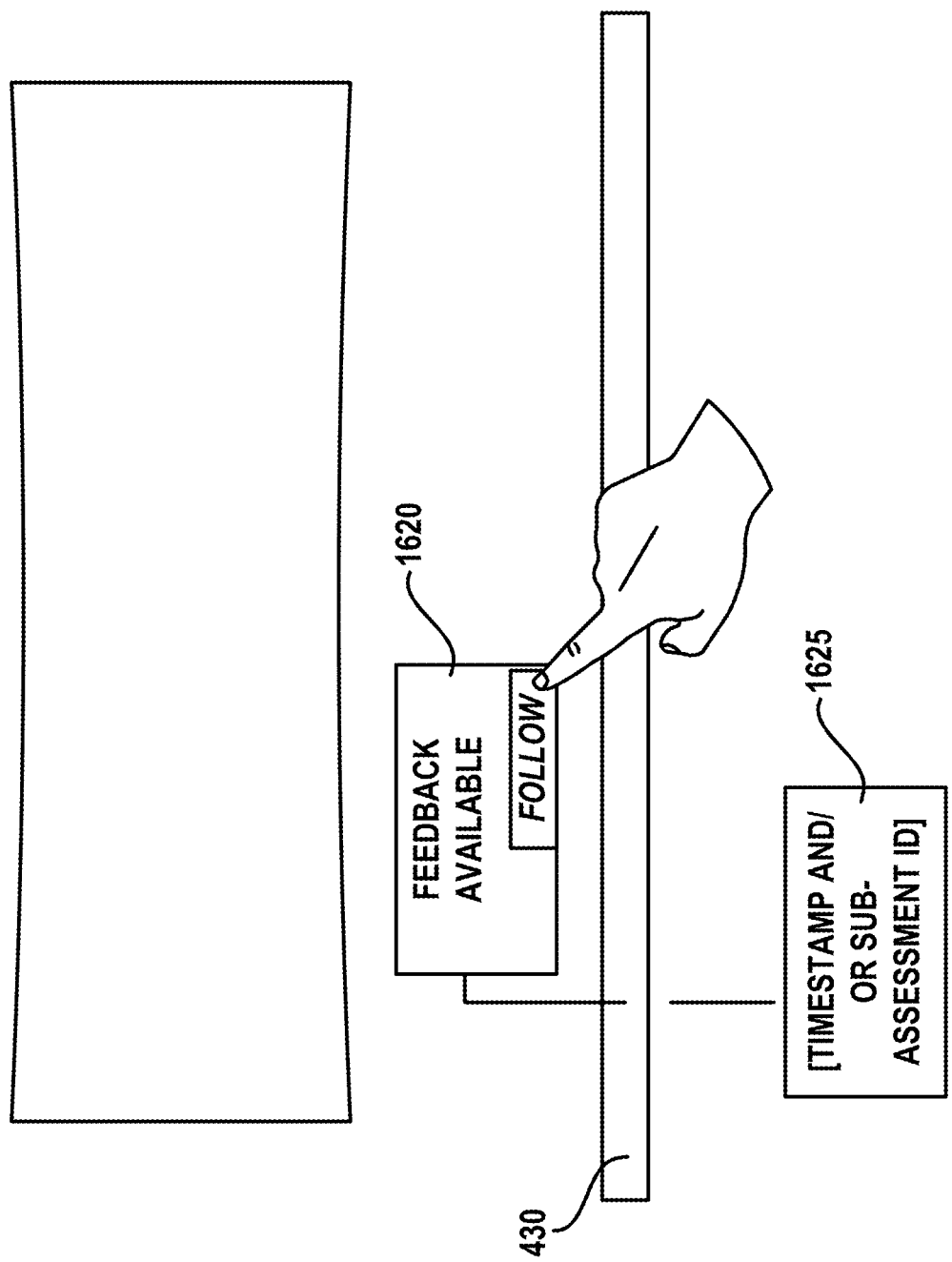
FIG. 16B is an illustration showing a branching point displayed to the user enabling the user to "follow" the branching point and view the feedback information provided by the tutor according to one embodiment of the invention.

FIG. 16B shows an example of a user (e.g., the first user or another user) being presented with an option to view the first feedback information starting at feedback branching point 1620 designating "feedback available" added by the second user (e.g., as shown in FIG. 16A) with a corresponding identification stamp 1625, such as a timestamp or sub-assessment ID. If the user follows the branching point, then the system allows the avatar of the user to "enter" the assessment record 430 that includes the first feedback information at the branching point.

Figure 17A:
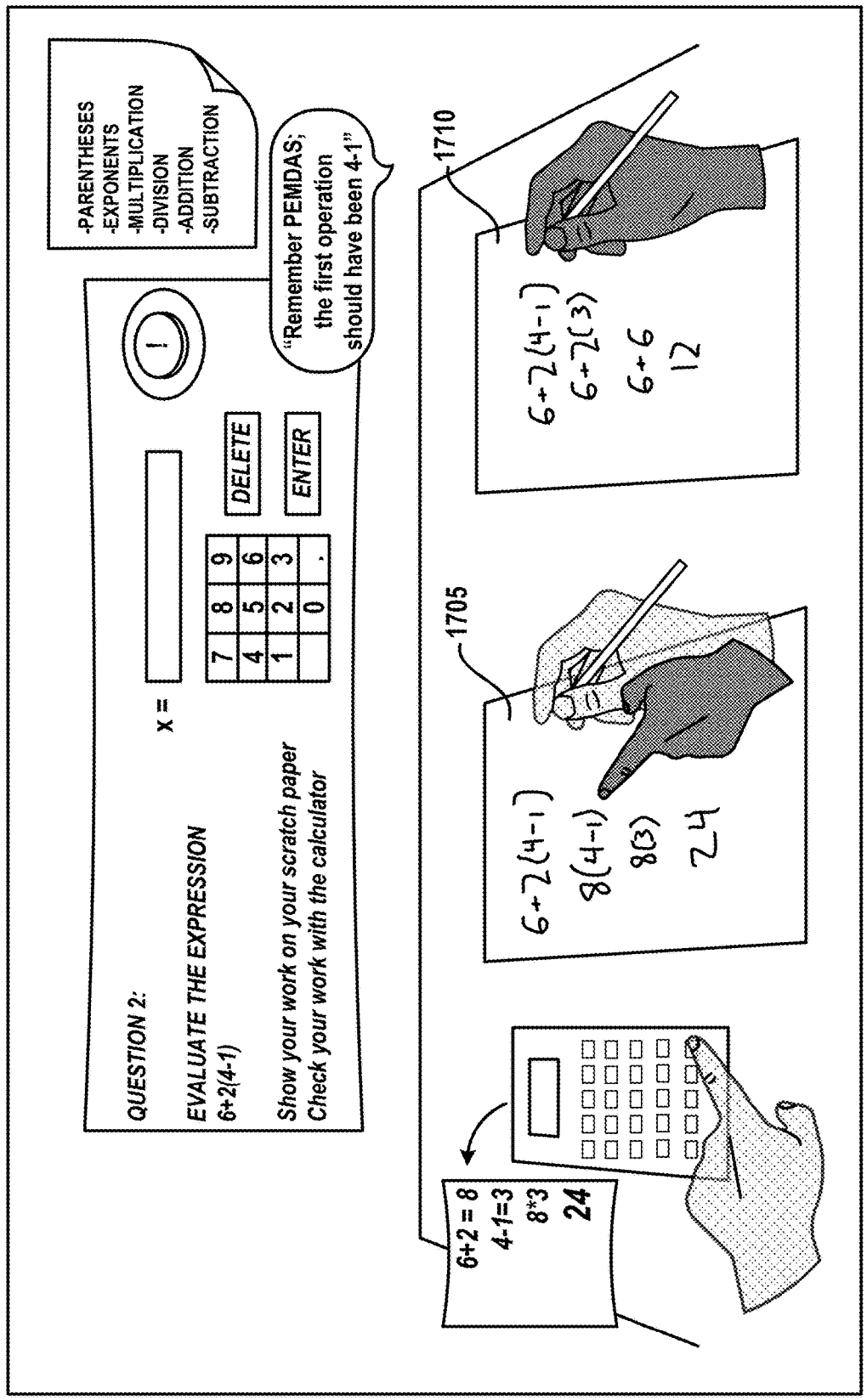
FIG. 17A is an illustration showing a tutor within the XR learning environment and interacting with the assessment record, including recording audio, a page of notes, and a sticky note according to one embodiment of the invention.
Figure 17B:
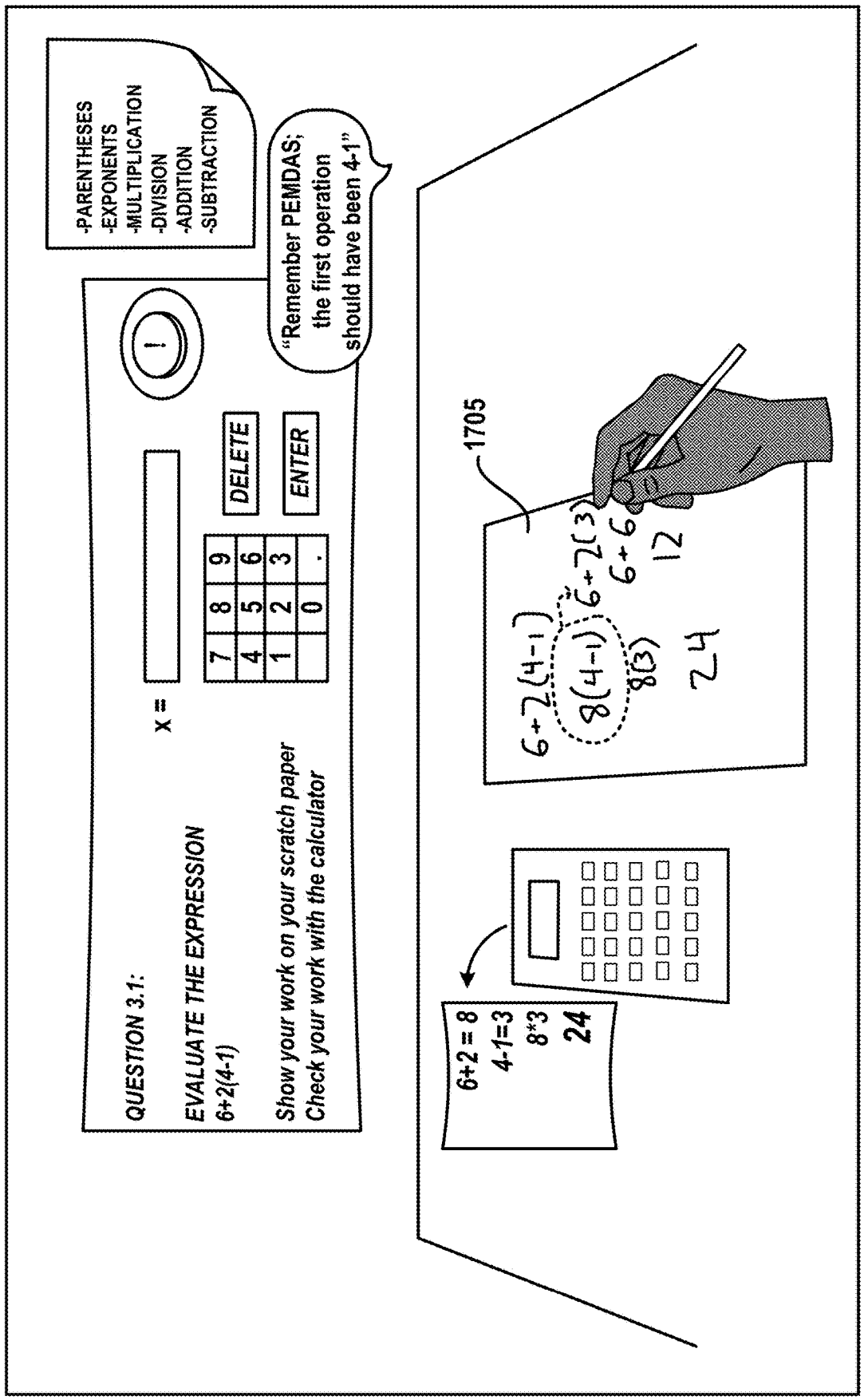
FIG. 17B is an illustration showing a tutor within the XR learning environment and interacting with the assessment record, including recording audio, a sticky note, and writing directly on notes originally recorded within the assessment record according to one embodiment of the invention.
Figure 17C:
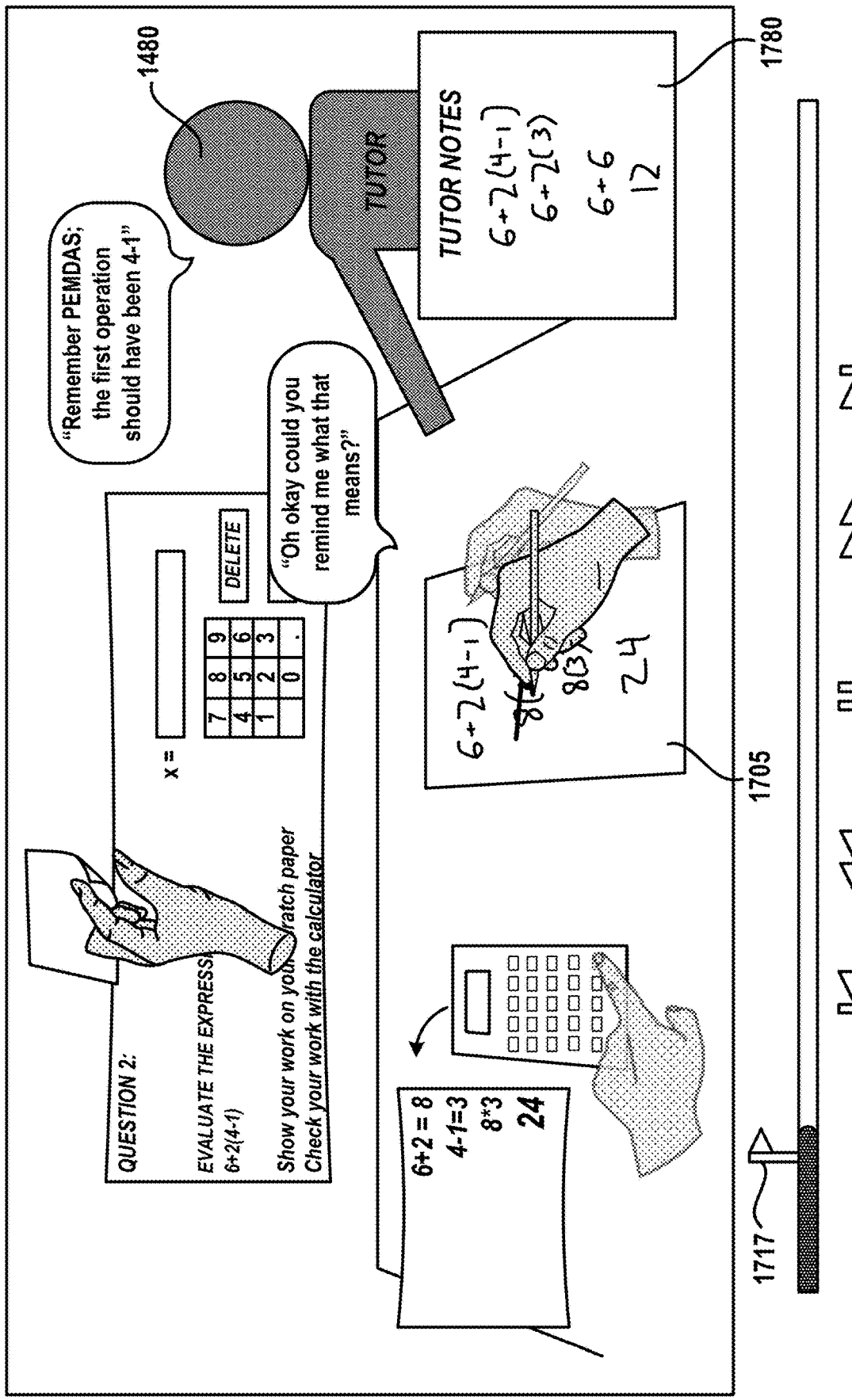
FIG. 17C is an illustration showing a user and a tutor within the XR learning environment and interacting with the assessment record, including recording audio from both the user and the tutor, writing directly on notes originally recorded within the assessment record, viewing notes written by the tutor, and a sticky note according to one embodiment of the invention.

FIGS. 17A-17C shows various ways that the second user (or any user giving feedback or interacting with the assessment record) can provide first feedback information within the XR learning environment.

In some embodiments, the first feedback information can include a document or media file including third viewable information within the XR learning environment and recorded by the second user in association with the assessment module. The first feedback information can also include one or more strings or numeric values received at a virtual input device object viewable within the XR learning environment or received at an input device in communication with the second XR device, a modified configuration of the one or more assessment objects associated with the assessment module. In some embodiments, the first feedback information can include but are not limited to: a 2-D drawing, a 3-D drawing, a document including notes or scratch paper, a set of answer corrections, one or more "sticky note" objects including readable information (that can "float" around within the XR learning environment or that can be attached to the one or more display objects), and can also include recorded information from the second user discussing aspects of the assessment item. In some embodiments, the first feedback information can be "written" directly onto portions of the assessment module or the one or more display objects such as the information board used by the first user, the "paper" object on the desk object interacted with by the first user, the "scratch paper" object interacted with by the first user, the virtual tablet interacted with by the first user, or another object.

Further, the system can also capture second object data, including object positions, spatial orientations and states including display states, of the one or more assessment objects (including the one or more display objects) and the second avatar of the second user within the XR learning environment during review of the assessment record and the assessment module. As such, the first feedback information can include the second object data including data pertaining to the second avatar of the second user and the one or more assessment objects including the display objects.

In the example of FIG. 17A, the second user provides first feedback information by writing on their own "scratch paper" document 1710 for visual comparison with the "scratch paper" 1705 written on by the first user. In another example of FIG. 17B, the second user provides first feedback information by writing directly on the "scratch paper" 1705 interacted with by the first user. The examples of FIGS. 17A and 17B can correspond with synchronous or asynchronous review session between the first user and the second user. Finally, in the example of FIG. 17C, the first user can also contribute to the first feedback information when synchronously interacting with the second user by writing additional notes (e.g., on a "sticky note" object). FIG. 17C also shows tutor notes 1780 written by the tutor (as tutor avatar 1480) (synchronously or asynchronously), which can be helpful when demonstrating concepts to a student. In each of these examples, the system can record a state of each object (e.g., the scratch papers and the sticky note) as part of the first feedback information.

In some embodiments, the system can capture, at an audio input device in communication with the second XR device of the second user, second audio data captured during review of the assessment record and the assessment module. The system can also capture video data displayed at the second XR device of the second user during review of the assessment record and the assessment module (e.g., a screen capture showing what is being displayed to the second user from the perspective of the second user). The system can also capture, at a spatial orientation measurement device in communication with the second XR device of the second user, second spatial orientation data captured during review of the assessment record and the assessment module. In some embodiments, the second spatial orientation data includes head-tracking data and/or hand-tracking data. As such, the first feedback information can include the second audio data, the second video data, and the second spatial orientation data of the second user. The system can record a timestamp and data for each input provided by the second user. In the examples of FIGS. 17A-17C, audio and video data captured from the users (e.g., the first user, the second user, and any other users) during the communication session are also recorded as part of the first feedback information. As shown in FIG. 17C, recording playback controls 1715 may be provided as an interface to a viewing user for efficiently viewing and/or interacting with specific points in an assessment or feedback recording, including also showing flagged moments 1717.

Figure 18A:
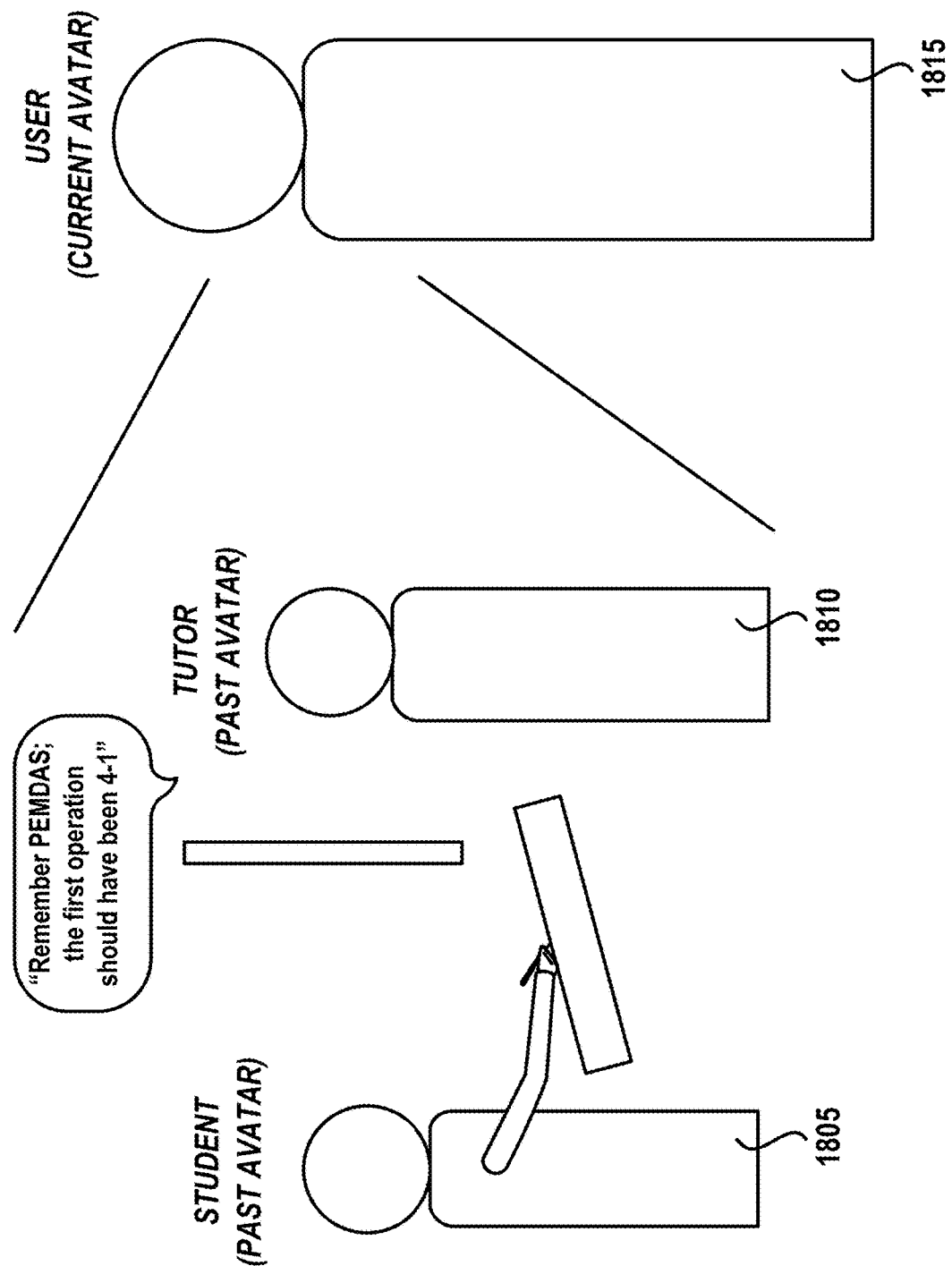
FIG. 18A is an illustration showing a current avatar of another user viewing a first feedback recording including a past avatar of the user associated with the assessment record and a past avatar of a tutor interacting with the assessment record according to one embodiment of the invention.
Figure 18B:
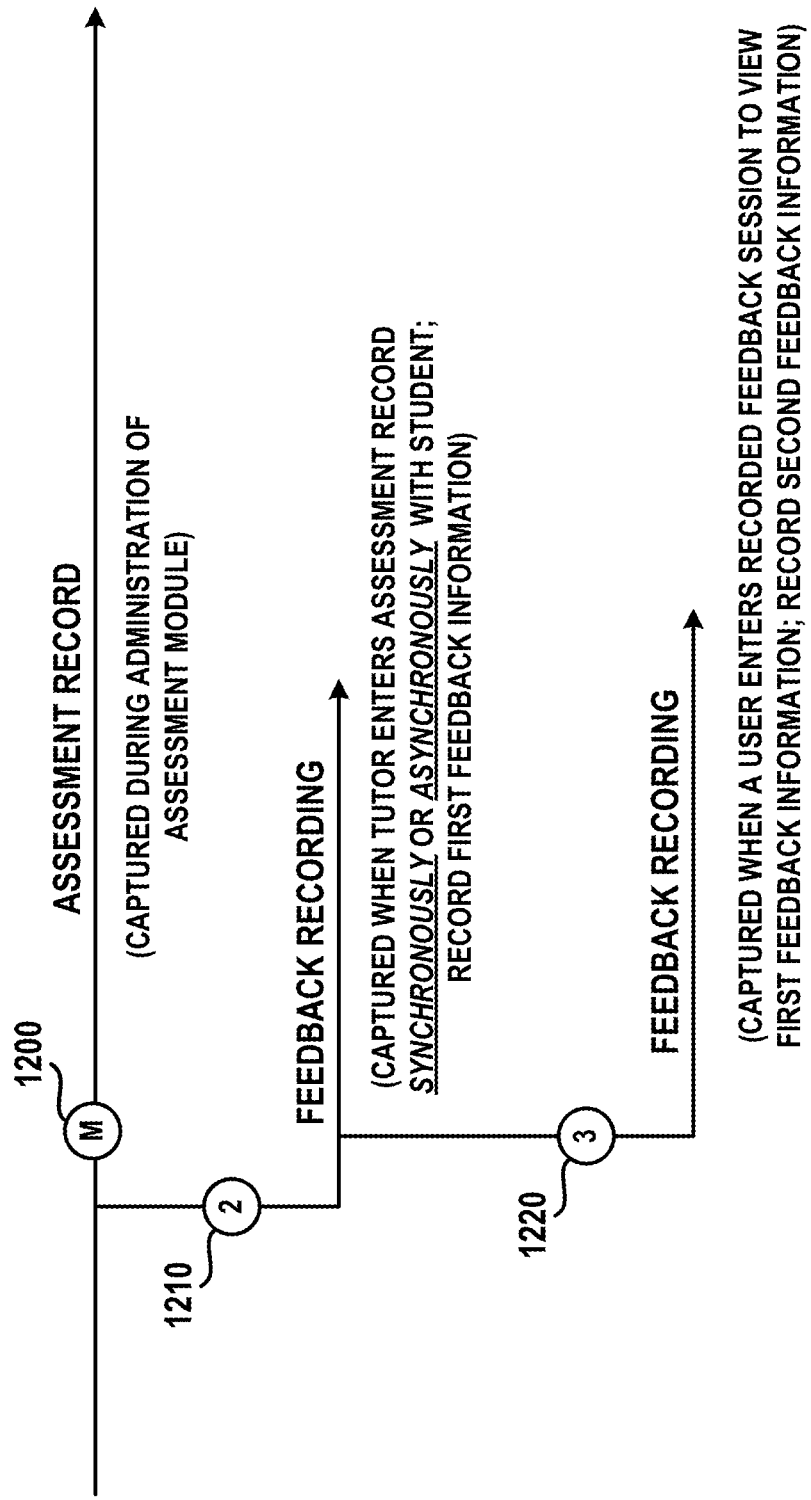
FIG. 18B is an illustration showing generation of a branch off of the first feedback recording when the other user enters the first feedback recording to view the past avatars of the user associated with the assessment record and the tutor to leave a second feedback recording according to one embodiment of the invention.
Figure 18C:
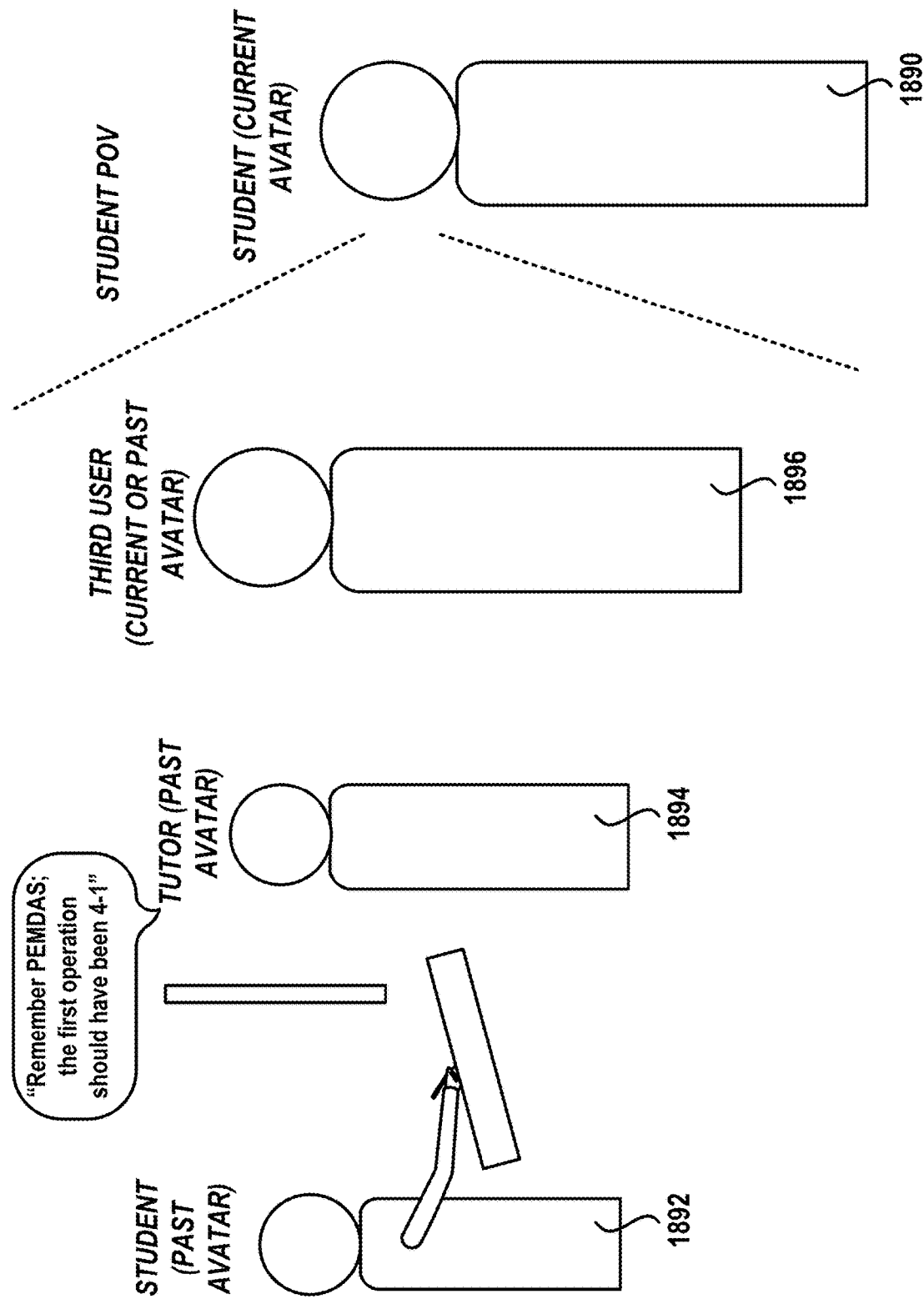
FIG. 18C is an illustration showing a current avatar of an additional user viewing the second feedback recording including a past avatar of the user associated with the assessment record, a past avatar of a tutor interacting with the assessment record, and a past avatar of the other user associated with the second feedback recording according to one embodiment of the invention.
Figure 18D:
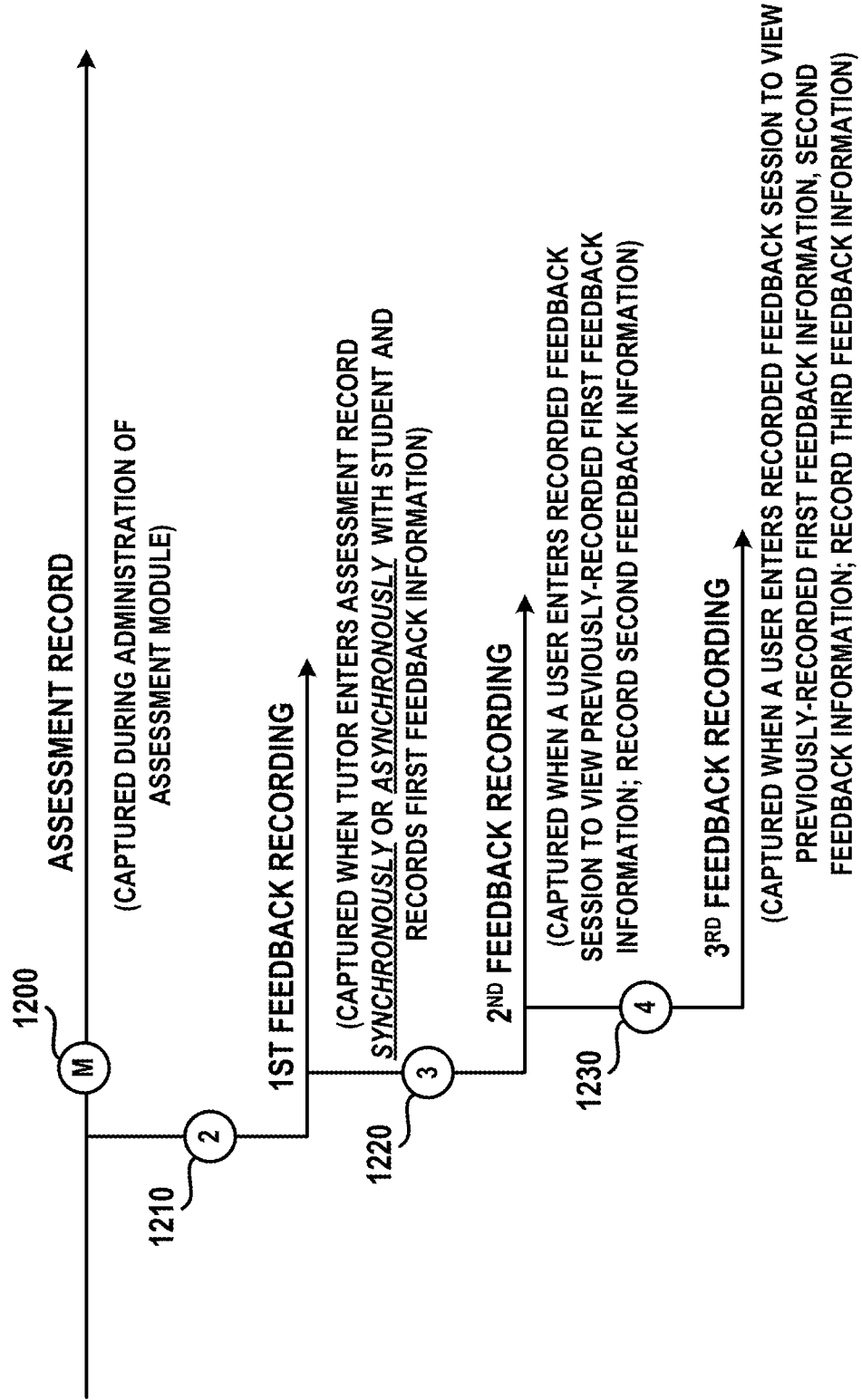
FIG. 18D is an illustration showing generation of a third feedback recording as a branch off of the second feedback recording when the additional user enters the second feedback recording to view the past avatars of the user associated with the assessment record, the tutor, and the other user associated with the second feedback recording according to one embodiment of the invention.

The system can update the assessment record as being associated with the first feedback information. When the first user (student past avatar 1805), the second user (tutor past avatar 1810), or a third user (current user avatar 1815) interacts with the assessment module at a later date as shown in FIG. 18A, (e.g., following receipt of the set of feedback information at the third date), then the system can display the assessment module along with the embedded link object that links to the assessment record and the associated first feedback information at the "branching" point within the assessment record. FIG. 18B shows a corresponding tree diagram showing a new second branching point and second feedback recording branch 1220 being created when another user accesses the main assessment recording branch 1200 and first feedback recording branch 1210 at a later date. The first user, second user, or third user can similarly access first feedback recording branch 1210 and can optionally provide second feedback information in second feedback recording branch 1220 that "branches" from the main assessment recording branch 1200 of assessment module in "response" to one or more other areas of the assessment module, assessment record, or the first feedback information. In another aspect, the first user, second user, or third user can link one or more aspects of the assessment module, the assessment record, the first feedback information, or the second feedback information to one or more curriculum items of the set of viewable curriculum information associated with a current date, a previous date, or a future date; this connection can be recorded within the set of viewable curriculum information and within the database. FIG. 18C shows yet another example of the first user (current avatar 1890 of a student or another user) returning to the assessment record that includes feedback information (showing student past avatar 1892 with tutor past avatar 1894) along with a third user (as current or past avatar 1896). FIG. 18D showing a corresponding tree diagram of FIG. 18C. In examples where the first user 1890 and the third user 1896 are synchronously viewing in second feedback recording branch 1220 the first feedback recording branch 1210 of the main assessment recording branch 1200 and are in a communication session with one another, the first user 1890 and the third user 1896 can be represented with "current" avatars, and second feedback recording branch 1220 recorded by the first user and/or the third user is recorded at the database as "branching" from the first feedback recording branch 1210, which in turn "branches" as a third feedback recording branch 1230 from the second feedback recording branch 1220. In other examples where the first user is represented with a "current" avatar and is viewing "past" avatars of the first user, the second user, and the third user (which could also be a later avatar of the first user or the second user), then the system can record interactions of the first user as third feedback recording branch 1230, which can branch from second feedback recording branch 1220 provided by the third user, which can branch from first feedback recording branch 1210 provided by the second user, and so forth. In some examples, the first user can decide to record third feedback recording branch 1230 that branches from first feedback recording branch 1210 provided by the second user instead of branching from second feedback recording branch 1220 provided by the third user.

In some embodiments, the system can display the assessment record as the first user and/or the second user discuss and add annotations. The first user and/or the second user can pause the assessment record during the discussion or when adding annotations; however, the first user and/or the second user can also add to the assessment record while the assessment record is still playing.

In some embodiments, the assessment record can be viewed by another user at a device such as a laptop, tablet or a desktop computer to enable users to view content when virtual reality or extended reality is not an option, such as when studying or grading at a coffee shop or another public place. As such, aspects of the assessment record can be "neatly" packaged and/or optimized to enable users to view them in a non-XR learning environment. In some embodiments, a user (e.g., an instructor) can simultaneously view multiple assessment records from a plurality of users and can "hone in" on one or more users of the plurality of users.

Figure 19A:
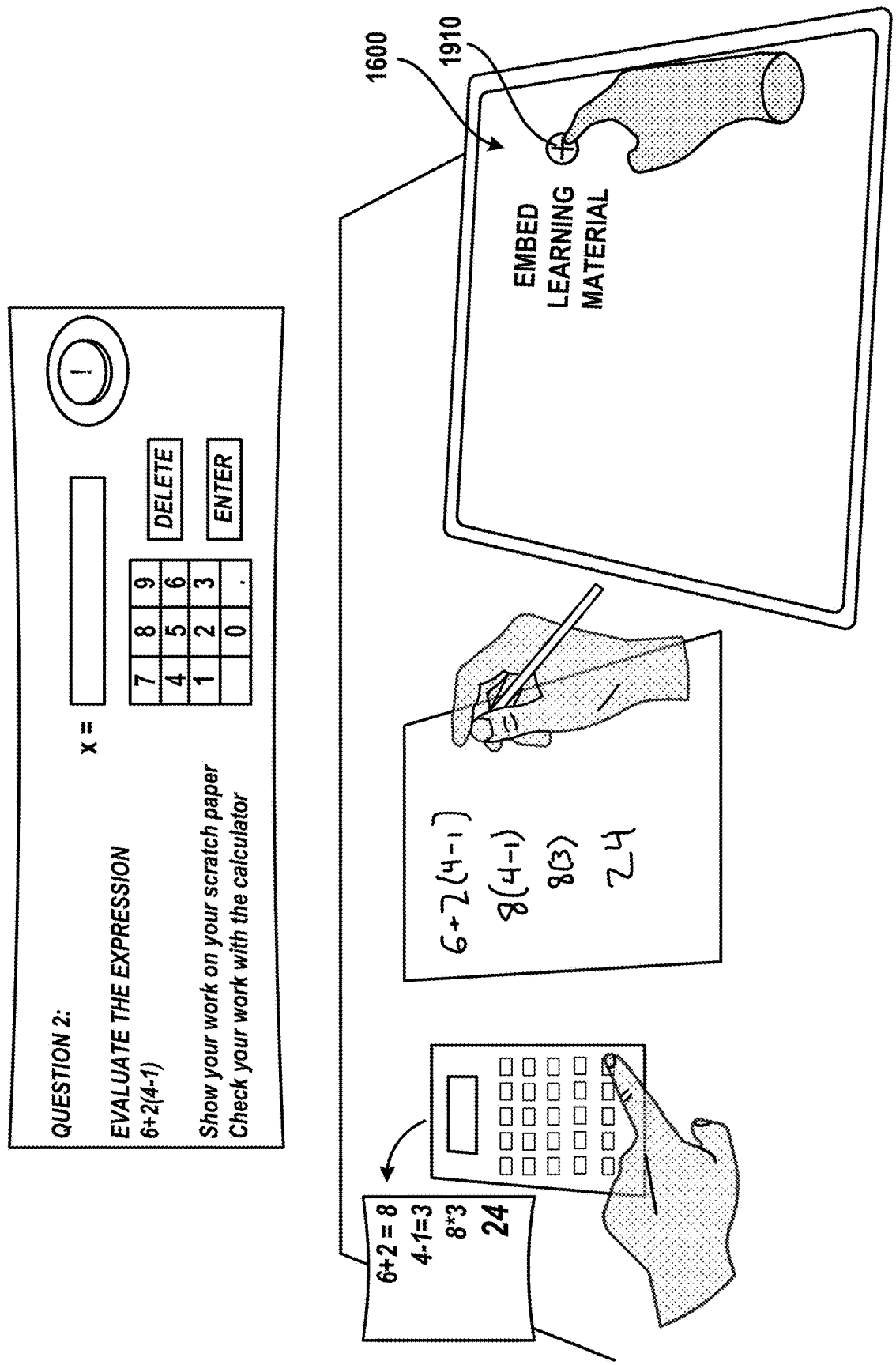
FIG. 19A is an illustration showing a user within the XR learning environment and interacting with the assessment record, including generating a branching point for inclusion of learning materials in association with the assessment record according to one embodiment of the invention.
Figure 19B:
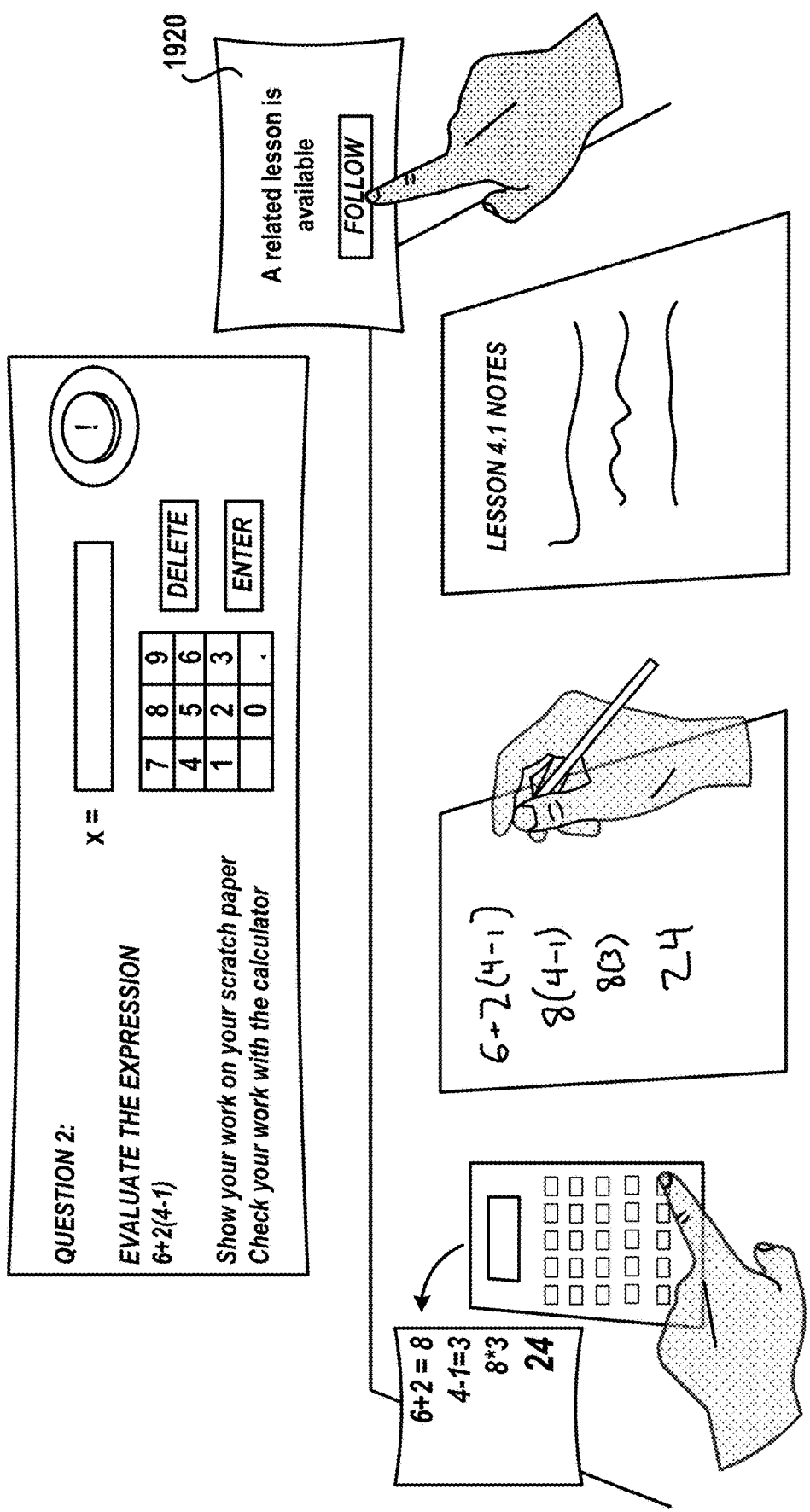
FIG. 19B is an illustration showing a branching point displayed to the user enabling the user to "follow" the branching point and view the learning materials associated with the branching point according to one embodiment of the invention.

In some embodiments, as shown in FIGS. 19A-20B, the system can enable users to add embedded learning materials (e.g., links, branches or additional tracks) in assessment records and viewable curriculum information including assessment modules based on further review sessions by one or more users, and can further display a current version of an assessment record to a user within the XR learning environment, display to the user an option to select one or more paths to take upon reaching an embedding within the assessment record, and display the embedded item (e.g., the assessment record, the first feedback information, the second feedback information, and/or the new curriculum item or linked media file) according to the selected path. In the example of FIG. 19A, a user interacting with the assessment record in the XR environment can be provided with the option, such as by a selection interface 1910 on a VR tablet 1600, to embed learning material that may be associated with a lesson recording from the XR learning environment, which may be recorded at the database in association with the curriculum. FIG. 19B shows another user being presented with an option to "follow" the embedded learning material when viewing the assessment record, such with a "follow" selection interface 1920 appearing in the environment, which allow the user to "enter" the lesson recording. FIG. 20A shows an example tree diagram where branch n 2005 associated with the assessment record 2000 links to the lesson recording 2010; FIG. 20B shows a corresponding tree diagram associated with the lesson recording 2010, which may include an embedding that links to the related portion of the assessment record 2000.

In another aspect, users can extract aspects of assessment records and feedback information (such as the first feedback information or the second feedback information) for use in future lessons or documents. In one example, a user such as the third user (e.g., an instructor) can extract a portion of the assessment record associated with a particular area of the assessment module for display and discussion within the XR learning environment during a lesson at a later date. The portion of the assessment record selected by the third user can be copied and embedded within the viewable curriculum information represented within the database for the lesson for later viewing by other users in connection with other curriculum items associated with the lesson. The system can save examples of correct inputs and incorrect inputs given by users along with any additional inputs for context, enabling instructors to have a better idea of the thought process experienced by students. In this manner, instructors can create micro-lessons or time-shifted lessons within the XR learning environment that use actual student work recorded within the XR learning environment as a catalyst; this can also be accomplished for study group sessions facilitated by the system within the XR learning environment.

Similarly, users can retroactively update their assessment records at any time to correct their answers, provide annotations, or include additional information, such as embedding a link to another curriculum item of the viewable curriculum information such as a lecture slide, media file or other object. For instance, the first user can return to view a portion of the assessment record associated with a particular area of the assessment module within the XR learning environment to embed a video from a later lesson in which concepts may be connected. When returning to the assessment module for review at an even later date, the student can view aspects of the assessment record as originally obtained, previously embedded feedback information (e.g., the first feedback information and/or the second feedback information), and the video from the later lesson that the student had previously embedded within their assessment record and associated with the assessment module. In some embodiments, the system can enable users to return to the assessment module to enter new inputs and interact with the one or more assessment objects for another try.

The system can also automatically update assessment records with passive input from users to reduce cognitive overhead that an instructor would otherwise need to apply to stay organized. For instance, the third user (e.g., the instructor) may retrieve a sub-assessment module from a previously administered assessment module from the viewable curriculum information for display and discussion within the XR learning environment at a later date, which may include information from one or more assessment records. The third user may write a document including a page of notes, record audio, and move their avatar around within the XR learning environment during the discussion; all of which can be recorded by the system as an instructor recording in association with the assessment module. The system can identify that the third user is retrieving the sub-assessment module from the assessment module and can automatically update the assessment module to embed aspects of the instructor recording or another media file or embed a link to the aspects of the instructor recording or another media file for later viewing that connects the document and the instructor recording featuring their discussion with regards to the assessment module. In another aspect, the system can also automatically update the viewable curriculum information to include a new curriculum item that includes the document and the instructor recording and links the new curriculum item to the assessment module. When another user (such as the first user) accesses either the assessment module or the new curriculum item within the XR learning environment at a later date, the system can present the assessment module to the user with options to follow one or more "branches" of information for display within the XR learning environment.

By allowing users to update or otherwise change the information displayed within the XR learning environment in a synchronous or asynchronous manner, learning materials accessible within the XR learning environment can become more valuable to students by continually providing personalized context to post-assessment review. By capturing object data as well as audio, video, and other information, the system can re-create and allow alteration of immersive experiences of users within the XR learning environment.

Computer-Implemented System

Figure 21:
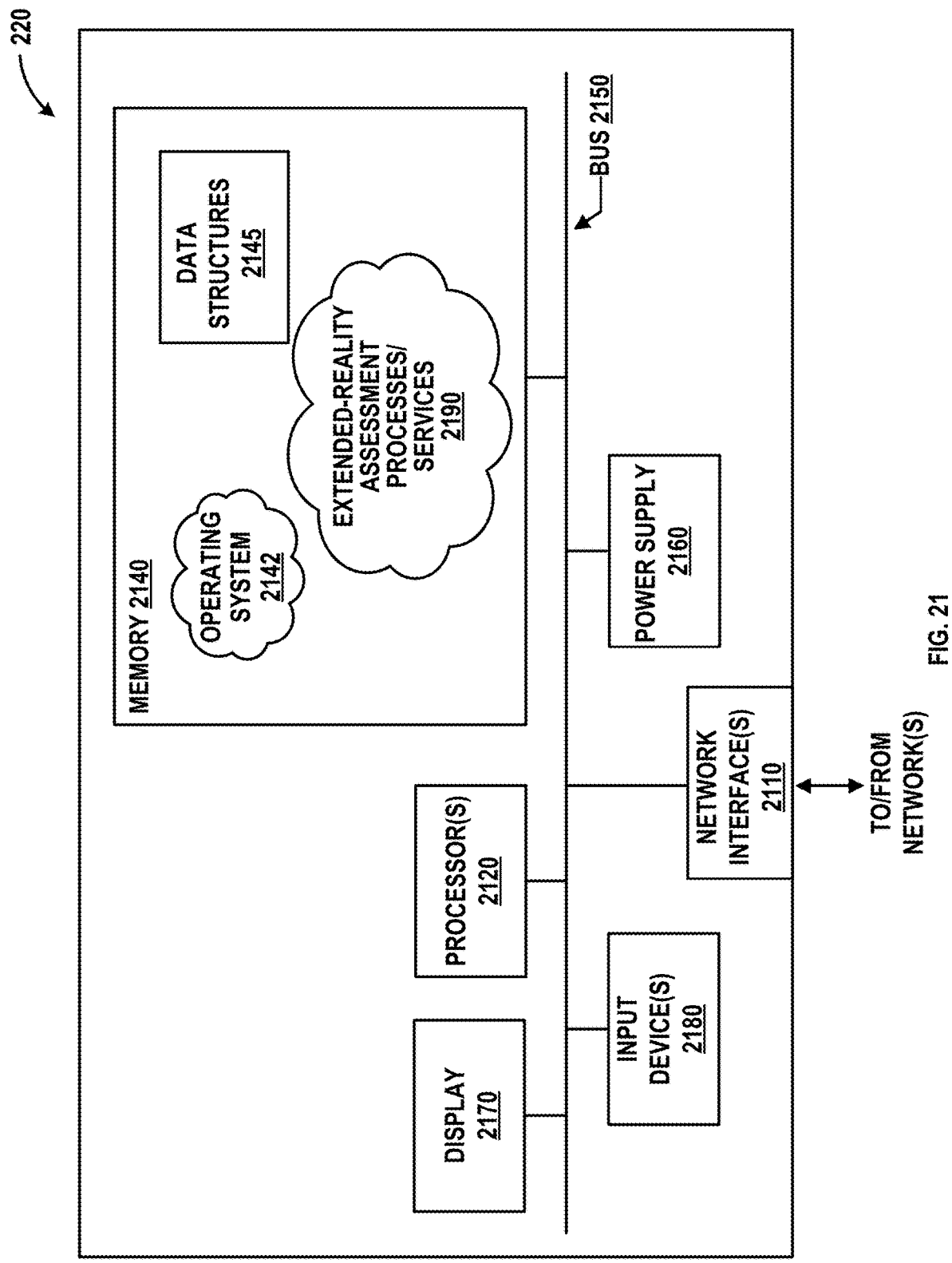
FIG. 21 is a simplified block diagram showing a general computing device for implementation of an extended reality system implementing educational assessment according to one embodiment of the invention.

FIG. 21 is a schematic block diagram of an example XR device 220 that may be used with one or more embodiments described herein, e.g., as a component of the system shown in FIG. 2.

XR device 220 comprises one or more network interfaces 2110 (e.g., wired, wireless, PLC, etc.), at least one processor 2120, and a memory 2140 interconnected by a system bus 2150, as well as a power supply 2160 (e.g., battery, plug-in adapter, solar power, etc.). XR device 220 can further include a display 2170 for display of the XR learning environment, where display 2170 can include a virtual reality display of a VR headset. Further, XR device 220 can include input device(s) 2180, which can include audio input devices and orientation/inertial measurement devices.

Network interface(s) 2110 include the mechanical, electrical, and signaling circuitry for communicating data over the communication links coupled to a communication network. Network interfaces 2110 are configured to transmit and/or receive data using a variety of different communication protocols. As illustrated, the box representing network interfaces 2110 is shown for simplicity, and it is appreciated that such interfaces may represent different types of network connections such as wireless and wired (physical) connections. Network interfaces 2110 are shown separately from power supply 2160, however it is appreciated that the interfaces that support PLC protocols may communicate through power supply 2160 and/or may be an integral component coupled to power supply 2160.

Memory 2140 includes a plurality of storage locations that are addressable by processor 2120 and network interfaces 2110 for storing software programs and data structures associated with the embodiments described herein. In some embodiments, XR device 220 may have limited memory or no memory (e.g., no memory for storage other than for programs/processes operating on the device and associated caches). Memory 2140 can include instructions executable by the processor 2120 that, when executed by the processor 2120, cause the processor 2120 to implement aspects of the system and the methods outlined herein.

Processor 2120 comprises hardware elements or logic adapted to execute the software programs (e.g., instructions) and manipulate data structures 2145. An operating system 2142, portions of which are typically resident in memory 2140 and executed by the processor, functionally organizes XR device 220 by, inter alia, invoking operations in support of software processes and/or services executing on the device. These software processes and/or services may include Extended Reality (XR) assessment processes/services 2190, which can include methods and/or implementations of standalone processes and/or modules providing functionality described herein. While XR assessment processes/services 2190 are illustrated in centralized memory 2140, alternative embodiments provide for the processes/services to be operated as programmed software within the network interfaces 2110, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the XR assessment processes/services 2190 is shown as a standalone process, those skilled in the art will appreciate that this process may be executed as a routine or module within other processes.

Machine Learning Models

Figure 22:
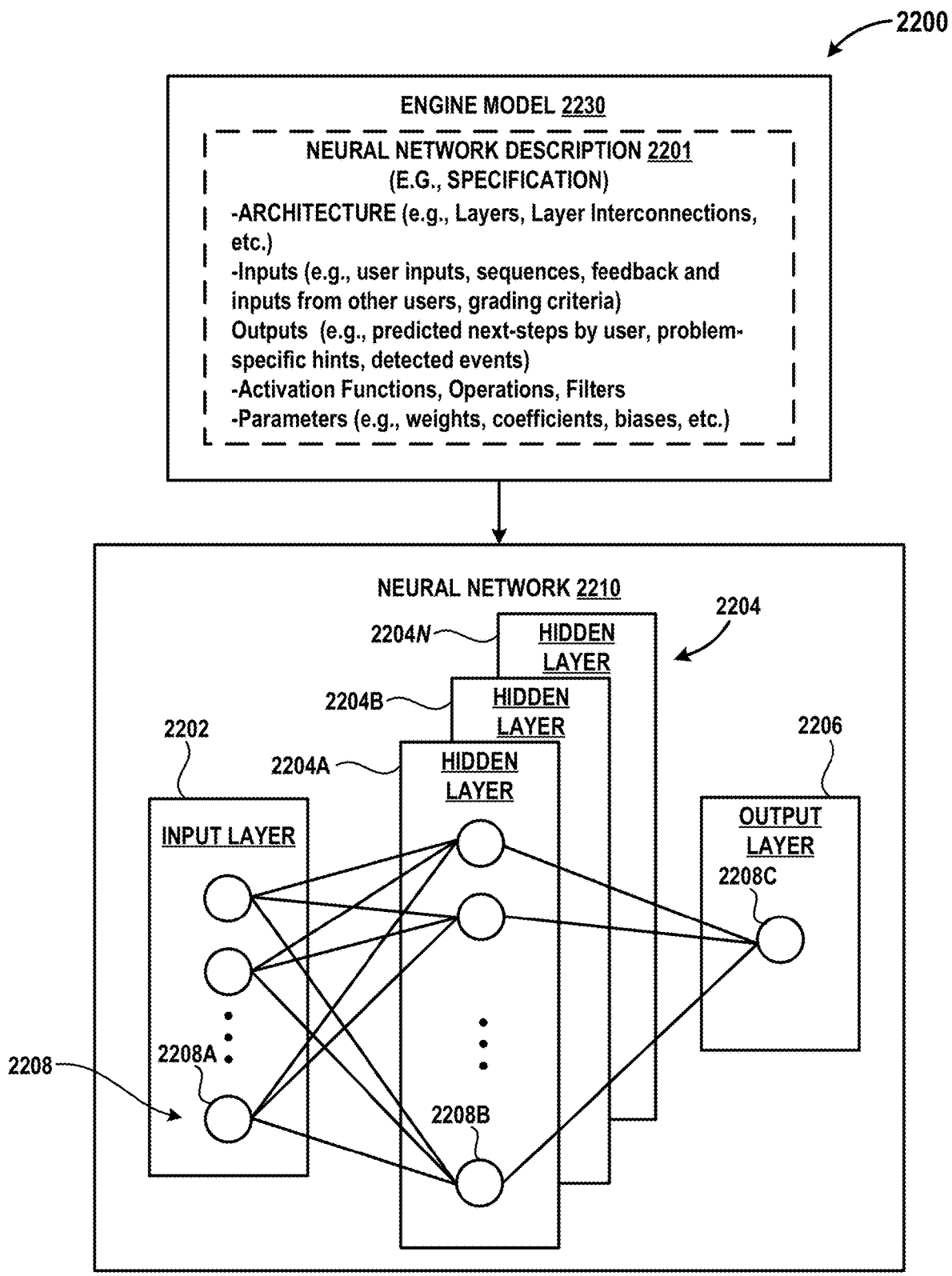
FIG. 22 is a simplified block diagram showing a general neural network for implementation of one or more aspects of an extended reality system implementing educational assessment according to one embodiment of the invention.

FIG. 22 is a schematic block diagram of an example neural network architecture 2200 that may be used with one or more embodiments described herein, e.g., as a component of system shown in FIG. 2 and/or XR device 220 shown in FIGS. 2 and 21, and particularly as a component of modules for grading and post-processing, such as for natural language processing, handwriting recognition, sequence extraction, and hint generation. Other possible implementations of the neural network architecture 2200 can be used by the system 200 to detect events during administration of assessments or during review sessions (e.g., detecting incidents of academic dishonesty, indications of distress or lack of understanding by the student, or other events).

Architecture 2200 includes a neural network 2210 defined by an example neural network description 2201 in an engine model (neural controller) 2230. The neural network 2210 can represent a neural network implementation of one or more grading and/or post-processing modules. The neural network description 2201 can include a full specification of the neural network 2210, including the neural network architecture 2200. For example, the neural network description 2201 can include a description or specification of the architecture 2200 of the neural network 2210 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 2210 reflects the architecture 2200 defined in the neural network description 2201. In an example, the neural network 2210 includes an input layer 2202, which includes input data, such as user input corresponding to one or more nodes 2208. In one illustrative example, the input layer 2202 can include data representing a portion of input media data such handwriting written along a "scratch paper" document within the XR environment, or other inputs such as calculator sequences entered by a user.

The neural network 2210 includes hidden layers 2204A through 2204N (collectively "2204" hereinafter). The hidden layers 2204 can include n number of hidden layers, where n is an integer greater than or equal to one. The number of hidden layers can include as many layers as needed for a desired processing outcome and/or rendering intent. The neural network 2210 further includes an output layer 2206 that provides an output resulting from the processing performed by the hidden layers 2204. In an illustrative example, the output layer 2206 can provide text extracted from the scratch paper document completed by the user based on handwriting provided to the input layer 2202. In another example, the output layer 2206 can predict a next calculation sequence to be entered by the user, or can determine one or more errors in a calculation sequence.

The neural network 2210 in this example is a multi-layer neural network of interconnected nodes. Each node can represent a piece of information. Information associated with the nodes is shared among the different layers and each layer retains information as information is processed. In some cases, the neural network 2210 can include a feed-forward neural network, in which case there are no feedback connections where outputs of the neural network are fed back into itself. In other cases, the neural network 2210 can include a recurrent neural network, which can have loops that allow information to be carried across nodes while reading in input.

Information can be exchanged between nodes through node-to-node interconnections between the various layers. Nodes of the input layer 2202 can activate a set of nodes in the first hidden layer 2204A. For example, as shown, each of the input nodes of the input layer 2202 is connected to each of the nodes of the first hidden layer 2204A. The nodes of the hidden layer 2204A can transform the information of each input node by applying activation functions to the information. The information derived from the transformation can then be passed to and can activate the nodes of the next hidden layer (e.g., 2204B), which can perform their own designated functions. Example functions include convolutional, up-sampling, data transformation, pooling, and/or any other suitable functions. The output of the hidden layer (e.g., 2204B) can then activate nodes of the next hidden layer (e.g., 2204N), and so on. The output of the last hidden layer can activate one or more nodes of the output layer 2206, at which point an output is provided. In some cases, while nodes 2208 (e.g., nodes 2208A, 2208B, 2208C) in the neural network 2210 are shown as having multiple output lines, a node has a single output and all lines shown as being output from a node represent the same output value.

In some cases, each node or interconnection between nodes can have a weight that is a set of parameters derived from training the neural network 2210. For example, an interconnection between nodes can represent a piece of information learned about the interconnected nodes. The interconnection can have a numeric weight that can be tuned (e.g., based on a training dataset), allowing the neural network 2210 to be adaptive to inputs and able to learn as more data is processed.

The neural network 2210 can be pre-trained to process the features from the data in the input layer 2202 using the different hidden layers 2204 in order to provide the output through the output layer 2206. In one example, the neural network 2210 can be trained using training data that includes data collected during administration of past assessments, corresponding grading data, and the like. For instance, training data can be input into the neural network 2210, which can be processed by the neural network 2210 to generate outputs which can be used to tune one or more aspects of the neural network 2210, such as weights, biases, etc.

In some cases, the neural network 2210 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 2210, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 2210 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 2210 can perform a backward pass by determining which inputs (weights) most contributed to the loss of the neural network 2210, and can adjust the weights so that the loss decreases and is eventually minimized.

A derivative of the loss with respect to the weights can be computed to determine the weights that contributed most to the loss of the neural network 2210. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 2210 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 2210 can represent any other neural or deep learning network, such as an autoencoder, a deep belief nets (DBNs), and recurrent neural networks (RNNs), etc.

Processes

Referring to FIGS. 23-28, a variety of processes can be implemented in connection with XR assessment technologies disclosed herein.

Exam Mode

Figure 23:
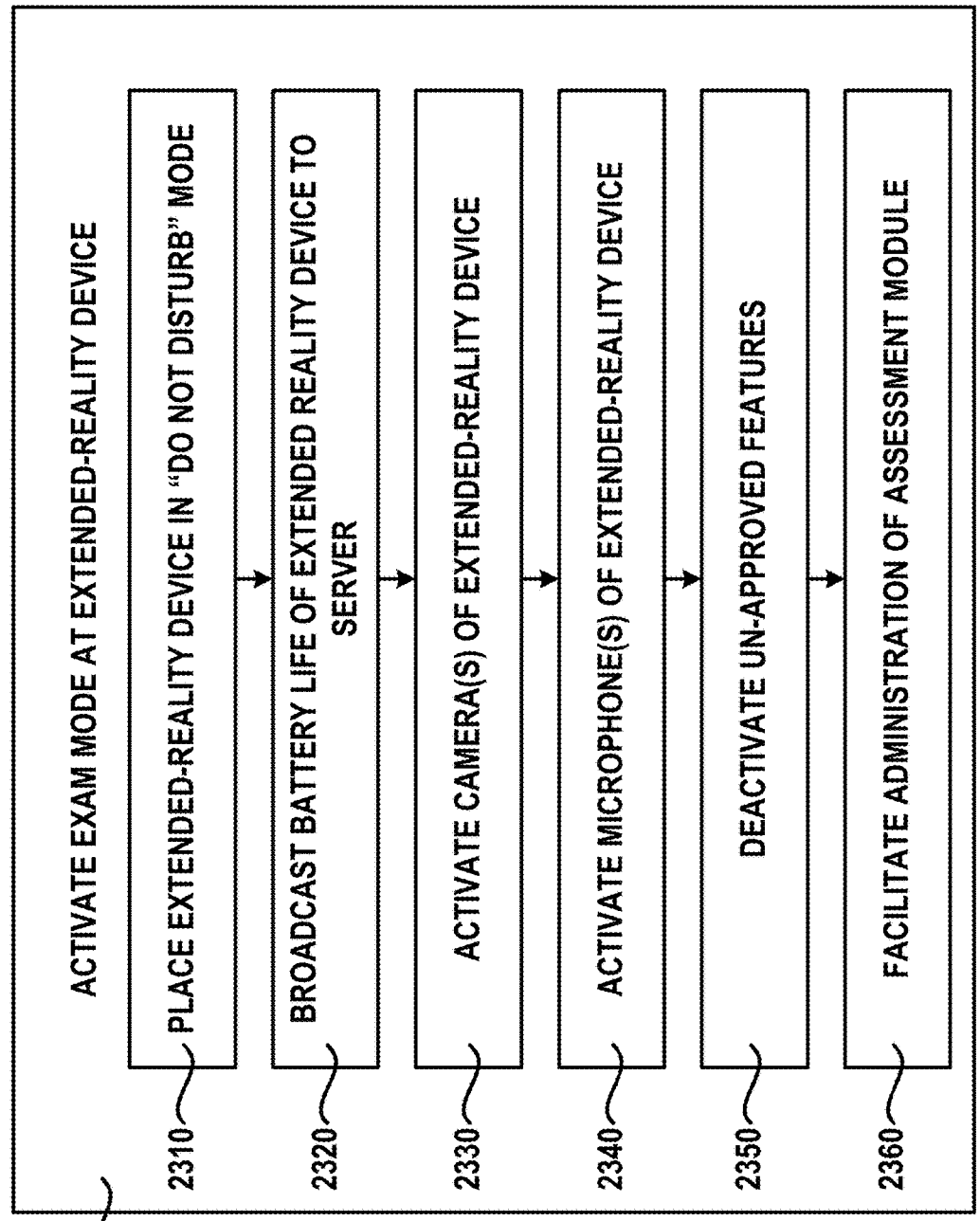
FIG. 23 is a process flow diagram showing activation of "exam mode" by an extended reality system implementing educational assessment according to one embodiment of the invention.

FIG. 23 illustrates and embodiment for an "exam mode" process 2300 or "assessment mode," when a user is intended to be fully focused, insulated from attempts to cheat and being in a controlled XR environment for an assessment, such as an exam or quiz being given the user in the XR environment.

At step 2301, exam mode process 2300 is initiated by the assessed user, by another user (such as an instructor) or automatically (such as based on time) on the XR device of the assessed user. Once exam mode process 2300 is initiated, several functionalities of the XR platform or related applications may be altered as follows (and without limitation as to particular order of steps): at step 2310 the XR device is placed in "do not disturb" mode to block communications to the assessed user; at step 2320 the battery life of the XR device is communicated to a network server so that there is documented record of how much battery the assessed user had at beginning assessment which might lead to instructing the user to more fully charge the device before beginning the assessment or could be used to resolve any dispute as to whether an assessed user intentionally turned off the XR device during the assessment; at step 2330 external and/or internal cameras of the XR device can be activated to monitor and/or document the external real world environment of the assessed user, and possibly also the user's face, expressions and eyes during the assessment; at step 2340 the microphone of the assessed user's XR device may be activate to monitor and/or document sounds, talking and like noises associated with the user and/or the real world environment near the user during the assessment; at step 2350 unapproved applications, browsers and browser links, and other unapproved features of the XR platform may be rendered inaccessible to the assessed user during the assessment; and at step 2360 functionalities, such as software process(es) and modules, are triggered to initiate and/or facilitate administration of an assessment module.

Generating Assessment Record

Figure 24:
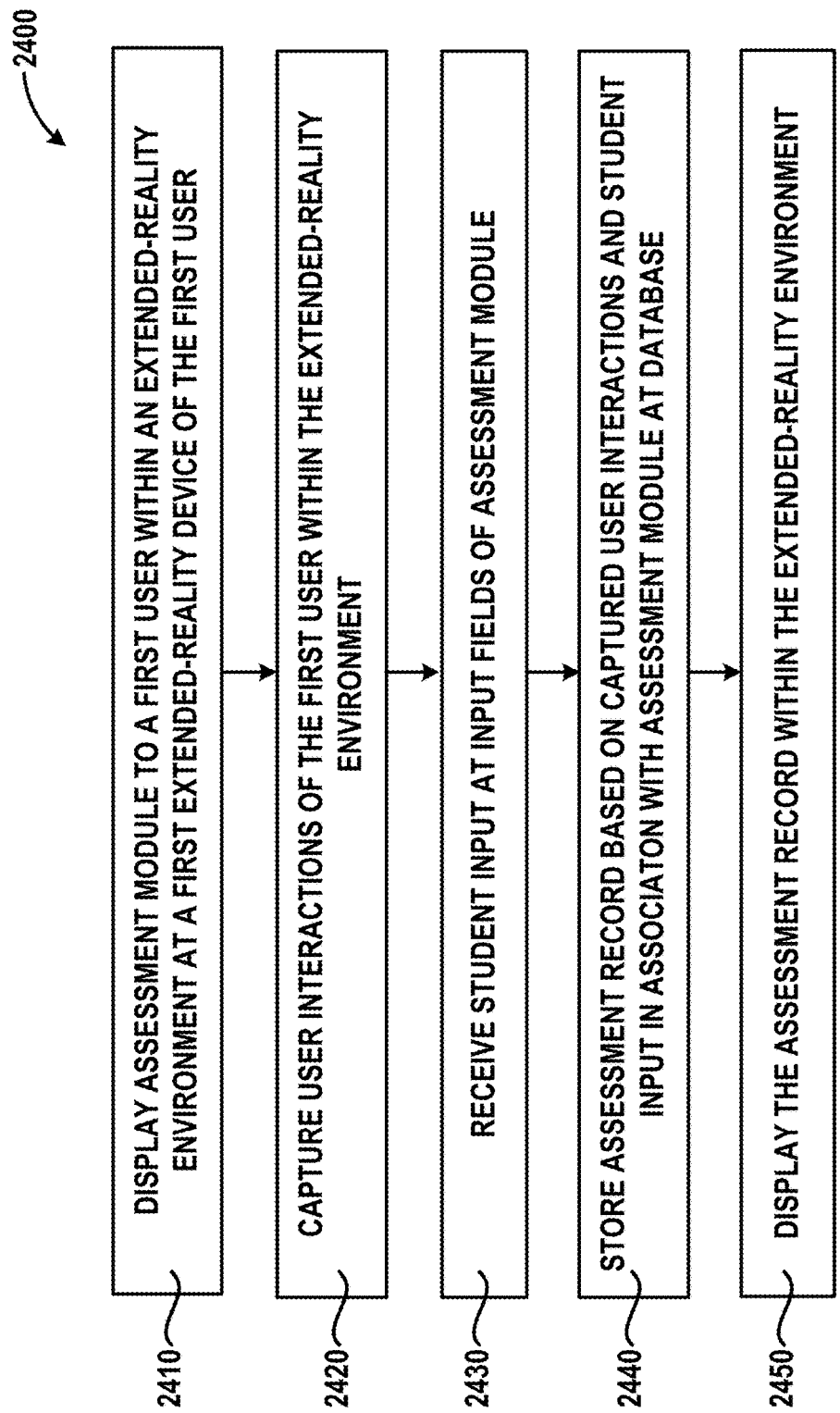
FIG. 24 is a process flow diagram showing recordation of an assessment record by an extended reality system implementing educational assessment according to one embodiment of the invention.

Referring to FIG. 24, and with reference to FIGS. 7A-8C, a process 2400 for generating and storing an assessment record/recording is shown. When the assessment module is initiated to the assessed user in the XR environment, an assessment is presented visually that may also include audio to an assessed user preferably using, including wearing, an XR device at step 2410. At step 2420, the assessed user's interaction with the XR environment and XR objections in the environment are captured, i.e. recorded as audiovisual recording and also preferably with underlying data (such as spatial data, user inputs and the like) relative to the user and XR objects. At step 2430, the XR system receives assed user's input to input field(s) of the assessment module. At step 2440, an assessment record, such as an audiovisual recording and associated underlying data, is captured based on the user's interactions and inputs in the XR environment. At step 2450, the assessment record/recording may be accessed, such as by one or more of another evaluating user (e.g. instruction/tutor) or the assessed user or other additional users to provide feedback or review the assessment record.

Grading Processes

Figure 25:
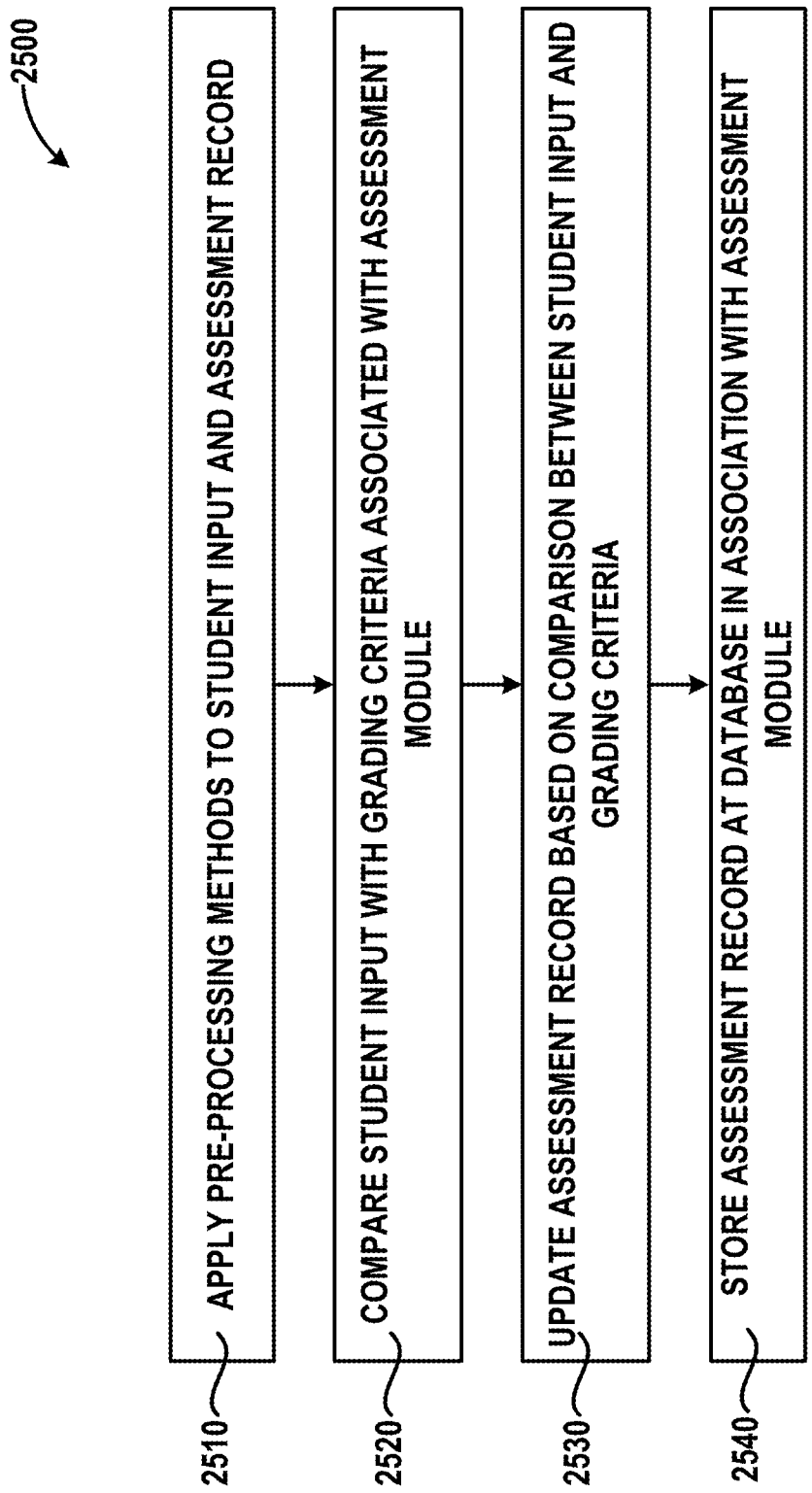
FIG. 25 is a process flow diagram showing a grading process by an extended reality system implementing educational assessment according to one embodiment of the invention.
Figure 26:
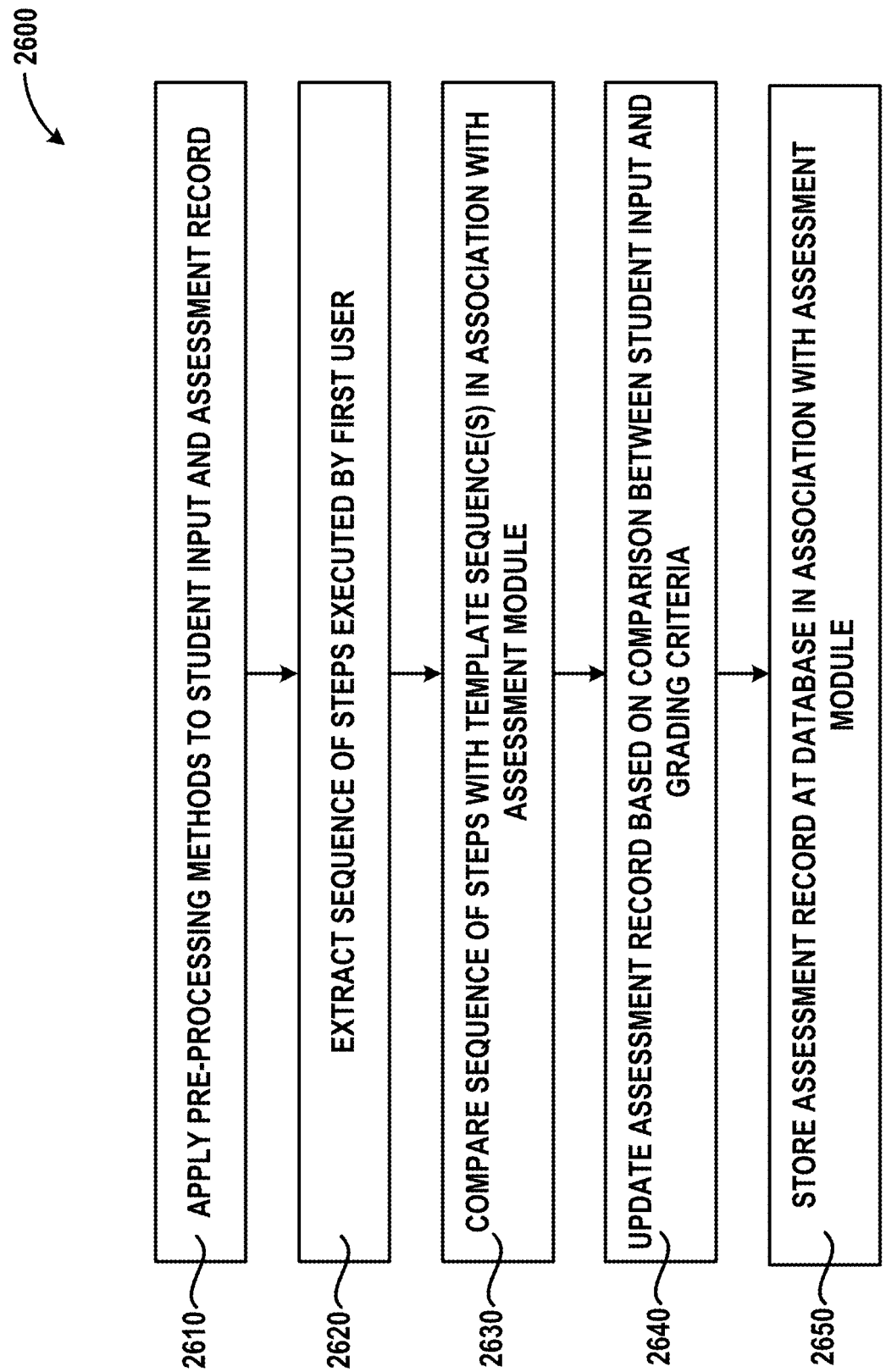
FIG. 26 is a process flow diagram showing sequence extraction of the grading process by an extended reality system implementing educational assessment according to one embodiment of the invention.

Referring to FIGS. 25 and 26, and with further reference to FIGS. 10A-10G, grading process 2500 is shown by comparing user inputs to expected inputs based on grading criteria and grading process 2600 is shown by comparing a sequence of steps executed by assessed user versus a template of expected sequences with associated grading criteria.

At step 2510 of process 2500, a pre-processing method is applied to student input of an assessment record. The assessed user's input is compared to the grading criteria for expected inputs as set forth in the assessment module at step 2520. At step 2530, the assessment record is updated based on the comparison of the assessed user's input and application of the grading criteria. At step 2540, the assessment record, as updated, is stored in a database associated with the assessment module.

At step 2610 of process 2600, a pre-processing method is applied to student input of an assessment record. At step 2620 of process 2600, a sequence of steps executed by the first user is extracted based on the student input. The assessed user's input is compared to the template sequence(s) for expected inputs as set forth in the assessment module at step 2630. At step 2640, the assessment record is updated based on the comparison of the assessed user's input and application of the grading criteria. At step 2650, the assessment record, as updated, is stored in a database associated with the assessment module.

Hint Processes

Figure 27:
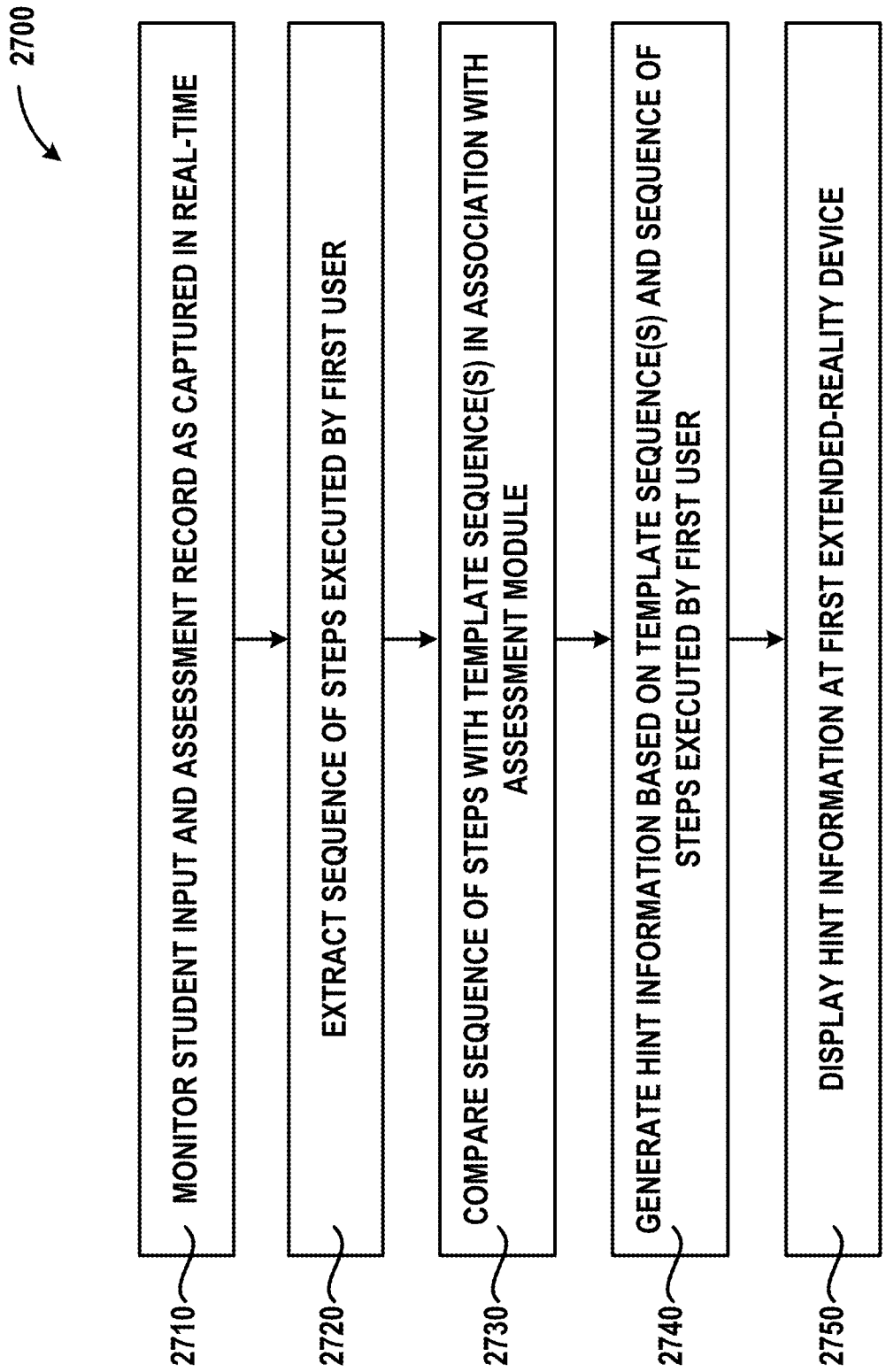
FIG. 27 is a process flow diagram showing real-time hint generation of the grading process by an extended reality system implementing educational assessment according to one embodiment of the invention.

Referring to FIG. 27, a hint process 2700 is shown as applied to an assessed user during a real-time assessment in a XR environment. At step 2710, the inputs are monitored and captured for an assessed user being monitored in real-time while an assessment record is being created. A sequence of steps is extracted from the assessed user's inputs at step 2720. At step 2730, the extracted sequence steps are compared to expected steps of a template sequence(s) of the assessment module. Based on the results of comparison of the extracted user input steps to the template steps, hint information may be generated at step 2740 and then the hint information is displayed on the assessed user's XR device at step 2750.

Feedback Process

Figure 28:
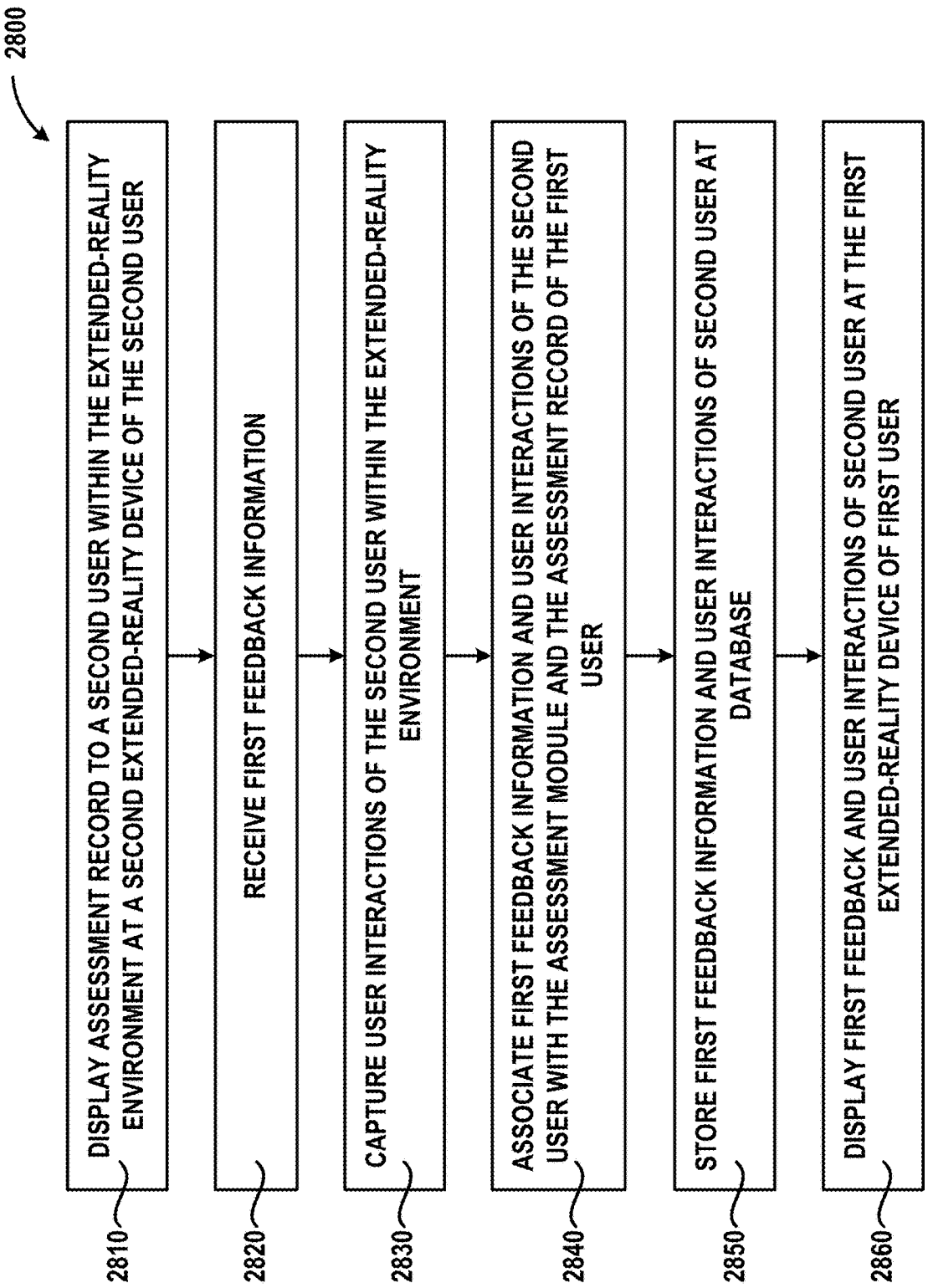
FIG. 28 is a process flow diagram showing capture and display of feedback information with respect to an assessment by an extended reality system implementing educational assessment according to one embodiment of the invention.

Referring to FIG. 28, and with further reference to FIG. 12, a feedback process 2800 is shown as applied to an assessment record/recording in a XR environment. It will be appreciated that the feedback process 2800 products a feedback recording branch as described herein.

At step 2810 an initial/main assessment recording of a first user's assessment record is displayed to a second user, such as an instructor or tutor. At step 2820, feedback information is received from the second user. At step 2830, feedback interactions of the second user are captured, such as in audiovisual format as a recording. At step 2840, the second user's feedback interactions are associated with the assessment module and the assessment record of the first user. At step 2850, the second user's feedback information and interactions that are captured and associated with the assessment module are stored at a database. At step 2860, the stored feedback Information and feedback of the second user are displayed when retrieved for viewing from the database, such as by the first user or other users that want to review the feedback recording branch.

Use Cases Using XR Assessment

In various embodiments, the components, systems and processes described herein may be used to provide improved assessment methods and technologies in XR environments.

In particular, creating feedback recordings support numerous different use cases to enhance educational experiences in different situations.

For example, if an instructor is an athletic coach, the coach can interact with a recorded game in an XR environment to create an audiovisual feedback branch recording where the coach renders themselves on the field to demonstrate what went wrong, including being able to point at players, objects, spacing or other points of interest, and provide players a spatial understanding of what happened and why, and what they should do next time In further embodiments, a physical ball or other sports equipment could be incorporated into an XR experience, such as including trackers on the ball or "triangulating" where the ball went based on camera feeds (e.g., a football may need 2 or more sensors due to the shape of the football, whereas a baseball may only need 1 sensor). It will be appreciated that a coach could view an XR recording of the mapping of the physical ball or athletic equipment and provide feedback that can result in physical performance improvements.

In various embodiments, instructors can use XR assessment techniques described herein to gather information and provide feedback to multiple students that all engaged separately in the same activity.

For example, a teacher could give math quizzes to multiple students at once. At end of time limit for the quizzes, the teacher can have all of the calculators of the students be shown at the same time, and might categorize correctness and execution: "5 students did it this way, 6 students did it this way, see how these two groups did it differently and ended up with the same answer, 8 students messed up in different ways, etc." Through such determinations the teacher could alter their teaching methods as to that subject matter and/or provide or obtain additional help for certain students, including providing additional practice or assessment modules in an XR environment to students that would benefit from the same.

In another example use case, a teacher might tell a class that all 30 of the students are individually going to be given instruction in an XR environment experience separately, and that each student will subsequently comment on how the instructor performed for them individually with each student's comments being recorded. The result will be 30 different comment experiences saved as XR recordings—one for each student. The instructor can go into all 30 of those experiences and pause and makes individual comments directed to each user's comments and recording that results in 30 feedback recordings from the instructor. There will now be sixty (60) recordings associated with the instructions experience—30 original student recordings and 30 feedback recordings by the instructor as derivative of the original student recordings. Students can return to their respective feedback recordings (and create another second feedback recording branch) or might join and interact in other students' original or feedback recordings. It will be appreciated that such branches could be created without limit, and is an example of a hybrid asynchronous and synchronous experience.

In some embodiments, users can turn off and on particular audio streams of particular users, such as when watching a feedback branch recording with multiple users appearing in the recording, so that multiple audio streams are not heard at once or are not recorded again when a particular user wants to record a feedback recording where their speaking audio stream or another audio stream is intended to be most relevant. In some instances, the audio streams of different users could be turned off and on all in the same feedback recording depending on which audio is desirable to highlight. It will be appreciated that a controls interface, such as with off/on and volume control of audio can be linked to each user in a particular XR recording, or even during live XR experiences with multiple users present, can be presented to each user via a settings menu, a VR tablet with controls or similar displayed audio control interface enabled to control audio of different users in the adjacent XR space of a particular user.

In other embodiments, systems of the invention can be caused to randomize one or more questions of an assessment so that, for example, question #3 for some students is question #20 for other students. This randomization can limit cheating and also provide insight as to whether where a question is placed in an examination might result in a different answer experience for some students. In a further embodiment, the instructions might choose to have question #3 (which could be the same or different for some students) and designate that everyone's answer to question #3 should include an explanation, such as each student creating an audiovisual recording explaining how they reached a result during the assessment.

In further embodiments, XR digital objects in feedback branch recordings can be altered, add, moved, replaced or otherwise changed so that the user providing feedback can create XR environment changes to that feedback recorded reality as compared to the original recorded reality. With conventional video that someone might provide audio or visual changes, such as superimposing commentary or creating video inserts, a commenting individual cannot enter into the 3D "reality" of the conventional video and cannot interact with the environment of the conventional video. Traditional video objects cannot readily be changed by a commenting user and there is no 3D environment to add more objects as in the XR environment or write on objects like a chalkboard, such that the next person (tomorrow, for instance) that "enters" the feedback recording experiences the XR environment differently with the changes to objects and/or the environment.

A conventional video is traditionally 30 photos/frames being shown per second. A photo is a locked-in image that a user cannot readily change through an interactive experience like an XR environment experience. In embodiments of the invention utilizing assessment feedback, a person experiencing an XR environment of an assessment recording can pause or manipulate objects in the environment "on the fly". In XR feedback assessment, users can actually change the objects in the feedback recording versus the initial assessment recording, and all possible camera angles and perspectives work with respect to the changes, as opposed to the tedious actions required to change a photo frame of a video recording that also does not have multiple camera angles.

Where an XR environment is changed in a subsequent XR audiovisual recording, such as an assessment feedback recording, it is advantageous to apply a rule that the most recent/current user actions and manipulations to environment overrides or takes precedent with respect to the previously recorded XR environment. For example, if an initial assessment recording shows User 1 holding a molecule, a future User 2 can take the molecule out of the hand of User 1. User 1's hand will still rotate, but no molecule is in it since the XR system is programmed to override the hand of User 1 with User 2's hand-grab of that same molecule. Similarly, if User 1 has written on chalkboard in an initial assessment recording (or other initial XR audiovisual recording), User 2 could create a feedback recording (or other subsequent XR audiovisual recording) where User 2 erases the work of User 2 in the XR environment. The hierarchy is that the latest person's activities in the XR environment "win" or take precedence over the prior activities of that XR environment. When a user enters the XR environment later, the system may also provide options to enter or "revert" to a previous version (e.g., the first version unadulterated by User 2).

It will be appreciated that assessments include assessing not only exams and quizzes, but may include any type of work or user to be assessed, including homework, practicing an activity, in-class work, performances and the like.

For example, an instructor may want to come back to watch the work of a student user that the student conducted in an XR environment. For example, the student might have taken a test or completed their homework in XR. The next day the instructor wants to see what the student did, and not just the output/answer, but how the student arrived at their output/answer. Essentially, the instructor can see the student "show their work" in a passive manner because of the recording of the student's work in the XR environment. It is passive because the student doesn't have to make a specific effort to show the student's work. The student does not have to write anything down or keep their work organized, etc., since the instructor can just go back later and watch every hand movement, of the student, examine the student's use of tools (like calculators), see the student's notes, and the like. The XR environment also provides embodiments of a 'passive recording system'—unlike would be needed in a "real world" conventional environment, it is not necessary to put significant numbers of cameras in every direction (or similar numbers of microphones synced to such cameras) and then stitch the video recordings and sound recordings together somehow. Instead, embodiments of the invention can utilize the 3D recording capabilities of an XR system to capture an audiovisual recording in all directions so that a user's activities can be re-visited, such as in assessments described herein.

In addition, the instructor (or even the student themselves, other students, or any other users with access to the student's recorded XR activity) can manipulate, add and change the student's recorded XR activity environment, such as providing audio and/or visual comments, marking notes, adding/removing/changing digital objects, and the like to provide a derivative feedback recording.

For example, an instructor can watch an XR activity of a user that includes the user's normal worksheet/scratch paper and click a "play" button and see what was written. By focusing only on the worksheet/digital object of interest, the instructor can save time by looking at only what was on the scratch paper at the time of the test question that is of interest to the instructor and can write on it or comment to the user.

In some embodiments, the scratch paper could be exported in a file (e.g., portable document format (PDF)) to the teacher, including outside of the XR environment, for the teacher to review. However, it is preferable for the teacher to enter the XR environment to write on the scratch paper or to grade the material and give feedback to the assessed user.

In some embodiments, users watching an assessment recording can pause and rewind and fast forward and jump directly to particular times of interest in an XR assessment recording. Users can also place bookmarks at particular moments/times of particular interest. In some instances, the XR system may also automatically create bookmarks for a particular activity so that users watching the assessment in XR can jump directly to the automatic bookmark. Example might include bookmarks created when a user talks during the assessment, uses a tool like a calculator, inputs an answer, starts/finishes each question, writes on scratch paper and the like. In one example, a teacher might say "take me to when a student circled A" and the teacher then jumps in the XR assessment recording right to the XR 3-D clip of 10 seconds before and 10 seconds after that the user was doing before and after A was circled by the user.

In some embodiments, digital scratch paper can be provided in an XR environment that avoids the problem in the real world when users receive only one piece of scratch paper and write, "scribble", and/or erase all over their scratch paper until it is illegible (i.e., messy) and a user or instructor cannot examine the same to understand why the user arrived at a particular answer from such paper. In embodiments of an assessment be given to a user in an XR environment, one or more functions can improve the assessment experience compared to real world scratch paper such as: (i) unlimited scratch paper (user can go to the next piece whenever user wants and each piece is recorded and saved, eliminating "space constraints" and resultant legibility problems) (ii) all of the hand movements, writing, calculator presses, etc., of a user can be tagged to make the same more enlightening/informative than just 'scratch paper' (all the movement and work that a user does is recorded to provide a full view of the assessment experience by the user and not just a piece of scratch paper); (iii) all the work a user does toward responding to a question is corresponded and saved as to which question is displayed to the user at the time of particular activities and solution work (eliminating "guesswork" involved in correlating scratch work to an associated question); (iv) calculator presses can be translated into text that so that the same can be exported and reviewed in XR without having to watch or infer calculator movements; and (v) calculator presses are assigned to correspond to a particular question that student is working on when the presses occur. Benefits of recording calculator presses can include verifying "calculation errors" (such as scenarios where the student demonstrates understanding of a valid sequence but arrived at the wrong answer by mis-typing calculator inputs) and can be used to help verify that submitted work was actually completed by the student.

The benefit of such tracking of assessment activities in XR, is that instructors can see students' understanding of what they're learning at particular times and with respect to particular material. Further, an instructor can compare practice/homework assessment activity for a user with exam assessment recording for that same user on the same topic and determine if the student is following how they practiced on the subject matter during the test. The XR system can be programmed to identify differences in how a user carried out similar assessment activities as different times and can notify a teacher that certain users are doing things just like they learned it, but other users are not—the other users may be entering different keystrokes or using different tools or sequences than what is expected or what users who are answering correctly are doing. This aspect can help instructors identify misunderstandings or errors when a sequence is incorrectly executed; on the other hand, this aspect can also be used to help instructors identify valid ways to "solve" a problem that may or may not be helpful for some users. For instance—if an instructor teaches one way to solve a problem, but one or more users demonstrate another (valid) way to solve the problem, the system can identify such an event and provide this insight to the instructor. The system may have access to or otherwise incorporate an extensive set of mathematics information to help interpret and/or verify validity of executed sequences. The system may be programmed to identify known terms, theorems properties, or strategies used within observed sequences based on the received input to provide additional annotations or contextual information (e.g., "used L'Hospital's rule", "used Pythagorean theorem", "used associative property", etc.). The instructor may use this information to improve instruction in the future (e.g., "I showed you one way to solve this, now here is another way"). Students may be rewarded or otherwise recognized for implementing creative solutions and demonstrating understanding of concepts.

In some embodiments, real-time monitoring and assistance can be provided to a user engaged in an XR assessment activity, such as doing homework on a particular topic. The XR system can be programmed to identify if the user makes a mistake from the expected solution activity or answer. For example, if the system detects that a user gets a question wrong or is producing errors, the system could notify and provide a tutor to help the user at that moment, could provide a recorded lesson (or virtual tutor) to assist the user in correcting the mistake or how to arrive at the answer, could ask the user if they would like a tutor to be contacted or notify an instructor that assistance is needed on the topic, and like assistive activities based on detection of user errors. In some embodiments, the system may provide these options by observing actions of the user within the XR environment. For instance, the system may "intervene" to provide access to further instruction or help if the user is observed to make the same or similar mistakes several times, if the user spends too much time on a problem or keeps starting over, if the user is observed to express frustration or dejection over a problem, etc.

A key benefit if a tutor or instructor joins the user, is that the tutor can be in the XR room with the user to give you feedback right then and have an actual conversation between each other to help the student user learn the material and avoid what they are doing that results in an error.

In one embodiment, when a tutor or instructor joins the student user in the XR room, the system undoes work the user has already completed and takes the user back to the beginning of the problem or work that resulted in the request for a tutor. The system can also ask the user first if the prefer such return to the beginning of work or not, such as with a message: "Do you want tutor now or do you want to go back in time to the point you requested tutor when they join the room?" Based on the user's reply, the user could wait in a queue waiting for a tutor to join or the user could move on to the next problem and when the tutor joins, the system takes both the user and tutor back to the point of the beginning of the problem when the tutor was requested. The return would be similar to "time travel" as the user does back in the recorded XR experience to the same location in the room, same scratch paper, same objects and tools, etc., that were present at that previous point in the user's XR assessment experience.

In some embodiments, tutor or instructor assistance is not synchronous with the student user being present as the same time for "live" discussion with the tutor but can be asynchronous.

For example, a student user might be doing homework in XR environment at night. The user might have scratch paper, tools, other digital objects, and the like. When the user struggles with a question, the XR system allows the user to flag, or might automatically flag the question based on an extended amount of time being spent on the question, where it is identified that user needs help (from teacher or a tutor). If teacher or tutor isn't available at that time when student is stuck, the tutor/instructor can go back the next day later and see exactly where the student was when they got stuck the night before in the XR assessment recording of the student doing the homework the previous evening. The instructor can also jump to bookmarked flags of when the student was struggling with questions and review the student's work and provide feedback in derivative feedback recording at those flagged moment. The student can go back into the XR environment later after the instructor has provided the feedback recording and asynchronously watch the feedback for their work to learn the subject matter and avoid future errors.

Through asynchronous recordings of student assessment in XR, teacher feedback in XR and student watching of the feedback in XR, the teacher/tutor know exactly where and when a student went wrong, and how the student can learn and improve in the future. Unlike asynchronous messaging (like e-mails or discussion boards) the XR assessment and feedback recordings allow the instructor/tutor and student user to see avatars of one another along with scratch paper, tools and other digital objects to approximate a "live" interaction with each other while being in asynchronous communication.

As described herein, instructors in XR environments can focus and export certain parts and objects of the extended reality. For example, a teacher could request just the scratch paper, or just the calculator keystrokes, just hand movements, and the like, form one or more students of class that are engaged in an assessment. If 50 students were each using calculators in an XR assessment, a teacher could watch just the calculators—either in the teacher's XR environment or through an application, browser or the like that renders all of the calculators for the teacher to view. In various embodiments when a user focuses on just a specific thing in an XR 3-D video recording that thing could be zoomed or enlarged for making it easier to view—focusing on hands and calculator and the XR video enlarges those to that a user just sees those things in the recording. In a further aspect, exported materials can be made available for viewing on a desktop or laptop computer (e.g., viewable within a web browser) and for printing to physical media (e.g., paper) upon request.

In certain embodiments, a user watching an XR recording can eliminate the distractions of other things happening in the XR room or environment. For example, a user in group with 5 students might have a question. An instructor or tutor can enter the XR "live" experience or a recording of an experience with focus on the one student and hide the things that the other students were doing in the room and only look at the reality of what the one student was doing who had the question. This might occur through a spotlight on the student and darkening other persons and objects in the XR room, or might be a "zoom-in" experience where just the student and tutor/teacher are shown together.

In other embodiments, an XR tutoring system may be implemented using functionality described herein where tutors, or instructors, other students, coaches or other assisting users, are able to jump to the specific place and time that a user needs help with an activity, such as an assessment, in an XR environment.

In one embodiment, a "public room" is provided to provide tutoring assistance with a particular course or subject. Thousands of users using XR devices, such as headsets, all over the world may be working on homework in their respective XR environments for that course. If someone needs help, they can activate an "I need help" request, such as via speaking the request, interacting with a selection interface, pressing a virtual "help" button and the like. Instead of a tutor joining their room upon the help request, which might occur in other described embodiment of the invention, the XR system can transport the student into the public room with other people (e.g., tutors/other students/instructors) waiting in the XR environment with the public room available to help. The public room might mimic a library with tables, public work areas, and the like. Unlike private rooms in XR environments, the public room can make it "safer" for student users needing assistance to interact with those who are helping and also provide immediate availability of one or more assisting users to the student users. Further, other students in the public room may be able to provide aid in lieu of a designated tutor; as such, an assisting student may be able to show their materials (e.g., notes, scratch work, etc.) or send copies of their materials (if appropriate/allowable) to other students to help demonstrate concepts. This aspect can help students strengthen their understanding of concepts by allowing them to help others and/or see what strategies other students are employing.

In related embodiments, student users transported from their XR private rooms while doing homework to the XR public room might bring all related digital objects, such as scratch paper, calculator, models and the like with them to the public room for their use together with the tutor users. In other embodiments, students might choose to do their work in the XR public room (e.g., without needing immediate help) while tutor users are waiting for a student to raise their hand and a tutor user can move to them in the XR public room environment to assist on a virtual one-on-one basis.

In a further example, there could be 100 assisting users waiting in XR public room for student users to present questions to receive help with. When a student user enters the XR public room with a question, one or more of the 100 assisting users can all timeshift back and see an XR recording of the student user attempting to solve the question in order to determine the student was having trouble or making an error. The assisting user(s) may then provide feedback either by creating a derivative feedback recording for the student user to subsequently view or by audiovisual communication with the student user in near real-time.

It will be appreciated that restrictions can be placed on what and when assisting users can access with respect to a student user's XR recordings. The student user might provide such setting restrictions or default settings could be created by the system that recognize a particular question being worked on and limit the access of a tutor's watching and interaction with the student user XR recording to only that period of the recording applicable to the question of interest.

Where each assisting user makes edits or comments to what the student user has done in the recorded activity (when the student asked for help), the student user can see all the different feedback from all the different assisting users. The feedback could be presented in collective manner, like all assisting users comments posted into a single feedback assessment recording, or the student user could individually access one or more particular feedback recordings from the assisting users.

In addition to a student user setting permissions for what XR recordings and objects that an assisting user can access from the student user's past activity, student user can also block or allow (such as creating favorites) of particular assisting users relative to future assistance.

Student users could also give tutors/assisting user ratings in the XR system. If a tutor receives too many bad ratings then that assisting user might be flagged and get their "tutor" status taken away so they are blocked from assisting student users in the future.

In embodiments where a student user has been assisted, such as in a XR public room of tutors, the student user can provide a control input indicating when they are comfortable that they understand the material and the system can take the student user back to their private room or previous XR location where they were working. Everything from the student user's interaction with the tutor(s) in the public room is recorded as a feedback recording so that the student user can retrieve the XR recording of the learning experience and see the feedback if they need to review the subject matter again.

In some embodiments where assisting users are providing teaching feedback asynchronously, the assisting users can provide a control input indicating when they have completed their feedback, i.e., completed their feedback recording in XR to the student user. A student user can then choose which feedback recording to watch and if one feedback recording isn't helpful the student user, that student user can activate the next assisting user's feedback and keep going through the queue of assisting users that provide feedback recordings until the student user understands the material. In some embodiments, a default number of assisting users can be set for the number of feedback recordings that can be generated for a student user's request. In other embodiments, feedback recordings might continue to be made until the student user provides a control input that they now understand the material in question—at which time the request would be closed and assisting users would no longer be allowed to provide feedback. In still further embodiments, a certain time period might be provided for tutor feedback for a particular question and tutor feedback recordings could be made until the time expires or the user indicates they have received sufficient help with the question.

In another embodiment, a teacher could accompany a student into an XR experience, and they both could watch the student user from a third perspective, and not from inside the user's perspective, during an assessment recording. It would be as if the teachers and student user are 2 more "third persons" in the student user's original assessment experience, and they could discuss exactly what the student user did wrong by watching exactly what the student user's avatar did wrong during the assessment. The teacher and student user can pause the XR experience they are watching and talk to each other about it, and/or write comments into the recorded XR experience so the student user has a feedback recording of the experience to return to and watch again later.

In such embodiment when the student returns to the feedback recording, he would be watching 3 people in an XR room with his/her current self being the $4^{th}$ user. The people in the XR room would be: User 1—the past student user performing the assessment; User 2—the past student user engaged with the teacher in the first feedback experience; User 3—the teacher with the past student user engaged in the first feedback experience; and User 4—current student user watching the feedback recording.

As User 4 in a second feedback experience, the current student user could be able to pause the prior feedback recording (of the three users) and record and provide audiovisual insert, like adding a clip to a video. For example, an original XR assessment session/video could be 5 minutes long with student user only. One week later, student user and a teacher interactively enter the XR recorded experience and talk about it, e.g., pause the recording and talk for 2 minutes. Then the recording is now 7 minutes long since the 2-minute discussion is added into the 5 minute original assessment recording. Then the student user can go back again and watch everything (original student user, teacher/student user talking about it, and current student user=4 avatars in the XR room, but 3 of them are past or present "versions" of the student user).

This additive feedback insertion embodiment adds time to the overall XR audiovisual recording if the student user goes back and watches the video.

In embodiments, date and time stamps are indicated with respect to all users in a recording, such as over each avatar's head, so that when re-experiencing a recording, viewing users, such as teachers, tutors, other students, the student user and the like, can know what was done when and by whom.

In other embodiment, feedback can be provided as an XR assessment recording without pausing and adding in insertion of commentary or audiovisual clip that may otherwise lengthen the total recording. For example, a user could just talk about the recorded assessment as the original recording/scenario remains playing, such as superimposing audio or video or text or interactive feedback over the original recording.

It will be appreciated that recoding feedback over an original assessment recording (or an earlier feedback recording) does not add time to the original video.

Unlike traditional audiovisual recordings of classes or tutoring sessions, embodiments of the invention utilizing XR assessment recordings and feedback recording do not provide the ability to take on first person perspectives of themselves or other users such as:
  1. Users being able to re-live the tutoring experience as themselves in the exact same way they saw it the first time; and
  2. Student user being able to go back to a feedback recording and experience from tutors perspective so that they can see exactly what tutor was looking at while explaining things.

In some embodiments, users can take on the perspective of different users views upon providing a control input to switch to a particular avatar's body. For example, a tutee can "jump back and forth" from their avatar body to a tutor's avatar body to gain the particular perspective of the avatar body that the user is selecting. In other embodiments, users could select a particular location or be a 'third person" avatar and view a recorded XR experience from that other perspective instead of from the perspective of a user in the past recorded XR experience. In essence, a user can enter a recorded XR experience and watch it from anywhere and any perspective in the 3D XR environment that was recorded; alternatively, a user can go inside the perspective of a user's avatar in that experience.

As described herein, the "entering" of past XR recordings is not limited to watching, but also being able to make changes to past XR environment that are saved as new recording branches. These changes encompass commentary feedback, but also adding, manipulating, removing and altering digital objects, the past XR environment and XR media (including audiovisual material, hyperlinks to 2D and 3D content, initiating communications such as electronic messaging and calls, accessing electronic files, and the like).

Embodiments of the invention also enable instructors, tutors, coaches and other assisting users to more quickly and effectively interact with many student users at a time with respect to a particular XR activity, such as an assessment.

As an example, a teacher might instruct a classroom of 30 students on January $9^{th}$ that all 30 are individually going to go into an experience separately and that they are to each comment on what User X taught User Y during an XR recording of January $8^{th}$, and how each student would improve on the teaching method of User X. 30 different XR student commentary recordings would result; the teacher can go into all 30 of those separate XR experiences and make comments or other feedback, including pausing and overlaying comments/feedback or additive insertion of the feedback. In any case, there would be now 60 recordings—30 original commentary recordings provided by each student plus the 30 derivative feedback recordings of the teacher as to the original recordings. Because students (or other users, including other students) can go back into original recordings or derivative feedback recordings, there are limitless possibilities to the number of XR recordings that could be derived based on the original recordings.

Because the multiplicity of XR feedback recordings is a hybrid asynchronous and synchronous experience that could lead to multiple audio streams of multiple users speaking during a feedback recording, it is desirable that the system is programmed to include a control setting where a user experiencing an XR recording can turn audio streams on or off with respect to the users appearing in the experience.

In one embodiment, a teacher can visualize the multiplicity of user recordings like the roots of the tree and each root has a student user's name assigned and the teacher can provide a control input to select a root and "jump into" that part of the XR recording represented by the root.

In various use cases, the XR root selection could be used for assessment, homework, tutoring, coaching and the like. Specifically, a tutor could do a one-hour session with 20 students and teach a concept. Then, each student can go and ask questions creating an individual "root" for each student and their line of questions. The tutor could then visit the root of the recording for each respective student to provide answers in that student's "root."

In another embodiment, a tutor might provide a 4-hour session of subject matter instruction that prepares the students for an exam as part of an XR experience. When a student user has a question the next morning, instead of e-mailing a tutor and trying to explain what they don't know and what they might not realize they need help understanding, a student user can use XR to flag a specific portion of the session and ask the tutor about that part. The student user would preferably be able to see their own branches, while the tutor could see all branches. There would be a hierarchy of tutors/teachers vs. tutees/students wherein access permissions and restrictions would apply to accessing "branches" recordings and objects/materials in the recordings.

In an example use case, a chemistry professor might explain things too quickly for most student users. The professor might record a lecture in XR with students in the room or not. One or more teaching assistants ("TAs"), after the professor was done with the lecture, could go back into the XR recording of the lecture and pause the video recording every time the professor should have gone more in-depth and the TA could pause and say "this is what this really means" and then the student can keep going from that point watching TA's explanation, or they could watch original branch and just watch professor if the student user does not require the extra explanation. The user could also jump back and forth between tracks/branches. There could be a TA1 and TA2 track for 2 TAs. Student users only have to watch more in-depth explanations when it's needed and can choose if a particular TA's recordings are better for their understanding of the material. Each student could also add their own notes and feedback in the XR recording they are watching.

In the TA XR recording track example, a TA can enter the professor's original lecture recording and supplement the Professor's lecture and further explain steps. The supplement could include adding or changing objects in the recording, such as presenting a model of a molecule that the professor did not show in the original lecture.

Where student users have recorded their own feedback, such as notes or commentary, a student user can return to their feedback recording (e.g., when studying for final exam) and go back to either the track that student added on top of professor, or go back to the original professor's track without any changes by the student. The student user could also access a TA's track if further information is helpful to the student.

In an embodiment where a student user is experiencing an XR lecture or class is near "real time", a student user could pause, add notes, add commentary inserts and the like, during the near "real time" class/lecture and then continue the lecture, such as by unpausing the lecture so it remains at almost "real time" and not miss anything the professor says. In other embodiments, an XR system can be programmed to permit users to set rules for how reality automatically changes when participating in a "real time" or recorded XR experience. For example, every time professors says a word in Latin, the English word could be programmed to appear if the user has selected this translation setting.

In various embodiments, each student user able to create a customize live (or near "real time") learning experience. As soon as the student user pauses the live XR experience to do more, the XR system creates a new path and recording including that student user's additions.

A subsequent other student can interact with the student user's recording that added to the "live" professor lecture, and see select to view what the previous student recorded as added information did to the original professor's lecture recording. The subsequent other student can then make additions and create another recording that includes the professor's lecture, the student user additions, and their own other student additions.

In still further embodiments, users can view multiple XR audiovisual experiences at the same time in a "fly over"-type functionality of the XR system. For example, a student user can see what a professor and each of 2 TAs is teaching by viewing 3 XR videos at once and can fly into a particular XR room of one of the XR videos that the student user wants to experience.

For example, a student user can see each of several classrooms from above simultaneously as they are going on and move through walls and see what each classroom is doing. In a preferred embodiment, the classrooms could be time coordinated so that subject matter is aligned between the classrooms, e.g., all classrooms would be teaching the same chapter at the same time. When the professor is done with a chapter, the system moves the other professors' recordings up to the start of the next chapter. All of the classroom recordings or XR broadcasts would therefore be about the same subject matter. A student user could choose to enter a classroom and experience that best resonates with how they would like to learn that subject matter.

In a different but similar embodiment to student users entering a public room to obtain help with a question, an XR learning arena could be programmed in an XR system where many types of videos, feedback, solutions by assisting users are posted for any student users to move around the XR arena and see different solutions and XR recordings displayed in that arena. The recordings could include displaying where a student has a problem and a tutor provided feedback in the recording. The arena displaying solutions could be organized based on specific questions or topics or the solutions/recordings could be tagged and searched by student users, such as by keyword. Once a student user identifies a solution or feedback that helps them understand the topic, the student user could choose to leave the arena. In some embodiments, the displayed solutions and recordings could have evaluations (e.g., 4 or out 5 stars) and list the particular tutor/instructor so that student users can more quickly determine what material might be most helpful and efficient for learning.

In some embodiments, thumbnails of explanations or recording could be crated in the XR arena room. Each time an assisting user starts to create an explanation, a "viewing window" could appear in the XR arena room so that student users can select access into the XR feedback/teaching experience.

In some embodiment, a student user entering the teaching experience can watch, ask questions, or request to be in an XR room with the tutor to ask questions in real time. In further embodiments, a student user could send a question to the tutor to asynchronously answer or create an additional feedback recording.

In a further embodiment, student users could seek assistance from assisting users (e.g., tutors, other students and the like) by using a question sharing board in an XR room.

For example, many users could be co-located in an XR room with a virtual infinite dry erase board that could include segments. When a student user writes a question on the board, the question or board segment for the question on the wall can light up to inform other users in the XR room that a question has been asked.

In some embodiments, the infinite board has 100 segments or more and representation of the board is shown on virtual tablets used by users in the XR room. The tablet can be used to write or select to review questions on the board. Once someone is done asking question and the board or question has been lit up (or a notification is sent to a virtual tablet as to the location of the question), a user could walk with feet in physical world, scoot with gestures, teleport, or touch on tablet the segment that the assisting user wants to interact with and then interact with the question and board location.

If multiple student users move up to the board to answer a question, it is not desirable for all of them to write on the same board at the same time. To avoid this problem, one board segment could break itself up, with the same board and question copied with same stuff on it, for each assisting user to have their own copy of the board segment to provide their respective explanation. Also, the board copies can be programmed or activate in response to control input to provide their own space, such as private room for each assisting user, so that assisting users are not writing over one another or distracted and can have their explanations independently saved and organized.

The multiple assisting users will therefore have their own response boards, all writing answers to the student user who asked the question on the wall. The assisting users will have XR feedback recordings being made of what they say, and what they write. The assisting users preferably provide a control input to post their respective response board back to the wall (submit), and the system preferably puts those multiple response boards behind the 1st board like a file drawer all behind each other. Anyone walking by can see the 1st board but also behind it that there are multiple response/feedback recordings stacked on top of each other and the user interested in the multiple responses can touch them and grab them like a file and can choose to watch a particular response recording that the user selects.

In certain embodiments, when users are in front of one segment of a board, they only hear audio from that segment and not from adjacent or other segments that are not the focus of the user.

In some embodiments, a virtual tutoring center can be implemented where an assisting user can walk down hallways with thousands of rooms in a XR environment. The assisting user can view and/or listen into different rooms along the virtual hall. The assisting user can see multiple student users working on courses at the same time and so drop-in tutoring can be happening for all courses at the same time. In other embodiments, an assisting user and/or student user could provide control input, such as to a virtual tablet that such users have in the XR environment, to filter rooms along the hallway, so that, for instance, only chemistry courses or particular questions about an acid reaction are shown. This filtering selection can make it easier for tutors and student users to find one another.

In some embodiments where a student is in a room along the tutoring center hallway, the student could provide a control input that signifies to tutors in the XR hallway that help is needed. For example, a red light or "help" sign could be initiated for tutors to see near the room of the student user needing assistance. A tutor can then virtually enter a student room of someone indicating they need help and a feedback recording can be made of the assistance provided that the student user or others could go back and re-experience to obtain similar help. As described herein, later users can also add feedback and create new feedback branch recordings to build upon the earlier recordings. As more and more recordings are added to the different questions, courses, and subject matter topics, it will be appreciated that a library of instruction or tutoring experiences can be built for any given topic. Where the recordings are tagged, either manually or automatically, such as by keywords, images, usernames, and the like, the library of recordings can be searched and re-used and re-watched by tutors, instructors, students and the like to obtain information or provide links/copies of the recordings to others without having to re-teach or re-tutor the same subject matter.

In another embodiment, if 5 student users are working on a project, the next day the instructor can go back in time into the XR experience and mark places that the students committed errors and explains what the errors are and can even look at the avatars of the students in the recording, and talk to them, and write on the blackboard in XR. The instructor has created a time-shifted lesson as a feedback assessment recording in XR by adding the teacher's content into a derivative recording of the students working on the project.

In a further embodiment where the 5 students are working on a project, the students may have been in a study or project group in a larger XR classroom environment that has been recorded. The instructor can specifically focus the instructor's feedback to just the working group in that part of the classroom. For example, the instructor might provide certain feedback in the form of a micro-lesson right in the middle of the previous recorded classroom experience that is specifically for the users in the study group. The users in the study group can then each go back and re-live their study group experience by viewing the instructor's feedback recording directed to the study group users, and they can stop at the right time to watch the teacher's micro-lesson that is directed to those users. While watching the micro-lesson through the subsequent re-visiting experience, the student users will be in their same XR environment/location, and at the corresponding time in the study group session.

In a similar example, a football coach might interact with game film that was created in XR format (such as by tracking the athletes and generating an XR recording of the activities, ball and the environment) and the coach can actually record themselves in a feedback recording by being on the game field and standing next to and pointing out receiver that the quarterback didn't throw it to, but was open.

When a teacher/coach is providing feedback in a feedback recording, there are embodiments where the instructor can "stop time" to provide a lesson or the instructor could let time continue and keep talking over the initial recorded experience (i.e., add to the recording to provide a feedback recording that does not result in the initial activity stopping). In the football coach example, the coach could (i) pause time and walk over to the open receiver in the initial game recording and say "this is the player you should have thrown to since he's wide open" or (ii) the coach could walk on the field during the recording of the game being played and point to the receiver and run with that open receiver and say "hey, this is the player you should have thrown to."

In a further embodiment, two football teams playing a game all are wearing XR camera, sound and similar sensors, such as on their helmets (11 offense and 11 defense each with sensors), that enables mapping the game to an XR platform application to create an XR recording of the game activity. The football game activity and players would be similar to the study group and users working on a project describe herein—except, the football/real world objects being used in the game would also need to be identified and tracked.

One embodiment for tracking the ball could include using the external cameras from all of the users' headset that identifies the real-world spatial location of the ball for display to each user in their XR environment and according to their perspective of the game.

Another embodiment for tracking the ball, includes providing a tracking device on the football that stores the X, Y and Z coordinates of the ball, so there is a set of coordinates for the football moving through time and then the football image can be generated in the XR environment. Preferably, such tracking embodiment only requires two sensors, one on each point of the football ends, so users can see the trajectory and where the ball is pointing. The XR representation of the football can be created on those 2 points. In another embodiment, one sensor might be provided on only one point of the football, and based on the movement of the ball through the air for that one tracked points, it is possible to know which way the ball should be pointing and how the ball might rotate in-air. For better accuracy, however, it is preferable—but not a requirement—that two points of the ends of the football be tracked.

In other embodiments, players could use augmented reality (AR) and not necessarily full virtual reality (VR). For example, the players could use the cameras on the outside of the headset (AR) to see one another, or they could just see avatars of each other as they run around the field physically, and they see each other's avatars in VR, so they don't run into each other in the real world.

A benefit of playing a game or having a practice with multiple users wearing XR devices, is that every player's activity, spatial position and perspective is being recorded without the necessity of significant numbers of video cameras and microphones to capture each player's activity and positioning. The recording can then be re-watched or used to make an assessment feedback recording in full 3-D environment.

In other ball-based sports, such as baseball and football, one sensor might be used to track and map a real-world ball (or other objects such as for a physics lesson) into an XR environment.

With one sensor, the object or all will have its X, Y and Z coordinates recorded, preferably several times every second, and then compared to where people are in an XR room, and then it is known where the ball is at all times relative to the real world and the XR environment, i.e., the distance between that sensor and the people/users in the XR room.

The object can be rendered based on what a user or setting indicates the object to be—such as a baseball or basketball or football. The user could indicate (such as by voice or XR menu interface/settings and the like) to tell the XR system what the object is from a library of objects (not just balls, but other real-world objects as well, such as goalposts and markers). The indicated object would then be rendered in the XR environment of the user(s) based on the type of object and the X, Y and Z coordinates of the object.

In a baseball activity example, two users with XR headsets could actually throw a baseball between each other and have the baseball tracked. In one embodiment this throwing and catching experience would happen where the users are near one another in the real world to play catch. However, it is also possible to enable the users to play catch remotely in a shared XR environment by tracking a baseball in two different real-world locations and using a throwing and/or catching machine in each different location for each respective user.

For example, user 1 could throw a ball in user 1's real-world backyard and the ball has a sensor to map to an XR environment. User 2 could be in user 2's real world room and could have a "throwing" machine in their room that ejects a ball with matching speed, direction, trajectory, and potentially the spin of the ball that is thrown by user 1. User 2 could then catch or try to hit the ball as thrown by user 1 and have this experience remotely in XR while also having a real world "feel" because a ball would be "thrown" to user 2 mimicking the ball thrown by user 1. If user 1 has a similar "throwing" machine, user 2 could throw a ball back to user 1 that would appear to be between each other in a shared XR environment while they are physically separated in remote locations. It will be appreciated that each machine can include a net to catch the real world thrown ball of each user and be re-loaded into each respective "throwing" machine.

In a further example, real-world bowling could be simulated by a user with an XR device could have a real bowling ball in hand but needing only a few feet of space at a location (such as home) to roll the ball into a net or similar retrieval devices. The bowling ball includes a coordinates tracking sensor to determine the direction, speed and spin of the ball leaving the user's hand and the XR environment can map the ball and its movement into an XR bowling alley, and the user can see and hear which pins go down based on the real bowling ball release while experiencing a full-size bowling alley in the XR environment. As in the described baseball catch example, users could bowl against each other remote locations but feel like they are at the same bowling alley and physically using real bowling balls.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
a processor in communication with a memory, the memory including instructions executable by the processor to:
 display, at a first display device of a first XR device of a first user, an extended reality learning environment including an assessment module having first viewable information displayed thereon and viewable by the first user;
 store, in a database, a first 3-dimensional video recording of a first avatar of the first user interacting with the assessment module having the first viewable information;
 display, at a display device of a second user, the first 3-dimensional video recording including the first avatar of the first user interacting with the assessment module;
 receive feedback information from the second user, the feedback information being associated with the first avatar of the first user interacting with the assessment module; and
 store, in the database, a video recording of the second user providing the feedback information viewable with the first avatar of the first user that was recorded in the first 3-dimensional video.

2. The system of claim 1, the memory further including instructions executable by the processor to:
 provide at the first XR device of the first user, the extended reality learning environment including the video recording of the second user providing the feedback information viewable with the first avatar of the first user that was recorded in the first 3-dimensional video recording.

3. The system of claim 2, wherein the video recording of the second user providing the feedback information viewable with the first avatar of the first user that was recorded in the first 3-dimensional video includes a second avatar of the second user providing the feedback information being associated with the first avatar of the first user interacting with the assessment module.

4. The system of claim 3, the memory further including instructions executable by the processor to:
 display, at the first XR device of the first user, the first avatar of the first user interacting with the assessment module in the extended reality environment together with the second avatar of the second user providing the feedback information being associated with the first avatar of the first user interacting with the assessment module.

5. The system of claim 2, wherein the feedback information from the second user includes audio information added to the 3-dimensional video recording of the first avatar of the first user interacting with the assessment module.

6. The system of claim 5, wherein the feedback information from the second user includes visual information added to the 3-dimensional video recording of the first avatar of the first user interacting with the assessment module.

7. The system of claim 1, wherein the feedback information from the second user includes audio information added to the 3-dimensional video recording of the first avatar of the first user interacting with the assessment module.

8. The system of claim 1, wherein the feedback information from the second user includes visual information added to the 3-dimensional video recording of the first avatar of the first user interacting with the assessment module.

9. The system of claim 2, the memory further including instructions executable by the processor to:
 record, in the video recording of the second user providing the feedback information, a second avatar of the second user providing the feedback information; and
 display to a requestor's display device following a request for the feedback information, the video recording of the second user providing the feedback information that includes the second avatar together with the feedback information.

10. The system of claim 9, wherein the display device of the second user is a display of a second XR device.

11. The system of claim 10, wherein the requestor's display device is a display of a third XR device of a third user.

12. The system of claim 1, wherein the display device of the second user is a display of a second XR device.

13. The system of claim 2, wherein the display device of the second user is a display of a second XR device.

14. The system of claim 3, wherein the display device of the second user is a display of a second XR device.

15. The system of claim 4, wherein the display device of the second user is a display of a second XR device.

16. The system of claim 1, the memory further including instructions executable by the processor to:
 display, at the display device of the first XR device of the first user, the extended reality learning environment from a perspective of the first avatar of the first user; and
 store, at the database, an assessment record indicative of one or more interactions between the first user and the assessment module, the assessment record including one or more user responses received at one or more input fields of the assessment module.

17. The system of claim 16, the memory further including instructions executable by the processor to:
 facilitate a communication session between the first user and the second user within the extended reality learning environment;
 wherein the feedback information from the second user associated with the first avatar of the first user is received from the second user during the communication session.

18. The system of claim 16, wherein the assessment record includes a viewable representation of a past avatar of the first user, wherein the assessment record and the set of feedback information are displayed to the second user from a perspective of a current avatar of the second user.

19. The system of claim 1, wherein the assessment recording includes one or more 2-D objects or 3-D objects associated with the assessment module viewable by the second user within the extended reality learning environment.

20. A method for administration of an assessment module within an extended reality learning environment, comprising:
- displaying, at a first display device of a first XR device of a first user, an extended reality learning environment including an assessment module having first viewable information displayed thereon and viewable by the first user;
- recording and storing to a database, a first 3-dimensional video recording of a first avatar of the first user interacting with the assessment module having the first viewable information;
- displaying, at a display of second XR device of a second user, the first 3-dimensional video recording of the first avatar of the first user interacting with the assessment module having the first viewable information;
- receiving feedback information from the second user, the feedback information being associated with the first avatar of the first user interacting with the assessment module; and
- recording and storing to the database, a video recording of the second user providing the feedback information viewable with the first avatar of the first user that was recorded in the first 3-dimensional video.

21. The method of claim 20, further comprising:
- facilitating a communication session within the extended reality learning environment between the first user and the second user.

22. The method of claim 21, further comprising:
- capturing, at an audio input device in communication with the first XR device of the first user, first audio data captured during administration of the assessment module.

23. The method of claim 21, further comprising:
- capturing first video data displayed at the first XR device of the first user during administration of the assessment module.

24. The method of claim 23, further comprising:
- capturing second audio data from the second XR device of the second user as feedback information from the second user.

25. The method of claim 24, further comprising:
- capturing second video data from the second XR device of the second user as feedback information from the second user.

26. The method of claim 22, further comprising:
- capturing second audio data from the second XR device of the second user as feedback information from the second user.

27. The method of claim 26, further comprising:
- capturing second video data from the second XR device of the second user as feedback information from the second user.

28. The method of claim 20, further comprising:
- capturing audiovisual data from the second XR device of the second user as feedback information from the second user.

29. The method of claim 21, further comprising:
- capturing audiovisual data from the second XR device of the second user as feedback information from the second user.

30. The method of claim 23, further comprising:
- capturing audiovisual data from the second XR device of the second user as feedback information from the second user.

* * * * *